(12) United States Patent
Goutard et al.

(10) Patent No.: US 8,924,033 B2
(45) Date of Patent: Dec. 30, 2014

(54) GENERALIZED GRID SECURITY FRAMEWORK

(75) Inventors: Eric Goutard, La Ville du Bois (FR); Spero Mensah, Redmond, WA (US)

(73) Assignee: Alstom Grid Inc., Redmond, WA (US)

( * ) Notice: Subject to any disclaimer, the term of this patent is extended or adjusted under 35 U.S.C. 154(b) by 309 days.

(21) Appl. No.: 13/105,393

(22) Filed: May 11, 2011

(65) Prior Publication Data
US 2011/0282508 A1    Nov. 17, 2011

Related U.S. Application Data

(60) Provisional application No. 61/333,838, filed on May 12, 2010.

(51) Int. Cl.
| | |
|---|---|
| G05D 3/12 | (2006.01) |
| G01R 31/00 | (2006.01) |
| H02J 3/06 | (2006.01) |
| H04L 29/06 | (2006.01) |
| H02J 3/00 | (2006.01) |

(52) U.S. Cl.
CPC .. H02J 3/06 (2013.01); Y04S 40/24 (2013.01); Y04S 40/22 (2013.01); H02J 2003/007 (2013.01); Y02E 60/76 (2013.01); H04L 63/20 (2013.01)
USPC ............ 700/286; 700/292; 700/293; 702/59; 702/62

(58) Field of Classification Search
None
See application file for complete search history.

(56) References Cited

U.S. PATENT DOCUMENTS

| | | | |
|---|---|---|---|
| 3,944,723 A | 3/1976 | Fong | |
| 4,689,735 A | 8/1987 | Young | |
| 6,347,027 B1 | 2/2002 | Nelson et al. | |
| 6,434,512 B1 * | 8/2002 | Discenzo | 702/184 |
| 6,697,240 B2 | 2/2004 | Nelson et al. | |
| 7,289,887 B2 | 10/2007 | Rodgers | |
| 7,398,194 B2 | 7/2008 | Evans et al. | |
| 7,724,778 B2 | 5/2010 | Ying | |
| 7,747,739 B2 | 6/2010 | Bridges et al. | |
| 7,844,370 B2 | 11/2010 | Pollack et al. | |
| 8,335,595 B2 | 12/2012 | Tolnar et al. | |
| 8,350,412 B2 | 1/2013 | Massie et al. | |
| 8,401,709 B2 | 3/2013 | Cherian et al. | |

(Continued)

OTHER PUBLICATIONS

Scada (Supervisory Control and Data Acquisition). http://en.wikipedia.org/wiki/SCADA. 10 pages.
IEC 61850. http://en.wikipedia.org/wiki/IEC_61850, 4 pages.
"Electric Power Transmission". http://en.wikipedia.org/wiki/Electricity_transmission. Last accessed Dec. 30, 2010, 16 pages.
"Electric Power Distribution". http://en.wikipedia.org/wiki/Electric_power_distribution. Last accessed Dec. 30, 2010, 6 pages.
"Power System Automation". http://en.wikipedia.org/wiki/Power_system_automation. Last accessed Dec. 30, 2010, 4 pages.

(Continued)

Primary Examiner — Sean Shechtman
(74) Attorney, Agent, or Firm — Amin, Turocy & Watson, LLP

(57) ABSTRACT

The subject specification comprises a generalized grid security platform (GGSP) that can control power distribution and operations in a power transmission and distribution grid (PTDG) in real or near real time. The GGSP can receive data from one or more data sources, including a PMU(s) or an IED(s), which can obtain power system related data and provide at least a portion of such data to the GGSP at a subsecond rate. The GGSP can correlate data from the data sources based at least in part on a temporal, geographical, or topological axis. The GGSP can analyze the data, including performing predictive analysis, e.g., via simulation, root cause analysis, post mortem analysis, or complex event processing, when desired, to facilitate identifying a current or predicted future state of the PTDG, a cause or source of an abnormal condition, or a remedial action execution plan, new operation or maintenance guidance, etc.

30 Claims, 27 Drawing Sheets

(56) References Cited

U.S. PATENT DOCUMENTS

| | | | |
|---|---|---|---|
| 8,417,391 | B1 | 4/2013 | Rombouts et al. |
| 8,447,434 | B1 | 5/2013 | Harris et al. |
| 8,525,522 | B2 | 9/2013 | Gong et al. |
| 8,558,551 | B2 | 10/2013 | Mynam et al. |
| 8,588,991 | B1 | 11/2013 | Forbes, Jr. |
| 8,730,837 | B2 | 5/2014 | Popescu et al. |
| 2002/0064010 | A1 | 5/2002 | Nelson et al. |
| 2003/0055677 | A1 | 3/2003 | Brown et al. |
| 2004/0081193 | A1 | 4/2004 | Forest et al. |
| 2005/0005093 | A1 | 1/2005 | Bartels et al. |
| 2005/0039040 | A1 | 2/2005 | Ransom et al. |
| 2006/0195229 | A1 | 8/2006 | Bell et al. |
| 2007/0005315 | A1 | 1/2007 | Evans et al. |
| 2007/0087756 | A1 | 4/2007 | Hoffberg |
| 2007/0124026 | A1 | 5/2007 | Troxell et al. |
| 2007/0206644 | A1* | 9/2007 | Bertsch et al. ............... 370/503 |
| 2007/0239373 | A1 | 10/2007 | Nasle |
| 2007/0285079 | A1 | 12/2007 | Nasle |
| 2008/0109205 | A1* | 5/2008 | Nasle ............................. 703/18 |
| 2008/0272934 | A1 | 11/2008 | Wang et al. |
| 2009/0129376 | A1 | 5/2009 | Johnson |
| 2009/0228324 | A1 | 9/2009 | Ambrosio et al. |
| 2009/0281673 | A1 | 11/2009 | Taft |
| 2009/0281674 | A1 | 11/2009 | Taft |
| 2009/0281679 | A1 | 11/2009 | Taft et al. |
| 2009/0319093 | A1 | 12/2009 | Joos et al. |
| 2010/0017214 | A1 | 1/2010 | Ambrosio et al. |
| 2010/0070089 | A1 | 3/2010 | Harrod et al. |
| 2009/0299542 | A1 | 5/2010 | Ying |
| 2010/0138363 | A1 | 6/2010 | Batterberry et al. |
| 2010/0152910 | A1 | 6/2010 | Taft |
| 2010/0177450 | A1 | 7/2010 | Holcomb et al. |
| 2010/0179704 | A1 | 7/2010 | Ozog |
| 2010/0241560 | A1 | 9/2010 | Landau-Holdsworth et al. |
| 2010/0286840 | A1* | 11/2010 | Powell et al. ............... 700/295 |
| 2010/0317420 | A1 | 12/2010 | Hoffberg |
| 2010/0324844 | A1 | 12/2010 | Marti |
| 2011/0004446 | A1 | 1/2011 | Dorn et al. |
| 2011/0004513 | A1 | 1/2011 | Hoffberg |
| 2011/0035073 | A1 | 2/2011 | Ozog |
| 2011/0063126 | A1 | 3/2011 | Kennedy et al. |
| 2011/0071695 | A1 | 3/2011 | Kouroussis et al. |
| 2011/0074436 | A1 | 3/2011 | Nowicki et al. |
| 2011/0093127 | A1 | 4/2011 | Kaplan |
| 2011/0106321 | A1 | 5/2011 | Cherian et al. |
| 2011/0109266 | A1 | 5/2011 | Rossi |
| 2011/0172838 | A1 | 7/2011 | Pai et al. |
| 2011/0231028 | A1 | 9/2011 | Ozog |
| 2011/0313581 | A1 | 12/2011 | Genc et al. |
| 2011/0313586 | A1 | 12/2011 | Popescu et al. |
| 2012/0029710 | A1 | 2/2012 | Dodderi et al. |
| 2012/0029720 | A1 | 2/2012 | Cherian et al. |
| 2012/0126994 | A1 | 5/2012 | Sobotka et al. |
| 2012/0175951 | A1 | 7/2012 | Pamulaparthy et al. |
| 2012/0181869 | A1 | 7/2012 | Chapel et al. |
| 2012/0229082 | A1 | 9/2012 | Vukojevic et al. |
| 2012/0253540 | A1 | 10/2012 | Coyne et al. |
| 2012/0277926 | A1 | 11/2012 | Nielsen et al. |
| 2012/0310423 | A1 | 12/2012 | Taft |
| 2012/0310434 | A1 | 12/2012 | Taft |
| 2012/0316689 | A1 | 12/2012 | Boardman et al. |
| 2012/0316691 | A1 | 12/2012 | Boardman et al. |
| 2012/0316696 | A1 | 12/2012 | Boardman et al. |
| 2012/0316697 | A1 | 12/2012 | Boardman et al. |
| 2013/0035802 | A1 | 2/2013 | Khaitan et al. |
| 2013/0036311 | A1 | 2/2013 | Akyol et al. |
| 2013/0113291 | A1 | 5/2013 | Recker et al. |

OTHER PUBLICATIONS

"Smart Grid". http://en.wikipedia.org/wiki/Smart_power_grid. Last accessed Dec. 30, 2010, 16 pages.

"Transformer" http://en.wikipedia.org/wiki/Transformer. Last accessed Dec. 30, 2010, 23 pages.

"Demand Response". http://en.wikipedia.org/wiki/Demand_response. Last accessed Dec. 30, 2010, 10 pages.

"Distributed Generation". http://en.wikipedia.org/wiki/Distributed_generation. Last accessed Dec. 30, 2010, 5 pages.

Office Action dated Jun. 21, 2013 for U.S. Appl. No. 13/155,601, 30 pages.

Motorola "Bringing Self-Awareness to the Grid, SCADA Systems Enhance Electric Utility Operations", 2009, Retrieved from the Internet on Jun. 12, 2013 at "www.motorola.com/ace3600", 4 pages.

Spack et al. Intelligent Transformer Substations in Modern Medium Voltage Networks as Part of "Smart Grid", Nov. 2011, IEEE Sccion El Salvador, 7 pages.

Office Action dated Jul. 18, 2013 for U.S. Appl. No. 13/155,594, 35 pages.

Office Action dated Apr. 9, 2013 for U.S. Appl. No. 13/155,707, 41 pages.

Office Action dated Sep. 30, 2013 for U.S. Appl. No. 13/155,707, 56 pages.

Anjan Bose, "Smart Transmission Grid Applications and their supporting Infrastructure" IEEE Transactions on Smart Grid vol. 1, No. 1 Jun. 2010, pp. 11-19.

Budka et al, "Communication Network Architecture and Design Principles for Smart Grids", Journal Bell Labs Technical Journal—Green Information and Communications Technology (ICT) for Eco-Sustainability archive vol. 15 Issue 2, Aug. 2010, pp. 205-227.

Li et al.,"Smart Transmission Grid: Vision and Framework" IEEE Transactions on Smart Grid, vol. 1 Issue 2, Sep. 2010, pp. 168-177.

Office Action dated Jan. 16, 2014 for U.S. Appl. No. 13/155,594, 38 pages.

Office Action dated Jan. 10, 2014 for U.S. Appl. No. 13/155,601, 24 pages.

Office Action dated Mar. 14, 2014 for U.S. Appl. No. 13/155,707, 43 pages.

Office Action dated Apr. 10, 2014 for U.S. Appl. No. 13/155,751, 47 pages.

Office Action dated May 8, 2014 for U.S. Appl. No. 13/155,594, 40 pages.

Office Action dated Jun. 9, 2014 for U.S. Appl. No. 13/155,615, 30 pages.

Higgins et al. "Distributed Power System Automation With IEC 61850, IEC 61499, and Intelligent Control", IEEE Transactions on Systems, Man, and Cybernetics—Part C: Applications and Reviews, vol. 41, No. 1, Jan. 2011, pp. 81-92.

Zimmer, et al. "Fault Tolerant Network Routing through Software Overlays for Intelligent Power Grids", Dec. 8, 2010, Proceedings of the 2010 I EEE 16th international Conference on Parallel and Distributed Systems, ICPADS '10. 8 pages.

Zhabelova, et al. "Multi-Agent Smart Grid Automation Architecture Based on IEC 61850/61499 Intelligent Logical Nodes", Sep. 15, 2011, IEEE Transactions on Industrial Electronics, 10 pages.

Motorola "Bringing Self-Awareness to the Grid, SCADA Systems Enhance Electric Utility Operations", Jun. 2009, Retrieved from the Internet on Jun. 12, 2013 at "www.motorola.com/ace3600", 4 pages.

Office Action dated Jun. 19, 2014 for U.S. Appl. No. 13/155,601, 30 pages.

Goldsman, et al. "Smart Dust: U Large-Scale, Low-Power, Flexible Sensor Networks", Feb. 2004, Dept of Electrical and Computer Engineering, University of Maryland, 40 pages.

Nikravesh, et al. "Control of Nonlinear Systems via Dynamic Neural Network Control (DNNC): Adaptive Control, Constraint Handling and Extension to MIMO Case", Mar. 1995, University of South Carolina and University of California, Berkeley, 5 pages.

Office Action dated Aug, 13, 2014 for U.S. Appl. No. 13/155,707, 62 pages.

Kempton et al., "Vehicle-to-grid power fundamentals: Calculating capacity and net revenue" Journal of Power Sources vol. 144 (Apr. 2005), pp. 268-279.

Brown et al., "Electric vehicles: The role and importance of standards in an emerging market" Energy Policy vol. 38, Mar. 2010, pp. 3797-3806.

Office Action dated Aug. 28, 2014 for U.S. Appl. No. 13/155,594, 49 pages.

Office Action dated Oct. 3, 2014 for U.S. Appl. No. 13/155,751, 57 pages.

* cited by examiner

GENERALIZED GRID SECURITY FRAMEWORK

CROSS-REFERENCE TO RELATED APPLICATION AND CLAIM FOR PRIORITY

This application is a non-provisional of, and claims the benefit of, U.S. Provisional Patent Application No. 61/333,838, filed May 12, 2010, and titled "GENERALIZED GRID SECURITY FRAMEWORK", which is hereby incorporated herein by reference in its entirety.

TECHNICAL FIELD

The subject specification generally relates to intelligent power transmission and distribution grids, and more particularly to a Generalized Grid Security Framework that can control power grid operations, control power transmission, and perform power grid diagnostics and adjustments.

BACKGROUND

Power grids have not undergone significant architectural changes since use of electricity for power was realized more than a century ago. The idea of a "Smart Grid" was introduced in the late 1990s, however, today, power grids still only employ limited intelligence in managing and providing power to consumers. Energy transmission and distribution systems are currently at a crossroads, as they confront the significant problem of imbalances of various kinds Not only is the gap between supply and demand continuing to increase due to global population growth, but there also is a geographic imbalance in energy production and consumption patterns. These imbalances and uncertainties could be exacerbated in the future considering the rapidly increasing energy demands of newly industrialized nations, such as China, India, Brazil, and Russia, as these and other nations will compete for more generating sources to meet expected energy demands. While incorporating a wide variety of renewable (non-fossil fuel) energy sources is part of the solution to the increasing energy demands, it is not likely that incorporating renewable energy sources will be a panacea for the impending energy issues. Thus, it is clear that there also will have to be significant changes in the power transmission and distribution network to help meet future energy needs.

Conventional power grids typically employ Supervisory Control and Data Acquisition/Energy Management System (SCADA/EMS) technology, which collects information regarding conditions in the power grid from remote terminal units or remote control centers at scan rates ranging on the order of multiple seconds. The power systems are typically dealing with a couple of hundred of thousands data points updated in correspondence with the multiple second scan rates.

From a network security and reliability point of view, state estimator algorithms have been improved over the years but are still using well known techniques. The creation of Regional Transmission Operator in the United States pushed the technology to improve efficiency of the algorithms to cope with 30,000+ network buses, to address topology errors and parameter estimation. Contingency analysis application is also very similar to what it used to be 20 years ago.

From a dispatcher point of view, the most frequently used displays within a control room are still the schematic representation of the network (e.g., mapboard), the substation online displays and tabular alarm lists. While such arrangement used to be sufficient, with the increased energy demands, increased risk of outages due to the increase in energy demands, increased complexity in transmission network systems, new power flow patterns starting to emerge following the introduction of deregulated markets, introduction of more and more intermittent resources (e.g., distributed power generation, such as wind power, solar power, etc.) to the power grid, etc., such conventional arrangement is becoming increasingly lacking in key features, which eventually may lead to dramatic consequences. For example, after Aug. 15, 2003, blackout in Northern America, a post-mortem analysis clearly highlighted the fact that SCADA/EMS systems had severe deficiencies. Overwhelming alarm flows and lack of Situation Awareness have been emphasized.

For grid reliability, transmission system operators desire to have an accurate up-to-date representation of their power system. Conventionally, the SCADA system collects data from the field and EMS applications perform security analysis of the current power system state. The power system state is compared against "normal" operating conditions, e.g., one needs to make sure that each piece of equipment is operated according to its nominal design conditions while ensuring that enough reserve and security margins are still available even after a loss of a major component on the network. This process is usually called "Network Monitoring". Today, the Network Monitoring function does not include a monitoring of the health of the pieces of equipment that constitute the topology of the network under operation.

Further, SCADA/EMS systems operation also has not evolved significantly over the last few decades, since being implemented. It actually mimics vertically integrated utilities which even after deregulation (split of generation, transmission and distribution) often operate their system in a centrally hierarchical system. Typical configurations consist of a National Control Center supervising Regional Control Centers, each of them interacting with some local Load Dispatch Centers with functions performed independently with few if not no bidirectional data flow and functional responsibilities.

Further, today, SCADA/EMS systems are mostly focusing on operation, using data collected on the order of multiple second scan rates, and provide limited insight in developing or short-medium term changing conditions. This used to be an acceptable arrangement, until recently, since network operation planning was well established and did not change drastically between day-ahead scheduling and real-time operation. Now, with the ever increasing uncertainties impacting grid operation such as intermittent resources production, obtaining only a current view of the power system is no longer adequate for efficient and reliable network operation.

As indicated above, there have been certain drivers for changes in power distribution and transmission. For instance, new power flow patterns have started to emerge following the introduction of deregulated markets. Those have been more and more accentuated with the interdependency of markets (regional markets) and development of close to real-time markets (infra-day markets). In addition, uncertainty has also been introduced with the extensive development of renewable energy resources production such as wind power. Such intermittent resources require careful attention especially for reserve management and network security. Currently, situation awareness of the fast changing flow patterns and other aspects of the power grid are lacking.

This tendency is also emphasized with the development of Flexible AC Transmission Systems (FACTS) and High Voltage DC links (HVDC) equipment. Thanks to the use of modern power electronics technologies, operators currently benefit from flexible ways to re-dispatch flows. However, this flexibility propagates to neighboring networks and can thereby contribute to uncertainty and fast changes of flow patterns if not coordinated properly. This is also re-enforced by the ever larger interconnection of transmission networks which ease the propagation of grid disturbances (e.g. inter area oscillation) and make them visible and detrimental to other grid operators.

Another driver for change is the fast development of Distributed Generation (DG). In some European countries where most of the wind generation is connected at distribution level, it is quite frequent to see energy flowing from distribution back to sub-transmission and transmission levels. Associated with the limited predictability of the wind resources, such unknown represents a risk factor for network security since this production may not be necessarily observable. Moreover, conventional power generation management is based on the management of centralized power plants rather than decentralized power plants, and decentralized management is becoming increasingly necessary. For example, in a country such as Denmark, this means shifting from a model to be managed from a couple of tens generators to 5000+ generators. With the technical evolution DG can be eligible to support frequency regulation effort as well as voltage regulation effort. Characteristics of changes brought by massive DG deployment can be summarized as follows: centralized vs. distributed injection points; exponential increase of generation resources; and intermittency of the resources for some of them.

The above specificities make these evolutions hardly manageable by conventional SCADA/EMS systems. DG impacts each SCADA/EMS subsystem. It is necessary for a data acquisition system to connect these resources which are owned by many different actors, and hence represent as many external systems to connect, while ensuring security and reliability of the data acquisition. Network security also requires accurate modeling of the distributed generation injections to be able to assess their impact on steady-state network state as well as for dynamic analysis. Generation control and management applications also need to cope with these DG resources especially dealing with the uncertainty related to the intermittent character of some DG resources.

In some countries, high growth areas can stress the system and push operation towards previously unattained limits. In many countries, while the electric energy consumption growth is stable, peak demand growth rate now represents a challenge. As a consequence, with the ever increasing time to build new transmission lines infrastructure due in part to local opposition to such construction (e.g., "Not In My Back Yard" mindset), system operators must operate the grid with existing and in some cases old assets. This often translates in using the assets at their maximum capacity and making them sweat. This puts the grid operation at hedge and requires deep knowledge of the real state of the assets. Current power system applications are not capable of optimizing the use of the current grid infrastructure.

The above obviously shall not jeopardize the grid reliability. With the ever growing economy sensitivity to the electricity availability, grid operation at the edge shall not occult grid reliability principles and deteriorate electricity quality of supply. With increasing threats of major blackouts and pressing incentives to improve revenue performance, transmission system operators face daunting challenges.

In recent years, manufacturers have developed condition monitoring solutions which aim at locally measuring key vital parameters of network equipments via smart sensors. Real-time calculation and simulation of developing conditions can then be performed to support assessment of the real-state of the assets. Condition monitoring systems apply to a large spectrum of network assets, such as switching devices or transformers. They can provide data usually called "non-operational" data to supervisory systems. Those data are not necessarily electrical values but are also encompassing information related to the real state and health of the power grid asset and are relevant to its optimized management.

With the latest development of international standards, one can also notice that the substations do not behave anymore as an independent and local actor in charge of reporting information to a hierarchical upper level. More and more intelligence is introduced at the substation level. For instance, IEC61850, in its latest evolutions, enables communications between substations which thus allows intelligent and fast adapting scheme to better protect and operate the grid. The emergence of so-called "local" agents leads to a much more decentralized information and operation architecture and represents a real paradigm shift from the centrally hierarchical grid operation which applied for decades.

The development of Active Distribution Networks and eventual involvement and empowerment of end-user for consumption behavior will also drive significant changes in grid operation and will as a consequence impact the SCADA/EMS systems. However, conventional generation management systems do not have adequate demand response programs and lack the ability to forecast the impact of demand response on generation dispatch and on reserves management, and its impact on network analysis, and lack adequate ability to control the associated resources and provision of information necessary for demand response settlement.

There have been recent technological advancements, which can or are being utilized in power grids. For instance, advancements in communication technology and infrastructure now allow for relatively large bandwidth for data transmission as well as high quality of service to support critical applications. Also, sensors, such as Non-Conventional Instrument Transformer, also have been recently developed to ease monitoring of existing assets with non-intrusive techniques. Further, enhanced processing power brought by continuous improvements in hardware and availability of data management capabilities allow now to gather more data and make them available to an end-user for application usage.

Another recent advancement is Phasor Measurement Units (PMU), which is a relatively new data source at the control center level due in part to the improvement of telecommunication infrastructures. By providing coherent set of time-correlated measurements, PMU brings a new insight of "real" network state which until very recently was inaccessible at the grid operator level. Also, Intelligent Equipment Devices (IED) and Digital Fault Recorders are other examples of data sources of interest to understand a network state. However, conventional power generation management systems do not adequately leverage the respective capabilities of these recent technological advancements.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the various embodiments in order to provide a basic understanding of some aspects described herein. This summary is not an extensive overview of the disclosed subject matter. It is intended to neither identify key or critical elements of the disclosed subject matter nor delineate the scope of the subject embodiments. Its sole purpose is to present some concepts of the disclosed subject matter in a simplified form as a prelude to the more detailed description that is presented later.

The subject specification comprises a generalized grid security platform (GGSP) that can control power transmission and distribution and operations in a power and transmission distribution grid (PTDG) in real time or at least near real time (e.g., at a second rate). PTDG is intended here as a generic term that can encompass a more traditional transmission grid as well as a power distribution grid or smart grid. The GGSP can receive data from one or more data sources, such as a Phasor Measurement Units (PMU) or an Intelligent Equipment Device IED, which can monitor power conditions in the PTDG and generate power system related data, wherein at least a portion of such data can be provided to the GGSP at a subsecond rate (e.g., on the order of milliseconds). The GGSP can correlate data from the data sources based at least in part on a temporal axis, geographical axis, and/or topological axis. The GGSP can analyze the power system related data, including performing predictive analysis (e.g., via simulation), root cause analysis, post mortem analysis, or complex event processing, when desired, to facilitate identifying a current or predicted future state of the PTDG, a cause or source of an abnormal condition in the PTDG, or a remedial action execution plan to be implemented to repair, replace or maintain respective pieces of PTDG equipment, new operation or maintenance guidance, among other features, as more fully disclosed herein.

In accordance with various aspects, the disclosed subject matter can comprise a system that includes a data information hub configured to receive power system related data from one or more data sources associated with a PTDG, and correlate respective pieces of the power system related data, based at least in part on at least one of a temporal axis, a locational axis, or a topological axis, to generate correlated pieces of power system related data. The system can further include a GGSP configured to analyze at least a portion of the correlated pieces of power system related data in real time to control power transmission and distribution by at least one of a power substation or a transformer in the PTDG in real time, in accordance with at least one predefined power system control criterion.

In accordance with various other aspects, the disclosed subject matter can comprise a method that includes the acts of correlating a plurality of items of power system related data, based at least in part on at least one of a temporal axis, geographical axis, or topological axis, to generate one or more subsets of correlated items of power system related data; and dynamically controlling at least a portion of a PTDG based at least in part on results of analyzing at least one subset of correlated items of power system related data of the one or more subsets of correlated items of power system related data, in accordance with at least one predefined power system control criterion.

In accordance with still other aspects, the disclosed subject matter can comprise a computer-readable medium having stored thereon, computer-executable instructions that, when executed by a computing device, cause the computing device to perform operations comprising: correlating a plurality of items of power system related data, based at least in part on at least one of a temporal axis, geographical axis, or topological axis, to generate one or more subsets of correlated items of power system related data; and dynamically controlling at least a portion of a PTDG based at least in part on results of analyzing at least one subset of correlated items of power system related data of the one or more subsets of correlated items of power system related data, in accordance with at least one predefined power system control criterion.

In accordance with yet other aspects, the disclosed subject matter can comprise means for correlating a plurality of items of power system related data as a function of at least one of a temporal axis, geographical axis, or topological axis including means for generating one or more subsets of correlated items of power system related data. The system can further include means for dynamically controlling, based on at least one predefined power system control criterion, at least a portion of a power transmission and distribution grid (PTDG) based on an output of a means for analyzing at least one subset of correlated items of power system related data of the one or more subsets of correlated items of power system related data.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION

Figure 1:
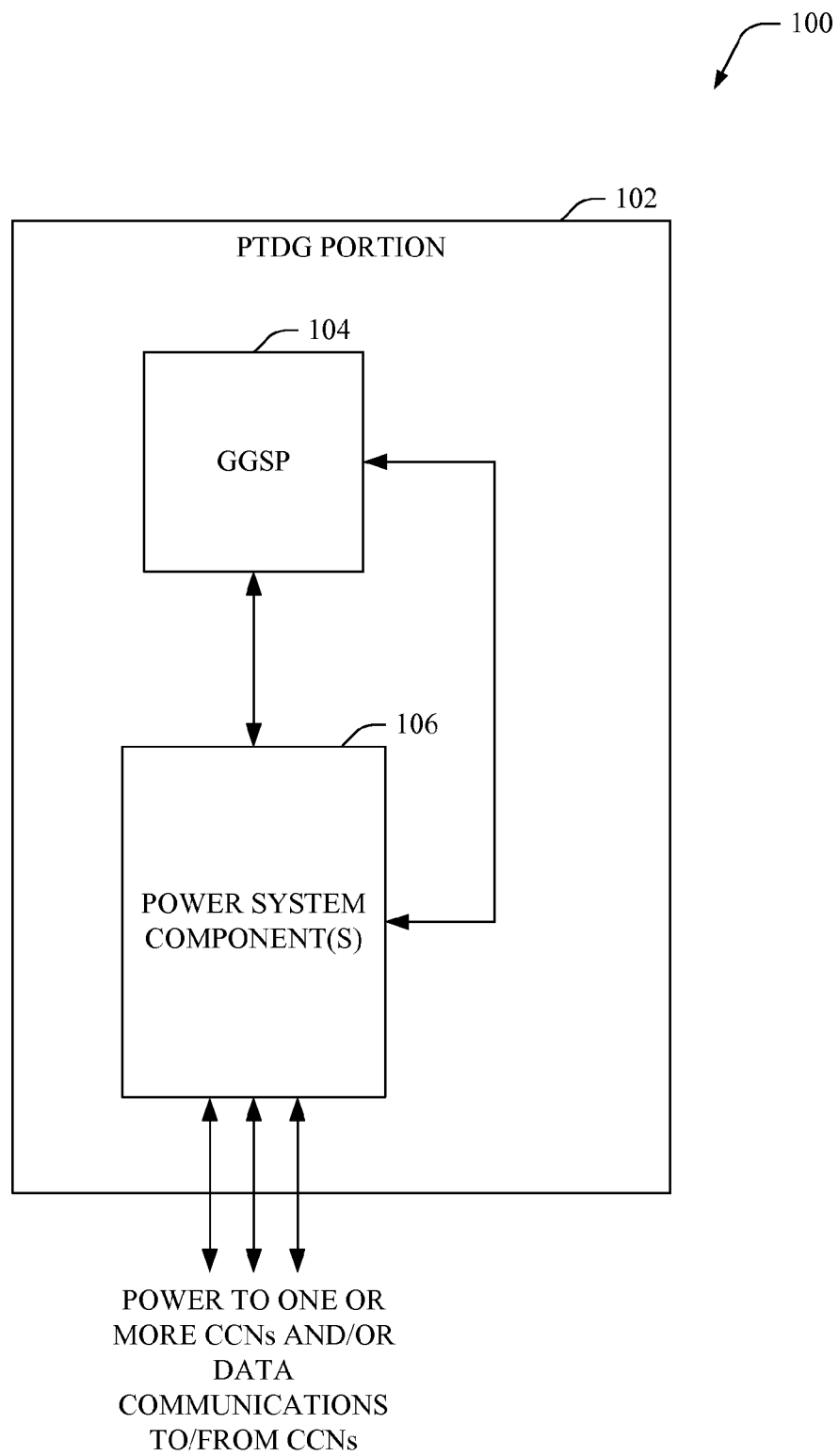
FIG. 1 illustrates a block diagram of an example system that can facilitate management of power transmission and distribution in at least a portion of a power and transmission distribution grid (PTDG) in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

As used in this application, the terms "component," "system," "platform," "interface," "node", "source", "hub", "center", "meter", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Conventional power generation control systems typically utilize traditional Supervisory Control and Data Acquisition/ Energy Management System (SCADA/EMS) technology, which has not been significantly improved in recent decades, and which has documented deficiencies and limitations. There have been recent technological advancements in, for instance, data communications and power grid monitoring. For example, Phasor Measurement Units (PMU) can monitor power and operating conditions in a power grid and generate data relating to the power and operating conditions at a subsecond rate (e.g., on the order of milliseconds). However, conventional power generation control systems have not adequately leveraged such technological advancements and the enhanced power system related data to desirably control power transmission and distribution, and operations in a power grid.

As outlined above, drivers for change calls for a coordinated and integrated set of solutions that address the system reliability under increased level of uncertainties while ensuring increased productivity of new and aging assets under stress. Consistent with the primary function and objective of a Transmission System Operator, the subject specification promotes the concept of a generalized grid security platform (GGSP) that can: extend the functions of the traditional SCADA/EMS, integrate the SCADA/EMS with a Grid Performance and Diagnostic system, and interface with the Enterprise Asset Management functions, among other features, as more fully disclosed herein.

In accordance with various aspects, the subject specification comprises a GGSP that can control power transmission and distribution, and operations in a power transmission and distribution grid (PTDG) in real time or at least near real time (e.g., at a subsecond rate). As used herein, PTDG is intended to be a generic term that can encompass a more traditional transmission grid as well as a power distribution grid or smart grid. The GGSP can receive data from one or more data sources, such as a Phasor Measurement Units (PMU) or an Intelligent Equipment Device IED, which can monitor power conditions in the PTDG and generate power system related data, wherein at least a portion of such data can be provided to the GGSP at a subsecond rate (e.g., on the order of milliseconds). The GGSP can correlate data from the data sources based at least in part on a temporal axis, geographical axis, and/or topological axis. The GGSP can analyze the power system related data, including performing predictive analysis (e.g., via simulation), root cause analysis, post mortem analysis, or complex event processing, when desired, to facilitate identifying a current or predicted future state of the PTDG, a cause or source of an abnormal condition in the PTDG, or a remedial action execution plan to be implemented to repair, replace or maintain respective pieces of PTDG equipment, new operation or maintenance guidance, among other features, as more fully disclosed herein.

In accordance with various aspects, the GGSP comprises the following subsystems. A data information hub (DIH) that has the ability to interface and use multiple data sources, to analyze and correlate data from the data sources to facilitate power system assessment, diagnostics and performance of remedial actions. The DIH paradigm can correlate data from various data sources (e.g., PMU, sensors, fault recorders, SCADA/EMS, etc.) not only on a temporal axis but also on a geographical axis and topological axis. A grid reliability center (GRC) can provide a grid operation security overseer function. The GRC can support grid operation by providing SCADA/EMS capabilities extended with new functions and applications, such as Wide Area Measurement Systems (WAMS). A grid diagnostic and performance center (GDPC) can provide a grid performance and security overseer function. The aspect of the GDPC is to leverage the new data sources (e.g., PMU) available as part of the smarter grids, wherein the new data sources can monitor grid operations and conditions, and can generate power system related data at a subsecond rate. The GDPC can transform data from the new data sources into comprehensive and enriched information featuring network equipment and power system health and performance as well as providing advanced diagnostic functions, as disclosed herein. The GDPC also can provide a comprehensive and unified post mortem analysis capability. In another aspect, the disclosed subject matter can comprise a set of interfaces for enterprise asset management (EAM). The EAM can provide maintenance overseer functions to an electrical utility. EAM can be interfaced with the other components (e.g., GRC, GDPC, etc.) of the GGSP in order to provide added value functions and business processes streamlining between grid operation and asset management functions. The GGSP also can include a Grid Unified View (GUV) module in charge of consolidating and providing synthetic information to end users allowing them to have a comprehensive understanding of the power system equipments and transmission grid state. For example, identification of (and action on) the most restrictive and relevant security constraint for the current grid conditions can be provided as part of the GUV module. In another aspect, a Unified Situation Layer (USL) can provide situation awareness and synthetic decision making support via intuitive navigation and presentation of application results and analysis, as disclosed herein.

The disclosed subject matter can provide a number of benefits to utilities. In most of the electrical utilities, grid operation, equipment and asset management are supported by different organizations and information technology (IT) systems with few interactions and interfaces between each other. With the development of enabling technologies, new data sources are made available at different levels of the electrical utility organization. One object of the GGSP is to fully leverage this information by enriching, correlating (e.g., by time and event) and sharing data between grid operation, asset, and system health and performance monitoring and asset management systems.

One beneficial result of the disclosed subject matter is that the electrical utility will benefit from improved reliability. The power system can be more reliable via the use of non operational data sources, which can allow anticipation of equipment failures, which can directly translate into reduced outage time. This is typically the case for transformer monitoring system which is able to locally monitor key vital equipment parameter and perform advanced diagnosis on the current transformer health. This information can be reported to GDPC. The GDPC, upon abnormal condition detection, can alert the grid operator (e.g., alarm at SCADA level) in conjunction with automatically triggering work order creation at asset management level.

In addition, the GGSP can comprise an Online Stability System that can extend steady-state network security analysis by providing power system stability assessment tools. To counteract inherent limitations to accuracy with which power system models can capture the true power system behavior, the Online Stability System also can leverage synchrophasor measurement-based data. The Online Stability System not only complements the traditional stability assessment techniques but also can provide a means to validate their results. One immediate application provides for monitoring power system dynamics and characterizing their stability in real time, such as providing early warning alerts upon low-frequency oscillatory dynamics to enable quickly rectifying undesired low-frequency oscillatory dynamics, as they could eventually (if not properly damped) lead to serious network incidents.

In accordance with other aspects, the GGSP can provide for improved grid performance and diagnostic assessments. Using the information collected from the health sensors, the GGSP can create a more accurate assessment of the actual state and health of grid equipment using online condition monitoring techniques. The GGSP can use this information to perform different impacts analysis to: develop a prioritized maintenance plan of critical grid equipment based at least in part on their health and criticality; develop strategic equipment upgrade programs; justify the criticality of required investments; predict the ability of the grid to withstand stressed operating conditions, etc. The GGSP also can monitor closely performance of grid equipment against expected design and operational objectives, and generate a maintenance plan to achieve higher performance objectives.

In accordance with other aspects, the GGSP can shift from corrective or scheduled maintenance (e.g., calendar-based maintenance) to condition-based maintenance of PTDG equipment. For example, the transformer monitoring system can actually perform self-diagnosis operations and derive conclusions regarding how the operational and health conditions are degrading, or are expected to degrade, over time. As such, if abnormal conditions are detected, the GGSP, utilizing the GDPC and enterprise asset management center (EAMC), can automatically generate a work order to rectify the abnormal conditions and/or perform maintenance on the equipment. In a similar way, maintenance of other types of PTDG equipment, such as a circuit breaker or switching device, can be moved from a calendar-based to a condition-based protocol by the GGSP. The GDPC can access SCADA real-time and historical information, and can implement maintenance triggering logic which can, on one side, anticipate maintenance on PTDG equipment which is operated more often than originally forecasted, and, on another side, postpone maintenance on PTDG equipment which has been much less solicited. All of this can translate into less operational expenditures in corrective maintenance and can be directed to capital expenditures for anticipated renewal of network assets.

In still other aspects, the GGSP can make enhanced use of the network grid for power transmission efficiency. Constraints on new infrastructure building for power transmission grids result in a demand for much better use of the existing grid infrastructure. The GGSP can employ improved intelligence to enable optimization of network grid capacity usage. For example, the GGSP can utilize dynamic equipment (e.g. line) rating capabilities of equipment manufacturers as local intelligence (e.g., data) for use in determinations by the GGSP relating to power transmission and distribution, and operation of PTDG equipment. For instance, by accessing such information and sharing it at the control center level, the GGSP and/or grid operators can safely increase transfer limits used by network analysis applications without jeopardizing the system reliability. The GGSP, by moving from static limits settings to dynamic limit settings, can improve power transmission capacities 15% to 20%, or more, which can be used for constraint alleviation and thus reduce the cost of congestion management and increase overall return on investment. This thereby results in transmission efficiency (e.g., transmitting more power with the same infrastructure) and further favors integration of renewable resources allowing the utilities to achieve their renewable energy penetration targets. In addition, integration of advanced Flexible AC Transmission Systems (FACTS) models within the platform also allows taking into account the increase of capacity transfer and larger transmission efficiency provided by monitoring and controlling of power electronic devices.

In accordance with various aspects, the GGSP can provide a comprehensive environment for the end user for improved situation awareness. The GGSP can provide an advanced User Interface (UI), which can leverage improved graphical techniques as well as geographical representations relating to the PTDG and PTDG equipment. The GGSP UI can be geared towards minimizing the effort for the end user to assess a situation relating to the PTDG. One objective of the GGSP is to make meaningful information, whatever the data context is, readily available to the end-user. For example, upon a transformer temperature alarm arrival at SCADA level, the operator will have the ability, on one hand, to use the UI to directly access transformer maintenance service record history as well as drill-down to transformer monitoring information reported to GDPC. Moreover, using the UI, the operator can be in a position to perform a "what-if" or predictive analysis to quickly and efficiently assess impacts of a transformer de-rated capacity from a network reliability point of view.

In another aspect, the GGSP, by connecting GRC, GDPC and EAM on an open and scalable architecture, can offer seamless access to power grid related information. The GGSP can thereby enable an end-user to more quickly access the information, which can result in a decrease in the reaction time to correct power grid related problems and thus decrease costs that may be incurred by such problems. Moreover, the GGSP, by enabling the end user to access the right information at the right time, can allow the end user to save time and can dedicate more time for system optimization, which can result in reduced operating costs.

In still another aspect, the GDPC can use the GRC as one of its data sources to collect real-time and historical operational power system related data relating to network equipment and power system. The GDPC, in return, can provide insight information about network equipment and power system (which a traditional SCADA/EMS solution is not aware of) such as dynamic equipment rating, real-time equipment health status and real-time equipment guidance. For example, using the GGSP, a grid operator can use the GRC to directly request objective functions to or from the GDPC such as, for instance, a request to overload transformer T1 in Substation A by 15% for the next 20 minutes, and the GDPC can receive this request and redirect it to the corresponding Equipment Diagnostic and Prediction Module (EDPM) so that it can perform a simulation to determine whether transformer T1 can sustain the requested 15% overload for the next 20 minutes. Based at least in part on the results of the EDPM local analysis, the simulation can either authorize the requested temporary overload (knowing that this will accelerate the aging of the PTDG asset) or not allow it knowing the current condition (e.g., aging, isolation, temperature, etc.) of the transformer T1, in accordance with predefined power system control criteria.

The GRC also can fully benefit from EAM by having direct access to the EAM IT system, which can provide added value information, such as equipment services history or up to date maintenance work progress. To the GRC, this information can be of particular importance to enable the GRC to have a better understanding of the history of the assets or adapt grid operation decisions (e.g., switching operations) knowing the updated maintenance schedules to pass a peak load situation.

The disclosed subject matter can better leverage power system related data than conventional power generation control systems. Power transmission grids have become more and more telemetered: critical network equipment, such as power transformers, are equipped with sensors and condition monitoring systems; IEDs and fault detectors are being utilized more with substations and transmission lines; synchrophasor measurements are being made more available at critical grid locations, such as large power plants, large interconnection substations and important transmission corridors. For example, hundreds of PMUs have or will be installed in power transmission grids in the United States in the short term. Also, fault recorders are currently more systematically installed in substations; protection relay settings are versioned and effective settings datasets at a given time can be made available outside of the substations; results from tests performed during maintenance and the related data set collected during the maintenance also can be available.

The disclosed subject matter can comprise communication infrastructure (e.g., telecommunication infrastructure) associated with the power system, and can utilize the communication infrastructure to communicate the power system related data to or from the GGSP and its constituent components (e.g., grid diagnostic and performance center (GDPC)). In another aspect, the amount of power system related data being communicated from a data source to the GGSP can be controlled so that part of the power system related data, which is not required by or useful to the GGSP, can remain local at the data source, and another portion of the power system related data, which is useful to the GGSP in its operations, can be transmitted to the GGSP. This highlights the importance of local agent systems, such as equipment monitoring. For example, in the case of a circuit breaker monitoring system, there is no need to make all information acquired and computed by this subsystem available to the GGSP. Only macro-level information, such as, for example, the number of breaker operation with associated values of interrupted currents, is desired (e.g., required) to be fed upward to the GGSP. This approach has the benefits of reducing the amount of bandwidth required for data transfer as well as taking full advantage of the intelligence available at equipment or local level via a distributed processing architecture.

The disclosed subject matter can collect the above power system related data and other power system related data, such as disclosed herein, can correlate and analyze the data, and can identify and perform one or more desired power system related actions (e.g., remedial actions) to control power transmission and distribution, and power system operations in real time (e.g., on the order of milliseconds), in accordance with the predefined power system control criteria. As disclosed herein, integration of the GDPC both the Grid Reliability Center (GRC) and Enterprise Asset Management (EAM) can better leverage the newer data sources (e.g., PMUs) for a more dynamic operation of the grid and more proactive management of PTDG assets.

In another aspect, for grid operation, the GGSP can control power transmission and distribution, and operations to operate the power grid closer to the limits (e.g., closer to the dynamic equipment rating of PTDG equipment), instead of merely operating at the static or nominal rating, which can result in improved transmission efficiency without jeopardizing power system reliability. Increasing ampacity of grid infrastructure also favors renewable resources integration allowing the utilities to achieve renewable energy penetration targets.

For asset management, the GGSP can schedule and perform maintenance, repair, and replacement of PTDG equipment on a condition basis, in addition to or as an alternative to a calendar basis. The GGSP can identify and use advanced information (e.g., power system related data) provided by condition-based monitoring to assess the "true" state and health of PTDG equipment (e.g., asset). The GGSP can employ prediction and diagnostic modules to drive maintenance, repair, replacement efforts towards tailored needs which are adapted to the real asset condition. Such dynamic and proactive management by the GGSP can optimize maintenance, repair, and replacement expenditures by decreasing amounts usually spent into corrective maintenance and can allow more time for asset maintenance planning optimization. The above features and other features of the disclosed subject matter are further described in reference to the figures.

Referring to the drawings, FIG. 1 is a block diagram of an example system 100 that can facilitate management of power transmission and distribution in at least a portion of a PTDG in accordance with various aspects and embodiments of the disclosed subject matter. The system 100 can comprise a PTDG portion 102 that can distribute power to consumer consumption nodes (CCNs) (e.g., homes, businesses, other structures or geographical locations at which a consumer can utilize power distributed by the PTDG portion 102). The PTDG portion 102 can comprise a GGSP 104 that can be associated with (e.g., electrically and/or communicatively connected or interfaced with, either directly or indirectly) a plurality of power system components 106 associated with the PTDG portion 102. The plurality of power system components 106 can comprise, for example, one or more power transmission and distribution nodes (e.g., power substation; power transformer; a local or distributed power source, such as a solar power generation system, wind power generation system, geothermal power generation system, hydroelectric power generation system, diesel-type power generation system, power storage component (e.g., battery), etc.), one or more sensors that can be distributed to desired locations in the PTDG portion 102 and can monitor conditions (e.g., operating conditions, equipment conditions, etc.) in the PTDG portion 102, one or more control and/or communication nodes that can be employed to control power transmission and distribution in respective parts of the PTDG portion 102 and/or communicate data to other nodes (e.g., control and/or communication nodes, such as more fully disclosed herein) in the PTDG portion 102, switches, routers, interfaces, power transmission lines, wireline and/or wireless communication components, etc.

In accordance with various aspects and embodiments, the GGSP 104 can be employed to control operation of all or at least a portion of the plurality of power system components 106 to facilitate controlling operations in and distribution of power by the PTDG portion 102. The GGSP 104 can receive data, such as power system related data (e.g., PTDG-related data) from a plurality of data sources, and can analyze the at least a portion of the data to identify one or more actions (e.g., remedial or corrective actions) that can be performed (e.g., automatically or dynamically, in real or near real time) to maintain desired operation of the PTDG portion 102 and power transmission and distribution by the PTDG portion 102, as more fully disclosed herein. The GGSP 104 can be a comprehensive solution addressing not only grid operation concerns of electrical utilities but also transmission system performance and diagnostics. As more fully disclosed herein, the GGSP subsystem can be modular in structure to be adaptable to different organization schemes within a utility. Also, in another aspect, the GGSP 104 can be one GGSP subsystem of a plurality of GGSP subsystems that can be employed in a PTDG, wherein the GGSPs can cooperate with each other to control operations and power transmission and distribution in a PTDG.

The GGSP 104 can interface with and use multiple data sources; receive and/or correlate data from the data sources based at least in part on a temporal axis, geographical axis, and/or a topological axis associated with the PTDG portion 102; and analyze data (e.g., received and/or correlated data) to perform system assessment of the PTDG portion 102 and identify and perform, or facilitate performance of, one or more remedial actions (e.g., corrective actions), as desired, to control operation of and power transmission and distribution by the PTDG portion 102. In another aspect, the GGSP 104 can address and minimize customer issues, such as, for example: increasing stress levels on aging grid infrastructures, which can lead to more frequent and severe outages and blackout; growing share of renewable/intermittent resources; ever larger and more complex systems; severe penalties/sanctions due to outage time and decision delays; more and more data from the network assets & external sources with multiple systems and user interfaces. As more fully disclosed herein, some of the benefits for an electrical utility employing the GGSP(s) 104, can include, for example: improved situation awareness of operations of the power grid; improved network operation and enhanced reliability by complementing traditional SCADA/EMS with a broader network-operation view, including stability applications and measurement-based (e.g., PMU) applications; maximized use of assets (e.g., stressed beyond normal operation limits) via dynamic equipment rating and condition monitoring, in contrast to only using static equipment rating; streamlined power grid operation and asset management interactions relying on dynamic equipment health information with reduced time to collect information necessary to locate and isolate a fault or other abnormal operating condition associated with the PTDG, as part of real or near real time operation and control of the PTDG; optimized asset management spending and reduced emergency outage time via a paradigm shift from calendar-based maintenance to condition-based maintenance (wherein, as desired, calendar-based criteria can still be one consideration as part of condition-based maintenance); reduced outage time and improved reliability indicators, such as System Average Interruption Duration Index (SAIDI) and System Average Interruption Frequency Index (SAIFI); and a comprehensive platform for grid diagnostics.

Figure 2:
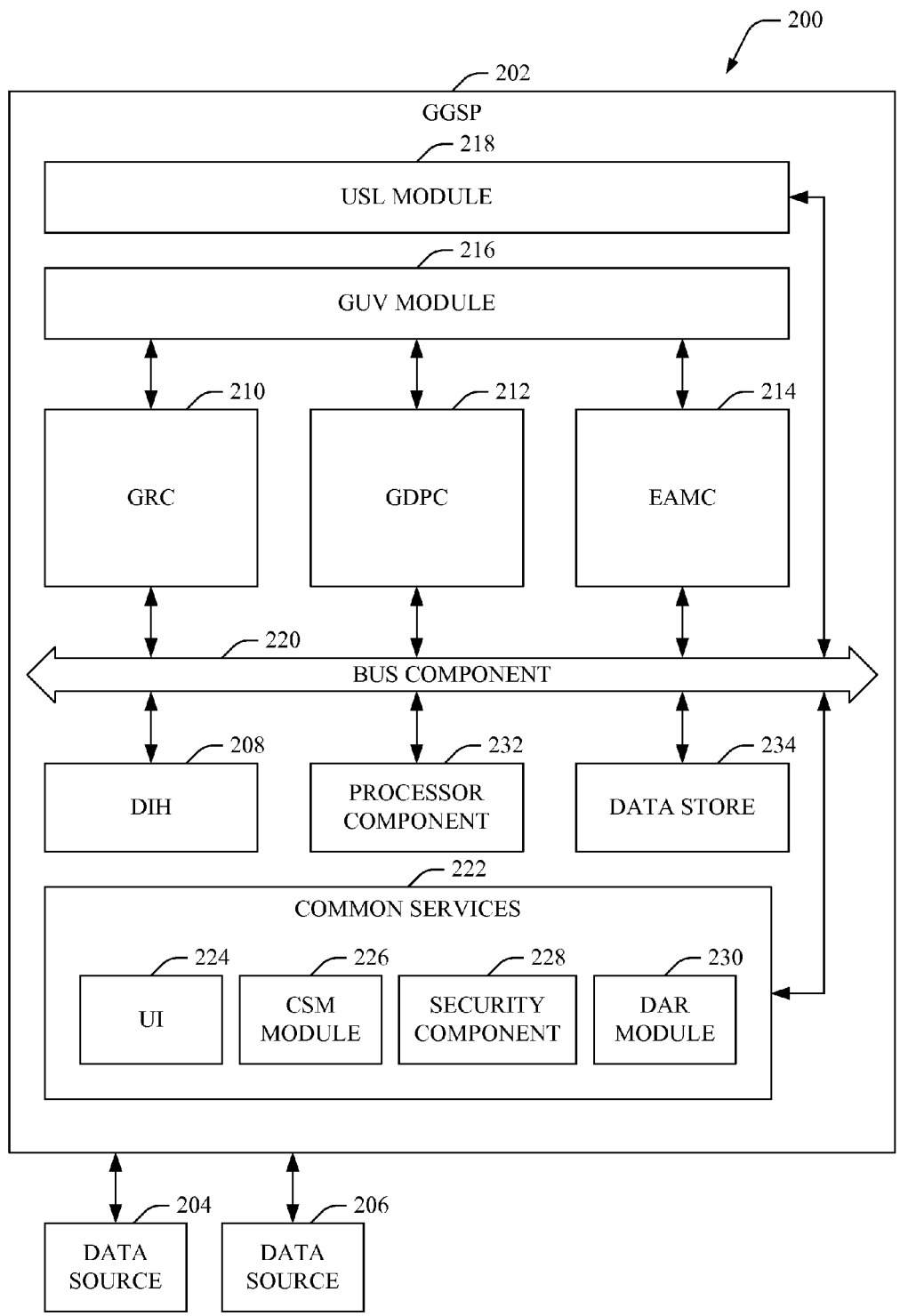
FIG. 2 depicts a block diagram of an example system that can employ a generalized grid security platform (GGSP) to facilitate controlling operations in and power transmission and distribution by at least a portion of a PTDG in accordance with various aspects and embodiments.

FIG. 2 depicts a block diagram of an example system 200 that can employ a GGSP to facilitate controlling operations in and power transmission and distribution by at least a portion of a PTDG in accordance with various aspects and embodiments. In an aspect, the system 200 can include a GGSP 202 that can be employed to control operations in a PTDG and power transmission and distribution by a PTDG, or portion thereof, to one or more CCNs (not shown in FIG. 2). To facilitate controlling operations and power transmission and distribution associated with the PTDG, the GGSP 202 can obtain power system related information from one or more data sources, such as data sources 204 and 206. Depending in part on the data source, information relating to the power system can be sensed, sampled, scanned, measured, or otherwise obtained by the data source on the order of seconds (e.g., 1 second, 2 seconds, 3 seconds, or other desired number of seconds) or on the order of milliseconds (ms) (e.g., 1 ms, 2 ms, 3 ms, . . . , 10 ms, 20 ms, 30 ms, . . . , or other desired number of milliseconds), wherein all or a desired portion (e.g., only data desired or required by the GGSP 202, in accordance with the predefined power system control criteria) of the data collected or processed (e.g., via data analysis, via synthesizing collected data) by the data source (e.g., 204, 206) can be transmitted to the GGSP 202 in real time or at least near real time (e.g., on the order of seconds or milliseconds depending in part on the data source) to facilitate real time or near real time control of operations and power transmission and distribution associated with the PTDG by the GGSP 202.

In accordance with various aspects and embodiments, a data source (e.g., 204, 206) can be a sensor (e.g., power system "health" sensor, heat sensor, voltage sensor, current sensor, power system balance sensor, harmonic level sensor; other power system parameter type sensor, fault sensor, etc.), which can communicate sensed information at a desired frequency (e.g., on the order of milliseconds, on the order of seconds); a Frequency monitoring Network (FNET) that can be employed as a power system frequency measurement system that can accurately measure power system frequency, voltage and angle in real time (or at least near real time) (e.g., on the order of milliseconds), and can facilitate desired real time (or at least near real time) control of power transmission and distribution in the PTDG, wherein the FNET can be, for example, a PMU/FNET, wherein the PMU/FNET can be, for example, a frequency disturbance recorder (FDR); a SCADA/EMS; intelligent equipment device (IED) that can provide power system related data in real or near real time (e.g., on the order of milliseconds, or on the order of seconds), as are known in the art; digital fault recorder (DFR); a fault current limiter (FCL) that can limit the amount of fault current when a fault occurs in the associated portion of the PTDG; or a fault current controllers (FCC) that also can control the amount of fault current in response to a detected fault; or other power system components associated with or contained with the GGSP 202. As desired, data obtained by a data source (e.g., PMU, IED, etc.) can be processed to synthesize the data, average the data over a given period of time, identify a trend in the data, identify a maximum or minimum parameter value, etc., on either the data source-side or GGSP-side. For example, a data source, such as a PMU, can obtain measurements relating to a power system parameter associated with a portion of the PTDG at 20 ms intervals, and can calculate an average power system parameter value over each second for a specified time period based at least in part on the obtained measurements, and can transmit the average power system parameter value for each second of the specified time period to the GGSP 202 for further analysis and processing by the GGSP 202.

Figure 5:
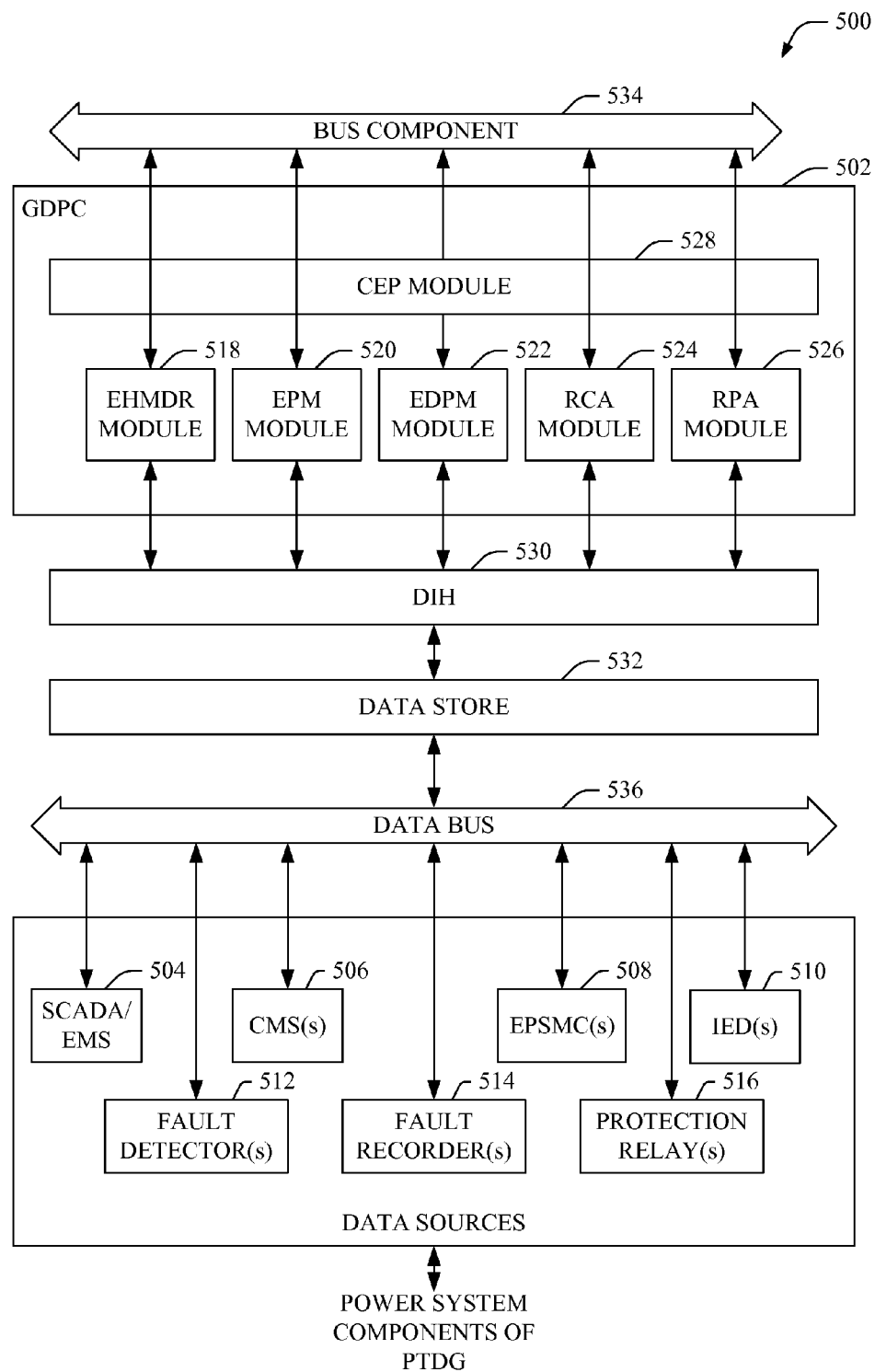
FIG. 5 illustrates a block diagram of an example system, which comprises a portion of a GGSP that includes a grid diagnostic and performance center (GDPC), that can facilitate controlling operations in and power transmission and distribution associated with at least a portion of a PTDG in accordance with various aspects and embodiments.

In an aspect, the GGSP 202 can comprise a DIH 208 that can interface with, utilize, and received data from the one or more data sources, including data source 204 and/or data source 206. The DIH 208 also can interface with a data warehouse repository (not shown in FIG. 2; as depicted in FIG. 5), which can store real-time and historical information collected from the various data sources (e.g., 204, 206), such as disclosed herein. In another aspect, the DIH 208 also can analyze and correlate the received data based at least in part on a temporal axis, geographical axis, and/or topological axis, as desired. For example, the DIH 208 can provide not only a snapshot of measurements relating to the PTDG (e.g., measurements relating to certain power conditions in the PTDG) at a given time point but also a capture or identification of the state of the PTDG (e.g., state of the network) at the corresponding time point (e.g., network solution) and an effective sequence of events record at this time. The DIH 208 can process this information by, for example, correlating, preparing and transforming the information into consistent subsets of information which respectively can serve as respective inputs and triggers to upper level advanced applications and functions (e.g., analysis and/or simulation applications and functions), as more fully disclosed herein. A typical example comprises the DIH 208 gathering (e.g., collecting and/or aggregating) an events file(s) relating to the PTDG (e.g., a fault in the PTDG) from data sources (e.g., fault recorders) in a central location (e.g., GGSP 202) and correlating the events file(s) with other power system data to enable the GGSP 202 to identify the fault and its location in real or near real time, wherein the fault identification and location in real or near real time can result in a shorter outage duration. In another aspect, the DIH 208 also can be utilized to support short to medium term power system studies by correlating power system related data and providing the correlated data for use by the GGSP 202, wherein the correlated data can be used by the GGSP 202 to generate PTDG evolution scenarios for further analysis incorporating actual equipment performances of PTDG equipment.

To facilitate correlating data, a data source (e.g., 204, 206) and/or the DIH 208 can tag data, for example, with a time stamp (e.g., GPS time stamp) that can indicate a precise time that the data was obtained by the data source or DIH 208, a geographical tag that can indicate the location from which the data was obtained, and/or a topological tag that can indicate the power system component or other topological information associated with the PTDG to which the data relates. The respective data tags on respective pieces of received data can be utilized by the DIH 208 to process and correlate the received data on a temporal axis, geographical axis, and/or topological axis, as desired. The received data, as correlated, can be utilized by the GGSP 202 to render system assessment of the PTDG, perform diagnostics on the PTDG, identify one or more remedial actions (e.g., corrective actions), if any, and perform the one or more remedial actions on the PTDG, in accordance with predefined power system control criteria.

In another aspect, the GGSP 202 can contain a GRC 210 that can be the part of the grid property security authority, and can provide a grid operation security overseer function for the GGSP 202. The GRC 210 can support power grid operation in part by providing SCADA/EMS functions as well as extended functions and applications (e.g. WAMS related functions) that can leverage the data obtained from the data sources (e.g., 204, 206) (e.g., in real or near real time), as more fully disclosed herein.

In yet another aspect, the GGSP 202 can comprise a GDPC 212 that can be part of the grid performance security authority, and can provide a grid performance and security overseer function. The GDPC 212 can leverage the data obtained from the data sources (e.g., 204, 206), and can process, analyze, and/or transform such data into comprehensive and enriched information featuring PTDG equipment and power system health and performance as well as propose advanced diagnostic functions based at least in part on the data analysis and the predefined power system control criteria, as more fully disclosed herein. In other aspects, the GDPC 212 also can perform a root cause analysis relating to a detected abnormal condition or fault, and/or a comprehensive and unified post mortem analysis that can provide post mortem results relating to the PTDG, as more fully disclosed herein.

In still another aspect, the GGSP 202 can include an EAMC 214 that can be a utility asset overseer that can provide maintenance overseer functions to the electrical utility associated with the PTDG. The EAMC 214 can be interfaced to provide added value functions and business processes streamlining between grid operation and asset management functions. The EAMC 214 can facilitate identifying the respective maintenance status and/or health status of respective pieces of PTDG equipment. The EAMC 214 also can generate and/or maintain respective service history of respective pieces of PTDG equipment, wherein the service history can be used to facilitate generation of maintenance plans to maintain, repair, or replace PTDG equipment. The EAMC 214 can operate in conjunction with other components (e.g., GDPC 212) to generate an optimized asset maintenance, repair and replacement plan (e.g., remedial action execution plan), as more fully disclosed herein. In yet another aspect, the EAMC 214 can identify the respective dynamic ratings of respective pieces of PTDG equipment, wherein the dynamic ratings can be used, for example, to identify situations where PTDG equipment can be operated under an overload condition (e.g., greater than the standard or nominal rating) to facilitate efficient power transmissions in the PTDG. In still another aspect, the EAMC 214 can facilitate triggering asset maintenance, repair or replacement of PTDG equipment, for example, automatically, dynamically, based at least in part on occurrence of a power system event, and/or based at least in part on identification of a power system or PTDG equipment condition, in accordance with the predefined power system control criteria.

In another aspect, the GGSP 202 can comprise a grid unified view (GUV) module 216 that can process, consolidate, and/or synthesize power system related information relating to the PTDG to generate grid unified result data relating to the PTDG, and can provide (e.g., present, display) the grid unified result data to an end user allowing the end user to have a comprehensive understanding of the respective pieces of PTDG equipment and power transmission grid state of the PTDG. For example, the GUV module 216 can identify, present, and/or allow action on the most restrictive and relevant security constraint for the current grid conditions at a given time, based at least in part on data analysis results relating to the PTDG. As another example, the GUV module 216 can include a power system status check dashboard that can provide (e.g., present, display) analysis results, synthesized data, abstract data, status data, etc., relating to the PTDG (e.g., as generated by the GGSP 202) to an end user (e.g., operator) to enable the end user to identify operating status, operating conditions, equipment conditions, etc., associated with the PTDG at a given time(s). The GUV module 216 also can present other information, such as results of complex event processing or operation guidance remedial actions, to the end user for use by the end user, as more fully disclosed herein. In yet another aspect, the GGSP 202 can contain a unified situation layer (USL) module 218 that can provide situation awareness and synthetic decision making support via intuitive navigation and presentation of application results and analysis based at least in part on analyzed data associated with the PTDG.

In yet another aspect, system 200 can contain a bus component 220 (e.g., Enterprise Service Bus) that can comprise one or more buses, which can be utilized to receive data from or transmit data to components (e.g., data sources 204 or 206)

associated with the GGSP 202 and transfer data between components (e.g., GRC 210, GDPC 212, DIH 208, etc.) of the GGSP 202. The bus component 220 can employ a high-speed data bus(es) to facilitate quick data transfers, for example, at a subsecond rate (e.g., typically less than one second, and can be at a rate on the order of milliseconds (e.g., 1 ms, . . . , 10 ms, . . . , 20 ms, . . . )), to facilitate real time or at least near real time control of the PTDG. The GRC 210, GDPC 212, EAMC 214, DIH 208 and/or other components of the GGSP 202 can be communicatively connected to the bus component 220. Structuring the GGSP around the bus component 220 can ensure sustainable and long term system evolution capabilities.

In still another aspect, the system 200 can include a common services module 222 that can include desired services and interfaces, which can be utilized by the GGSP 202 and end users that use or access the GGSP 202. For instance, the common services module 222 can contain a user interface (UI) 224 that can be a comprehensive UI (e.g., graphical user interface (GUI), touch screen GUI) which can provide an end user with detailed situational awareness of the operations and status of the PTDG in real or near real time. The UI 224 is geared towards minimizing the effort for the end user to assess a situation relating to the PTDG. In accordance with various aspects, the UI 224 can include and/or provide one or more various displays (e.g., liquid crystal display LCD), light emitting diodes (LED) display, combination LCD-LED display, cathode ray tube (CRT) display, etc.), speakers, lights, LEDs, adapters, connectors, controls, channels, ports, communication paths, etc. In an aspect, the UI 224 can present geographical representations (e.g., contextually) of all or a desired portion of the PTDG, wherein respective UI display screens can comprise respective geographical representations of the respective portions of the PTDG. The UI 224 also can present correlated and/or contextualized information to the end user, so that the end user can have access to the desired (e.g., relevant) information relating to an aspect(s) of the PTDG. The UI 224 also can provide respective indicators or alarms, which can present an indication and/or information regarding respective abnormal conditions or faults detected in the PTDG.

For example, an abnormal temperature can be detected for a transformer in the PTDG. The transformer temperature alarm can be received by the GGSP 202 at SCADA level. The GGSP 202 can generate a subset of correlated and/or contextualized data relating to the abnormal temperature of the transformer, and the subset of correlated and/or contextualized data can be presented to the operator via the UI 224. Given this subset of correlated and/or contextualized data, and one or more controls, which are contextually related to the detected abnormal temperature condition associated with the transformer, presented to the operator via the UI 224, the operator can have the ability to directly access the transformer maintenance service record history and/or the ability to drill-down to transformer monitoring information reported to GDPC 212 by the one or more data sources (e.g., 204, 206) associated with the transformer. Also, the operator can be in a position to request performance of (e.g., automatic performance of) and/or perform a predictive analysis (e.g., what-if analysis) via the UI 224 to quickly assess impacts of a transformer de-rated capacity on a network reliability point of view. One of the salient features of the advanced UI 224 service is a seamless integration of GDPC UI with the GRC operation UI. Such integration can avoid multiplication of the number of heterogeneous UIs at GGSP level and can allow focus on a consistent UI all over the different GGSP components.

In another aspect, the common services module 222 can include a common source modeler (CSM) module 226 that can generate power system model objects that can model respective power system components, and portions (e.g., a subset of power system components), of a PTDG. Since at least a portion (e.g., all or most) of power system model objects can be shared among the various GGSP components, it can be desirable for a single power system model object to be defined only once in order to achieve consistent definition of the same object among all subsystems. In that regard, the CSM module 226 can define respective power system model objects to provide respective consistent definitions of the respective objects among all of the GGSP subsystems.

In still another aspect, to facilitate data exchanges between a power system model object and another power system model object(s) or a power system component(s), the CSM module 226 include or be associated with, and can utilize or leverage, a standard information model such as a common information model (CIM), which can employ one or more specified modeling standards, protocols or algorithms. For instance, one type of standard that can be used is IEC 61970 CIM. The CSM module 226 can model all or a desired portion of the information, features, functions, etc., of the different components or subsystems of or associated with the GGSP 202 (e.g. models of objects involved in EAM). In an aspect, the CSM module 226 can provide one or more standard interfaces to generate, publish, and consume power system models relating to the GGSP 202. In yet another aspect, the CSM module 226 can provide power system model version management, wherein the CSM module 226 can support model-over-time management. That is, for example, when modeling a power system component for a particular period of time in the past, the CSM module 226 can restore and reconstruct model of the power system component, which was valid (e.g., in use) for the PTDG during that particular period of time, even if the power system component is currently different (e.g., different version, updated version). The CSM module 226, by utilizing model-over-time management, can facilitate accurately generating power system model objects for a given time period, which can be beneficial, for example, when performing a post mortem analysis and review relating to the PTDG.

In accordance with various other aspects, the common services module 222 can include a security component 228 that can control access to the GGSP 202 and associated components, in accordance with one or more security and/or authentication protocols. The security component 228 can enforce security, including, for example, North American Electrical Reliability Corporation (NERC) Critical Infrastructure Protection (CIP) criteria fulfillment or system architecture hardening, at all desired areas of the PTDG, at both application and infrastructure level. Since at least a portion of the data is collected from one or more substations associated with the GGSP 202 and security component 228, the security component 228 can desirably control access to the components of the PTDG and access to audit logs associated with the PTDG. For instance, the security component 228 can employ hardened security measures, such as, for example, air gap (e.g., air gap unidirectional data transfer) at the substation level. In another aspect, the security component 228 and/or security and authentication protocols associated therewith can be adapted, as desired, for example, based at least in part on the requirements of the customer (e.g., utility company) and/or the architecture of the PTDG.

In accordance with still another aspect, the common services module 222 can include a data access and reporting (DAR) module 230 that can provide respective types of data, respective types of data, respective types of access (e.g., based at least in part on respective grants of access rights), and/or respective reporting templates, display screens, or UIs to respective users, such as direct end-users (e.g., network operators) within control centers, utility executives, corporate users, and/or remote users, based at least in part on the type of user. The DAR module 230 can tailor the data or access to the data, reporting templates, display screen, UIs, etc., associated with the PTDG to profiles and access rights adapted or assigned to the user, based at least in part on the type of user (e.g., position or role of the user, data or access needs of the user in accordance with the user's position of role, etc.). The security component 228 and/or DAR module 230 can require a user, power system component, or device to provide valid authentication credentials (e.g., password, pass phrase, personal identification number (PIN), biometric information (e.g., fingerprint, eye scan, voice recognition, etc.), public or private key, etc.) in order to gain access to the GGSP 202 or other associated portions of the PTDG, wherein the access rights granted to a user, power system component, or device can be based at least in part on the authentication credentials presented to the security component 228 and/or DAR module 230.

In yet another aspect, the GGSP 202 also can comprise a processor component 232 that can operate in conjunction with the other components (e.g., DIH 208, GRC 210, GDPC 212, EAMC 214, etc.) to facilitate performing the various functions of the GGSP 202. The processor component 232 can employ one or more processors, microprocessors, or controllers that can process data, such as information relating to power transmission and distribution, control information (e.g., relating to a power system control or remedial actions), information (e.g., rules, algorithms) relating to power system control criteria, information (e.g., power condition related data, measurement data, data analysis information, sensed information, and/or power system warning indicators, etc.) received from one or more data sources (e.g., 204, 206), information relating to data analysis or simulations relating to the PTDG that are performed by the GGSP 202, information to facilitate interfacing the GGSP 202 with an associated component (e.g., data source 204 or 206, power distribution source (PDS), and/or enhanced consumer meter (ECM) such as a smart meter or other power system related meter employing advanced metering infrastructure (AMI), etc.), information relating to other operations of the GGSP 202, and/or other information, etc., to facilitate operation of the GGSP 202, as more fully disclosed herein, and control data flow between the GGSP 202 and other components (e.g., data source(s), ECM, and/or PDS, etc.) associated with the GGSP 202.

The GGSP 202 also can include a data store 234 that can store data structures (e.g., user data, metadata), code structure(s) (e.g., modules, objects, hashes, classes, procedures) or instructions, information relating to power transmission and distribution, control information (e.g., relating to a power system control or remedial actions), information (e.g., rules, algorithms) relating to power system control criteria, information (e.g., power condition related data, measurement data, data analysis information, sensed information, and/or power system warning indicators, etc.) received from one or more data sources (e.g., 204, 206), information relating to data analysis or simulations relating to the PTDG that are performed by the GGSP 202, information to facilitate interfacing the GGSP 202 with an associated component (e.g., data source 204 or 206, PDS, and/or ECM, etc.), information relating to other operations of the GGSP 202, etc., to facilitate controlling operations associated with the GGSP 202. In an aspect, the processor component 222 can be functionally coupled (e.g., through a memory bus) to the data store 224 in order to store and retrieve information desired to operate and/or confer functionality, at least in part, to the components of the GGSP 202 (e.g., DIH 208, GRC 210, GDPC 212, EAMC 214, etc.), and/or substantially any other operational aspects of the GGSP 202.

Figure 3:
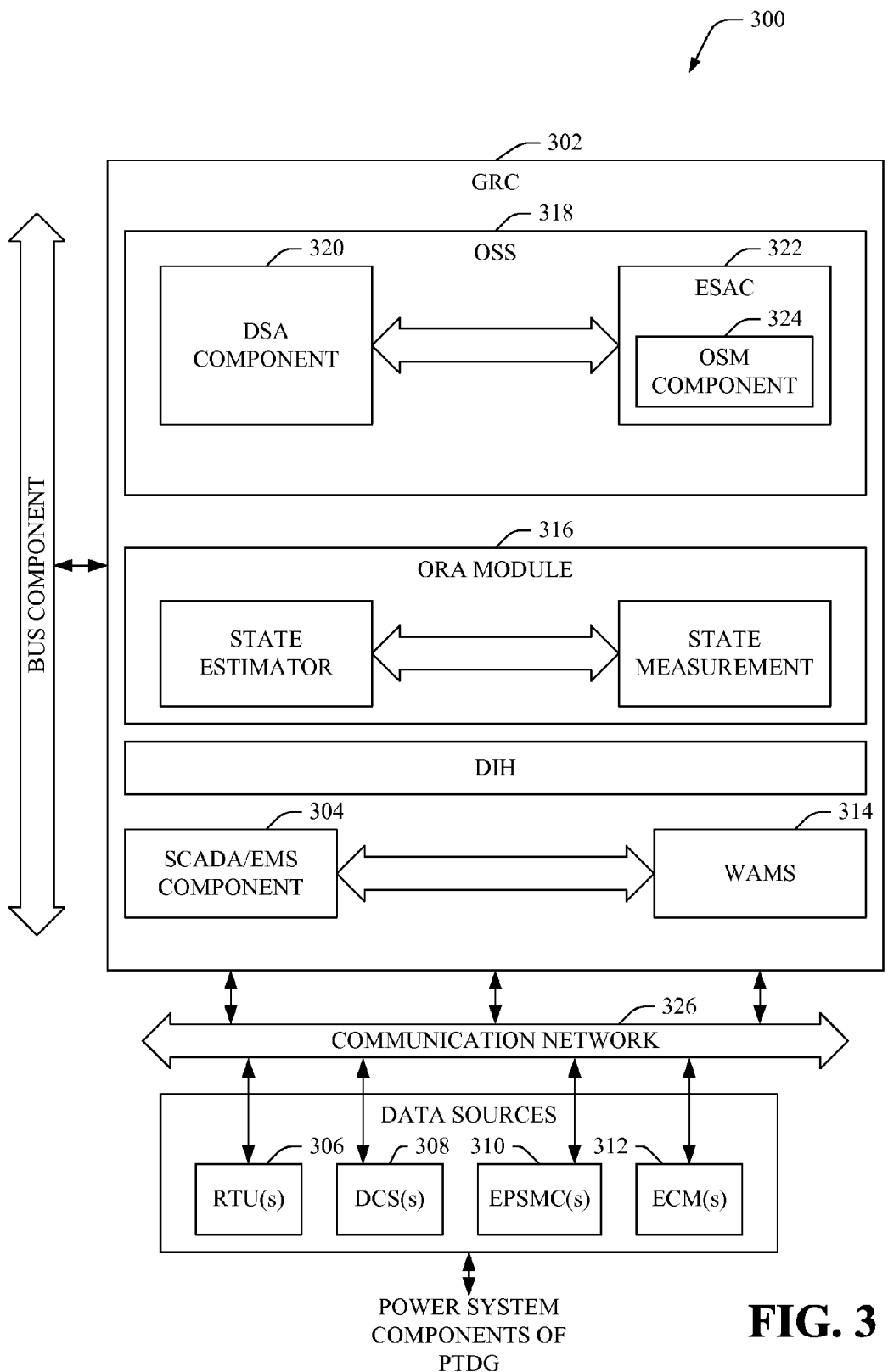
FIG. 3 illustrates a block diagram of an example system, which comprises a portion of a GGSP that includes a grid reliability center (GRC), that can facilitate controlling operations in and power transmission and distribution associated with at least a portion of a PTDG in accordance with various aspects and embodiments.

FIG. 3 illustrates a block diagram of an example system 300, which comprises a portion of a GGSP that includes a GRC, that can facilitate controlling operations in and power transmission and distribution associated with at least a portion of a PTDG in accordance with various aspects and embodiments. In an aspect, the system 300 can include the GRC 302, which can provide a grid operation security overseer function. The GRC 302 can function to support grid operation in part by providing SCADA/EMS functions, plus extended functions, such as phasor data concentrator (PDC) functions and WAMS functions, wherein these extended functions can leverage data sources to facilitate real time or at least near real time control of the PTDG. In an aspect, the GRC 302 can include a SCADA/EMS component 304 that can perform SCADA and EMS functions such as, for example, data acquisition, alarm processing, state estimator or contingency analysis, etc., wherein power system related data can be acquired from one or more data sources, such as, for example, one or more remote terminal units (RTUs) 306, or one or more digital control systems (DCSs) 308, which typically sense, scan, sample, measure, or otherwise obtain data relating to the PTDG on the order of seconds (e.g., 1 second, 2 seconds, 3 seconds, . . . ), and/or other data resources that can sense, scan, sample, measure, or otherwise obtain data relating to the PTDG at other rates (e.g., faster scan or sample rates), such as more fully disclosed herein.

In another aspect, the GRC 302 also can acquire power system related data from one or more other data sources, such as an enhanced power system measurement component(s) (EPSMC(s)) 310 (e.g., FNET, such as a PMU/FNET, which can be a frequency disturbance recorder (FDR)) or an ECM(s) 312 (e.g., smart meter or other power system related meter employing advanced metering infrastructure (AMI)), which can sense, scan, sample, measure, or otherwise obtain power system related data at a subsecond level (e.g., 1 ms, 2 ms, 3 ms, . . . 10 ms, 20 ms, 30 ms, . . . ). This power system related data (e.g., PMU type data) can have an advantage of representing real-time complex measurements (phasor) for voltage and current at subsecond levels, which feature the actual dynamic network state of the network (e.g., PTDG). This and other power system related data also can be accurately time-tagged (e.g., by a data source and/or another component, such as a WAMS 314) using time stamping (e.g., GPS time stamping), and thus, such data can support WAMS functions, which can extend de-facto the visibility and understanding of the network power state for the operator as compared to the visibility and understanding of the network power state that is conventionally available accessing traditional SCADA telemetry. Thus, in an aspect, the GRC 302 can contain a WAMS 314 that can monitor operations and conditions of the PTDG, and can collect and/or analyze power system related data (e.g., obtained from data sources) associated with the operations and conditions of the PTDG to facilitate real time or at least near real time system understanding of the status and conditions of the PTDG and control of operations of the PTDG. The WAMS 314, utilizing a PDC, can collect, concentrate, and/or aggregate data (e.g., power system related data, including synchrophasor data), such as data associated with the one or more data sources 306, 308, 310, and/or 312, to facilitate utilizing and/or processing the data to control power transmission and distribution and operations associated with the PTDG. In other aspects, the WAMS 314 can generate or obtain phasor data (e.g., down-sampled phasor data), can identify or calculate phase angle differences associated with power transmission in the PTDG based at least in part on synchrophasor data (e.g., obtained from EPSCMC(s) 310), and can analyze the phase angle differences and/or other power system related information to detect and identify undesired oscillations (e.g., low-frequency oscillations) and their corresponding damping factors to identify potential power transmission and distribution problems. The GRC 302 can identify and perform one or more remedial actions to rectify an identified potential power transmission and distribution problems in real time, so that such problems can be corrected before they can negatively impact stability of the PTDG.

In still another aspect, the WAMS 314 can facilitate analyzing or replaying historical power system related data to reconstruct events relating to power transmission and distribution, and operations of the PTDG. The reconstructed events can be analyzed by the WAMS 314 or other components of the GGSP to, for example, identify a root cause or source of an abnormal condition detected in the PTDG, optimize power system operations, evaluate conditions or performance of PTDG equipment, etc., as disclosed herein. The WAMS 314 also can generate one or more different types of alarms in real time and/or predictively (e.g., based on a predictive analysis of power system related data), wherein the different types of alarms can relate to different types of abnormal conditions relating to power transmission and distribution, or operations associated with the PTDG. As desired, the data from the EPSMC(s) 310 and/or the ECM(s) 312 can be utilized by the SCADA/EMS component 304 as well.

In an aspect, the GRC 302 can comprise an online reliability assessment (ORA) module 316 that can provide a plurality of network stability analysis applications that can analyze the power system related data collected from one or more of the plurality of data sources (e.g., 306, 308, 310, and/or 312) and generate information indicating the reliability state (e.g., current reliability state) of the network (e.g., PTDG) in real or near real time, wherein such information can be presented to the operator (or another component associated with the GGSP) to allow the operator to quickly assess the reliability state of the portion of the PTDG for which the operator (or component) is responsible. In an embodiment, the ORA module 316 also can employ state-of-the art model-based applications, such as, for example, Quick Network Topology Assessment, with enhanced solution speed (e.g., at a subsecond rate) to manage, process, and/or analyze the power system related data (e.g., obtained from the data sources (e.g., 310, 312, and/or 306, 308), or data analysis or synthesis results). Further, the GRC 302 can employ one or more security analysis tools that can execute at desired rates (e.g., on a subsecond level, or on the order of a second or more) in order to continually track the changing state of the power grid, or portion thereof, in real or near real time.

In another aspect, as new power system related data is received by the GRC 302, the ORA module 316 can analyze the new power system related data as well as historical power system related data, and can update the current power system state and contingency analysis results accordingly, based at least in part on the new power system related data and/or the historical power system related data, in accordance with the predefined power system control criteria. In still another aspect, the ORA module 316 can comprise a state estimator and a contingency analyzer, which can be operated at a desired rate (e.g., subsecond rate, a rate on the order of seconds, . . . ) that can correspond to the rate at which data is being generated by or received from the data sources, to identify or estimate the state of the PTDG and perform a contingency analysis in real or near real time. In an aspect, the GRC 302 can employ one or more ultra high-speed and/or parallel processors to facilitate processing data to attain real time or at least near real time data analysis.

In yet another aspect, the ORA module 316 can leverage information, such as PMU information, e.g., received from the EPSMC(s) 310, by using synchrophasor measurements within the state estimator for state estimation (e.g., real time or near real time state estimation) relating to the PTDG. This can result in improved observability and solution accuracy in state estimation of the PTDG by the state estimator of the ORA module 316, as compared to conventional power grid systems using only SCADA/EMS technology for state estimation. In an aspect, the ORA module 316 also can perform power system parameter estimation, as well as provide support for islanding and re-synchronization, using information received from an EPSMC(s) 310 or other data sources, and this can complement the application portfolio (such as disclosed herein) available at GRC level.

In addition, the GRC 302 also can utilize or model smart network devices (e.g., IEDs), such as those known in the art, and integrate them into the power systems applications suite. All or a portion of these smart network devices can be triggered and operated at a subsecond rate (e.g., in the millisecond range). These smart network devices also can be integrated into automated fast closed loop defense schemes of the GRC 302. These smart network devices can be some of the controls that can ensure that the PTDG is "smart" and "self-healing" and capable of responding quickly to imminent threats to security of the PTDG or PTDG operations.

In yet another aspect, the ORA module 316 can include one or more applications that can perform predictive security analysis. For instance, the ORA module 316 can employ an application(s) that can analyze received power system related data, and generate a subset of disparate predicted power-system operation scenarios (e.g., event(s)) comprising one or more predicted power-system operation scenarios, such as a best case power-system operation scenario, worst case power-system operation scenario, and/or most likely case power-system operation scenario, and other prediction information, such as the respective percentages of likelihood of each scenario occurring, based at least in part on current or historical power system related data and the predefined power system control criteria. The subset of disparate predicted power-system operation scenarios and related prediction information can be presented to the operator or another component associated with the GGSP, so that the operator or other component associated with the GGSP can be aware of such predicted scenarios and can make decisions relating to operation of the PTDG based at least in part on the predicted scenarios and associated prediction information. As an example, the ORA module 316 can employ a power system simulator that can be utilized to perform fast "look-ahead" analysis of the received power system related data and simulate operation of the PTDG to predict how the PTDG will operate given specified parameters and conditions, and can generate and present the subset of disparate predicted power-system operation scenarios to the operator or other GGSP component, wherein the "look-ahead" analysis and operation simulations can be performed at a rate that can enable real time or near real time control of PTDG operations.

In an aspect, the GRC 302 can contain an online stability system (OSS) module 318 that can employ combined or integrated features on dynamic security phenomena of the PTDG. For instance, the OSS module 318 can include a dynamic stability analysis (DSA) component 320 that can perform model-based DSA using a complete network (e.g., PTDG) model (e.g., both static and dynamic) of the PTDG, for example, using the data collected from the one or more data sources 306, 308, 310, and/or 312. The DSA component 320 can provide a comprehensive suite of applications that can analyze various stability phenomena, such as, for example, small signal stability analysis (SSSA), voltage stability analysis (VSA) and transient stability analysis (TSA), associated with the PTDG. This can be of paramount importance in PTDG operations, since, for example, for a certain transmission corridor of the PTDG, a thermal overload constraint could be the most restrictive during the morning load rise, while in the afternoon, the stability margin could become the most restrictive constraint. The OSS module 316, employing the DSA component 318, can dynamically perform and analyze the SSSA, VSA, and/or TSA associated with the PTDG, and can dynamically control PTDG operations based at least in part on the results of such analysis to, for example, account for or manage a most restrictive constraint (or a subset of the most restrictive constraints) on PTDG operations at a given time period.

In still another aspect, as a complement, in addition to the model-based DSA, PMU-technology of a PMU type data source (e.g., 310) also can facilitate providing a measurement-based approach for stability analysis relating to the PTDG, wherein the analysis can be performed by the OSS module 318. For instance, leveraging the PMU-technology of such a data source, the OSS module 318 can comprise an enhanced stability analysis component (ESAC) 322 that can monitor the level of instability in the PTDG (e.g., various portions of the PTDG) and can perform (e.g., dynamically, in real time or at least near real time) on-line detection and analysis of the level of oscillatory instability in the PTDG and can identify undesired oscillatory instability (e.g., a level of oscillatory instability that is outside the threshold value or range of values for instability), which can naturally complement the steady-state grid security applications of the GRC 302. The ESAC 322 can employ one or more components (e.g., associated with one or more applications), such as an oscillatory stability monitoring (OSM) component 324, that can allow detection of local and inter area low frequency oscillations. By monitoring and identifying poorly damped oscillations (e.g., oscillations that are outside the threshold value or range of values for oscillations), when the OSM component 324 detects such poorly damped oscillations, the OSM component 324 can trigger or generate early warning signals, which the OSM component 324 can provide (e.g., present) to the operator or another GGSP component giving the operator or other GGSP component sufficient time to react and avoid potential blackout situations in the PTDG (e.g., in real time or at least near real time). The OSS module 318 thus can comprise an overall comprehensive stability assessment system comprising the combination of both complementary approaches (e.g., model-based DSA by the DSA component 320 and measurement-based analysis by the ESAC 322). This can thereby provide, for example, synthetic stability indices with tendencies relating to the PTDG for the power grid operators.

In yet another aspect, the system 302 can include a communication network 326 that can be employed to facilitate wireline or wireless communication between components (e.g., components, modules, centers, hubs, sources, etc.) or devices associated with the PTDG. For instance, the one or more data sources 306, 308, 310, and/or 312, and the GRC 302, can be communicatively connected to the communication network 326 via a wireline or wireless communication connection utilizing one or more wireline or wireless communication technologies (e.g., wireline communication channels, such as digital subscriber line (DSL)-type channels, broadband-type channels, broadband over power lines (BPL), power line carriers (PLC), power line digital subscriber lines (PDSL), etc.; and wireless communication channels, such as cellular communication channels, Wi-Fi communication channels, Worldwide Interoperability for Microwave Access (WiMax) communication channels, femtocell communication channels, satellite communication channels, wireless metropolitan area network (WMAN) channels, wireless local area network (WLAN) channels, etc.), and corresponding communication protocols (e.g., International Electrotechnical Commission (IEC) type protocol, such as IEC 870-5-101/104; Distributed Network Protocol (DNP), such as DNP-3; Transmission Control Protocol (TCP); Internet protocol (IP); General Packet Radio Service (GPRS) type protocol; etc.).

In accordance with various aspects, the communication network 326 can include a core network (not shown) that can facilitate routing communications (e.g., data communications) between the GGSP 302 and other communication devices (e.g., data source, computer, mobile phone (e.g., cellular phone, smart phone), personal digital assistant (PDA), electronic notepad, electronic netbook, electronic gaming device, another type of electronic device with communication capabilities, servers (e.g., email server, multimedia server, audio server, video server, news server, financial or stock information server), etc.) via the core network or via an Internet protocol (IP)-based network (e.g., Internet, intranet, etc.) (not shown) associated with (e.g., included in or connected to) the communication network 326. The core network also can allocate resources to the control nodes in the communication network 326, convert or enforce protocols, establish and enforce QoS for the control nodes or other devices, provide applications or services in the network, translate signals, and/or perform other desired functions to facilitate system interoperability and communication in the wireless communication network. The core network further can include desired components, such as routers, nodes (e.g., serving general-packet-radio-service (GPRS) support node (SGSN), gateway GPRS support node (GGSN), etc.), switches, interfaces, controllers, etc., that can facilitate communication of data between the GGSP 302 and other communication devices associated with the communication network 326. The communication network 326 also can include the IP-based network, which can be associated with the core network, and which can facilitate communications by the GGSP 302 and other communication devices associated with the communication network 326 at least in part via communication of data packets (e.g., IP-based data packets) between the GGSP 302 and other communication devices associated with the communication network 326 using a wireline or wireless communication connection in accordance with specified IP protocols. In still another aspect, in addition to or as an alternative to, the GGSP 302 and other communication devices being able to communicate with each other via the communication network 326, the GGSP 302 and other communication devices can communicate with each other via communication technology(ies) (e.g., BPL, PLC, PDSL, etc.) associated with the transmission power lines in the PTDG.

Figure 4:
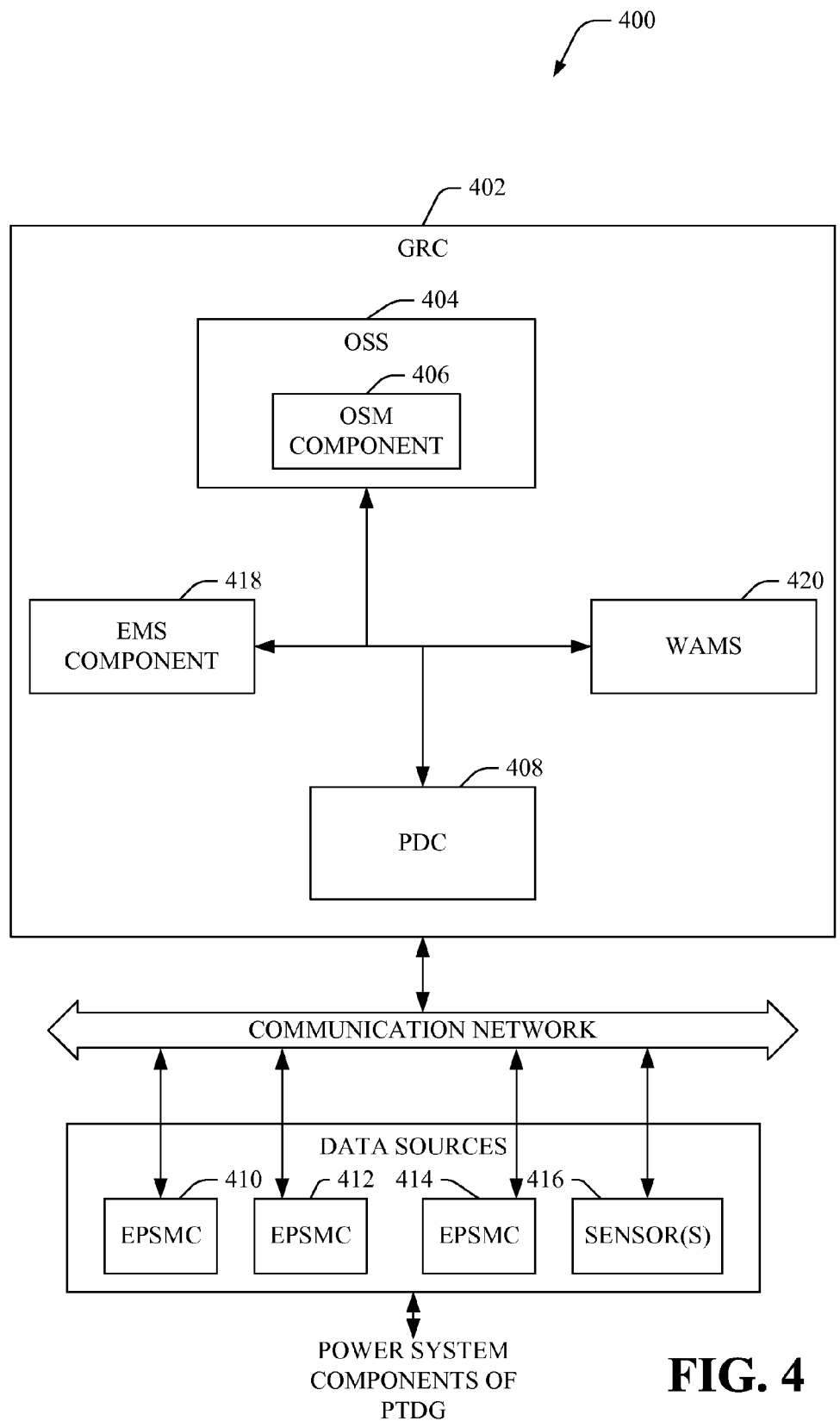
FIG. 4 depicts a diagram of an example system illustrates a diagram of an example system implementing an online stability system (OSS) in accordance with various embodiments and aspects of the disclosed subject matter.

Turning to FIG. 4 (along with FIG. 3), FIG. 4 illustrates a diagram of an example system 400 implementing an OSS in accordance with various embodiments and aspects of the disclosed subject matter. The system 400 can comprise a GRC 402 associated with a substation. The GRC 402 can employ an OSS 404, which can function as more fully disclosed herein, wherein the OSS 404 can include an oscillatory stability monitoring (OSM) component 406, that can be employed, in part, to monitor at least a portion of the PTDG and detect local and inter area low frequency oscillations in the portion of the PTDG the OSM component 406 monitors. By monitoring and identifying poorly damped oscillations, the OSS module 404 and/or OSM component 406 can transmit (e.g., automatically or dynamically) an early warning signal(s) to the operator (or a GGSP component) notifying the operator (or GGSP component) quickly enough to allow the operator (or GGSP component) to have enough time to react and avoid potential blackout situations or other undesired conditions in the PTDG.

In another aspect, the OSM component 406 can be associated with a PDC module 408, as more fully disclosed herein. The PDC module 408 can receive data (e.g., measurements, parameter values, indicators, time stamps, geographical tags, topological tags, etc.) from one or more data sources, such as EPSMC 410 (e.g., PMU), EPSMC 412 (e.g., PMU), EPSMC 414 (e.g., collapse prediction relay (CPR)), or one or more other devices (e.g., IEDs, smart grid devices) or sensors 416. One or more specified protocols (e.g., IEEE 37.118) can be employed by the PDC module 408, OSS module 404, OSM component 406, and/or the one or more data sources to communicate, collect, or concentrate (e.g., communicate, collect and/or concentrate, at a second, subsecond or millisecond-order rate) all or a portion of the data obtained from or otherwise associated with the one or more data sources.

In another aspect, the PDC module 408 and one or more of the data sources (e.g., EPSMC 410, EPSMC 412, EPSMC 414, and/or sensors 416, etc.) can communicate with each other via a wireline (e.g., DSL, PLC, broadband, etc.) or wireless (e.g., Wi-Fi, Wi-Max, cellular, etc.) communication connection using an applicable communication protocol(s), to facilitate communication of data at relatively fast rates, which can facilitate real time or at least near real time control of the PTDG.

In still another aspect, the system 400 can employ an EMS component 418 (e.g., as part of the GRC), wherein the EMS component 418 can collect data from the one or more data sources and perform state estimation of the PTDG (e.g., at a rate on the order of a second(s) or even faster (e.g., subsecond rate)), and/or can collect and process data from the one or more data sources associated with the PTDG and provide the collected data to the ORA module (e.g., 316) in the GRC (e.g., 302), and the ORA module can perform state estimation on the power grid, as more fully disclosed herein. For example, the EMS component 418 can collect data, such as data relating to voltage and current measurements performed by a PMU (e.g., EPSMC 410, EPSMC 412), from the PMU, wherein such data can be collected at a subsecond or millisecond-order rate. The ORA module and/or EMS component 418 can perform state estimation to identify or estimate the state of the PTDG and/or perform a contingency analysis in real or near real time. By using the PMU measurement data, the ORA module and/or EMS component 418 can perform state estimation of the PTDG that is improved over the traditional state estimation performed by conventional SCADA/EMS systems.

In another aspect, the GRC 302 can include a WAMS 420 that can perform various power system monitoring, data analysis of power system related data, alarm processing, and other functions, as more fully disclosed herein, to facilitate real time or at least near real time system understanding of the status and conditions of the PTDG and control of operations of the PTDG. The WAMS 420 can collect, concentrate, and/or aggregate data (e.g., power system related data), such as data associated with (e.g., produced by and received from) the one or more data sources, such as EPSMC 410, EPSMC 412, EPSMC 414, and/or sensors 416, to facilitate utilizing and/or processing the data to control power transmission and distribution, and operations associated with the PTDG.

FIG. 5 depicts a block diagram of an example system 500, which comprises a portion of a GGSP that includes a GDPC, that can facilitate controlling operations in and power transmission and distribution associated with at least a portion of a PTDG in accordance with various aspects and embodiments. In an aspect, the system 500 can comprise a GDPC 502 that can provide grid performance and security overseer functions. The GDPC 502 can utilize the data (e.g., power system related data) from data sources both within and outside the GGSP to perform diagnostic functions and identify power system health relating to the operation and performance of the PTDG, wherein the data sources can comprise, for example, the SCADA/EMS component 504, one or more condition monitoring systems (CMS(s)) 506, one or more EPSMCs 508, one or more IEDs 510, one or more fault detectors 512, one or more fault recorders 514, one or more protection relays 516 (e.g., CPR(s)). The GDPC 502 can leverage the power system related data obtained from one or more of the data sources (e.g., EPSMC(s) 508, IED(s) 510, fault detector(s) 512, fault recorder(s) 514, protection relay(s) 516), which can generate and provide data to the GDPC 502 at a subsecond rate, to facilitate real time or at least near real time identification of the health and performance of the PTDG and PTDG equipment, and diagnosis and correction of undesirable power conditions (e.g., power system parameter outside of a threshold range of acceptable parameter values, power system fault, etc.). In another aspect, the GDPC 502 can provide a comprehensive and unified post mortem analysis to better understand phenomena, behaviors, or events which may have occurred on the PTDG to facilitate identifying remedial actions that can be performed in the future and to identify and generate new operation guidance or maintenance guidance rules for future operation and maintenance of the PTDG.

In an aspect, the GDPC 502 can include an equipment health monitoring and dynamic rating (EHMDR) module 518 that can fully leverage information provided by local intelligent systems in charge of monitoring online conditions of critical assets (e.g., PTDG equipment, such as a power transformer) within the PTDG. In the case of a power transformer, such local or remote systems can provide advanced monitoring of all transformer main components, wherein an online condition monitoring, diagnosis and expert system also can include gas analysis, if desired. Distributed condition monitoring systems can transmit (e.g., broadcast) a subset of desired (e.g., relevant) information to the EHMDR module 518, and the EHMDR module 518 can generate or synthesize information relating to the state (e.g., current state) of the power transformer, based at least in part on the subset of desired information, and can provide an end user (e.g., grid operator) with synthetic information representative of the "true" state (e.g., "health" state, operation level, power output, detected fault(s), equipment condition, etc.) of the transformer at a given time.

In another aspect, using this state information combined with operational and maintenance rules, which can be applied to the state information, the EHMDR module 518 can detect and/or identify an abnormal condition relating to operation or equipment condition relating to a portion of the PTDG, and can trigger (e.g., dynamically or automatically) real-time alarming to the GRC in case of an abnormal condition being detected, so that the grid operator can be immediately informed of potential issues with the PTDG equipment. The approach is to provide an early warning signal, which can avoid a potential harmful situation such as sudden failure of a piece of PTDG equipment with immediate negative impact on the PTDG operation, such as, for example, an emergency power outage. In an aspect, the GRC and/or a grid operator can perform a desired corrective action to rectify, prevent, alleviate, and/or minimize a potentially harmful situation, as detected by the EHMDR module 518. For instance, the early detection of the potential harmful situation relating to the PTDG and generation of the early warning signal by the EHMDR module 518 can leave time for the grid operator or the GRC to identify an alternate operation scheme (e.g., transformer de-ration and load transfer, for instance), wherein the alternate operation scheme can be implemented by the grid operator or GRC to eliminate, prevent, or minimize a negative impact on the PTDG operation.

In still another aspect, the EHMDR module 518 also can utilize the distributed intelligence of the PTDG to facilitate assessing in real-time the dynamic rating of PTDG infrastructure, such as, for example, overhead transmission lines. For instance, the EHMDR module 518 can obtain electrical measurements of the amount of electricity being distributed by the overhead transmission lines, and can obtain information relating to the physical state of conductors and ambient conditions associated with the transmission lines from one or more sensors monitoring the transmission lines or components associated therewith. The EHMDR module 518 can analyze the measurement information and sensor information to render an accurate assessment (e.g., dynamically) of the cable ampacity of the transmission lines, wherein the cable ampacity can be used on grid operation side as a real-time conductor limit for network monitoring.

In another aspect, the GDPC 502 can include an equipment performance monitor (EPM) module 520 that can monitor the performance and condition of PTDG equipment. For instance, the EPM module 520 can receive information regarding actual equipment performance of a piece of PTDG equipment (e.g., from the EHMDR component 518), access as-built manufacturer equipment performance datasheets comprising information regarding a piece of PTDG equipment (e.g., power transformer), and can compare the actual equipment performance of the piece of PTDG equipment with the as-built manufacturer equipment performance datasheet for that piece of PTDG equipment. Based at least in part on that comparison analysis, the EPM module 520 can identify the condition state of the piece of PTDG equipment over time, including identifying degradation of the PTDG equipment and equipment functions over time. This can be of benefit for a utility, as the EPM module 520 can enable the GRC and/or a grid operator to anticipate PTDG equipment failures and/or also can be used to trigger performance of a comparative analysis of similar PTDG equipment in the equipment fleet associated with the utility. The information relating to the comparative analysis generated by the EPM module 520 in relation to PTDG equipment also can be valuable in interaction with equipment manufacturers and associated maintenance services as equipment manufacturers can learn more about the actual performance of their PTDG equipment from the comparative analysis results, and maintenance services can learn more about the type(s) and frequency(ies) of maintenance to be performed on the PTDG equipment based at least in part on the comparative analysis results.

In an aspect, based at least in part on the information relating to actual PTDG equipment performance and conditions, information relating to the manufacturer equipment performance datasheets, comparison analysis of such information, and one or more equipment rules (e.g., in accordance with the predefined power system criteria), the EPM module 520 can automatically trigger generation and transmission of work orders to, for example, the EAMC (e.g., 214), when an abnormal performance of PTDG equipment is detected or predicted. The fleet analysis view realized by the EPM module 520 also can bring a global approach to analyzing and correcting systematic equipment misbehavior (e.g., malfunctions, abnormal conditions). The EPM module 520 can interpret any detected performance behaviors via, for example, Key Performance Indicator calculation (e.g., configurable logic) and can generate one or more ad-hoc reports (e.g., ad-hoc PTDG equipment performance and conditions reports), which can be provided to other power system related components and/or any interested parties within the utility organization.

In still another aspect, the GDPC 502 can include an equipment diagnostic and prediction module (EDPM) 522 that can complement the EHMDR module 518, and can provide diagnostic and prediction features relating to the operation, performance, PTDG conditions (e.g., power conditions, communication conditions, etc.), PTDG equipment conditions, etc., of the PTDG. The EDPM 522 can perform a simulation of operations, performance, and conditions of a portion (e.g., a piece of PTDG equipment, all or a portion of a PTDG subsystem, etc.) of the PTDG to simulate future operations, performance, and conditions of the portion of the PTDG at a given future period of or moment in time, based at least in part on information relating to the current condition of the portion of the PTDG portion and/or historical information relating to the portion of the PTDG. Based at least in part on the simulation, the EDPM 522 can predict the future operations, performance, and conditions of the portion of the PTDG, and/or make one or more diagnoses relating to the portion of the PTDG, at a given future period of or moment in time. As disclosed herein, such predictive and diagnostic features can have a paramount potential, as, for example, the simulation performed by the EDPM 522 can identify whether a temporary overload capacity for a portion of the PTDG is to be permitted or not (e.g., when a temporary overload capacity is requested), based at least in part on the results of the simulation of the future operations, performance, and conditions of the portion of the PTDG.

In another aspect, these simulation and prediction capabilities also can be applied to circuit-breaker monitoring systems. By not only focusing on the number of breaker operations but also taking into account conditions for past current cuts, the EDPM 522 can determine or identify the likely performance degradation over time for a switching device, such as a circuit-breaker. In one aspect, the EDPM 522 can generate and provide an early warning signal regarding a piece of equipment, and/or can automatically trigger condition-based maintenance work orders, on the EAM side, to have maintenance work performed on the piece of equipment, based at least in part on the current or predicted future condition (e.g., degradation, equipment failure, etc.) of the piece of equipment. One objective achieved by the EDPM 522 is to be able to predict or anticipate equipment failures by performing more advanced simulation and predictive failure analysis which can thereby allow the utilities to perform maintenance and/or take fragile equipment (e.g., degraded or likely to fail) out of service for repair before the actual defect occurs to the equipment. This approach can decrease the number of power system equipment malfunctions or failures over time which can translate into a reduced number of outages, shorter outage duration, and reduced cost for corrective maintenance of PTDG equipment.

In yet another aspect, the GDPC 502 can contain a root cause analysis (RCA) module 524 that can identify a root cause(s) or source(s) of an abnormal condition (e.g., power system parameter with an abnormal parameter value, fault or failure associated with PTDG equipment, etc.) associated with the PTDG. The RCA module 524 can receive information from one or more data sources (e.g., 504, 506, 508, 510, 512, 514, and/or 516), and can leverage and apply predefined logic (e.g., one or more predefined power system control rules) to that information to correlate the information and identify the source(s) or cause(s) of the abnormal condition associated with the PTDG.

The disclosed subject matter, by providing RCA capabilities, can provide the benefit of closing the information loop and providing return of experience and root cause identification associated with the PTDG. The RCA module 524 can operate in conjunction with the EDPM module 522 to facilitate performing a RCA, as, for example, the EDPM module 522 can provide information, such as results of analysis or simulation based at least in part on data received from the one or more data sources, and the RCA module 524 can use and/or analyze the information received from the EDPM module 522 and other information received from the one or more other data sources to identify the root source(s) of cause(s) of an abnormal condition associated with the PTDG. In another aspect, the RCA module 524 can provide features for alarm reduction and synthesis, which can be fully leveraged at the GRC side.

One significant issue affecting pieces of PTDG equipment are their excessively old ages. In some utilities, several hundreds of power transformers may be 40 years or older. This can represent huge risks borne by the utility and obviously can cause an undesired increase in corrective maintenance costs and also an undesired increase in average outage frequency and duration times. Replacing such a fleet of PTDG equipment in a very short period of time is not realistic from an economic point of view nor an execution point of view knowing the grid operation constraints. It can therefore be beneficial for the utility to have an "assistant" for prioritizing fleet replacement.

In view of this, in an aspect, the GDPC 502 can comprise a replacement plan assistant (RPA) module 526 that can generate a replacement plan to replace respective pieces of PTDG equipment at respective times, in accordance with the predefined power system control criteria. In accordance with various aspects, the RPA module 526 can utilize the GDPC 502 to establish a comprehensive diagnostic landscape of the pieces of target PTDG equipment and identify and generate a priority equipment replacement sequence based at least in part on the actual respective health levels of the respective pieces of PTDG equipment; use the GRC (e.g., 400) to assess the related reliability impacts of the items (e.g., equipment replacement items, equipment repair items, etc.) priority equipment replacement sequence, and identify and generate a respective remedial actions plan; and use the EAM (e.g., EAMC 214) to perform the economic impacts and develop the remedial action execution plan, based at least in part on information in the remedial plan.

Conventional power systems typically prioritize fleet replacement by only taking into account the age of the asset, which is not sufficient. To overcome this deficiency, the RPA module 526 can perform a failure/risk assessment of performance of respective remedial action items on PTDG equipment, and can generate a remedial action execution plan based at least in part on such failure/risk assessment. In an aspect, the RPA module 526 can interact (e.g., communicate) with the EHMDR module 518, EPM module 520, and EDPM module 522 and/or other components to obtain information (e.g., data, data analysis results, etc.) that can be analyzed to facilitate generating the remedial action execution plan. In another aspect, the RPA module 526 can integrate a grid security dimension, as performance (e.g., temporal performance) of remedial action items (e.g., PTDG equipment replacement, repair, or maintenance) in the remedial action execution plan can be arranged so that grid reliability can be maintained, wherein, for example, power system outages linked with PTDG equipment replacement, repair or maintenance can be minimized and scheduled at desired times. The RPA module 526 also can interface with one or more grid reliability look-ahead applications and can include one or more optimization engines to determine the most desirable (e.g., optimal) remedial action execution plan, taking into account various constraints (e.g., time to perform remedial actions, costs of the respective remedial actions, resource availability, PTDG security, power transformer manufacturer lead time, expected life time of PTDG equipment, penalty costs for anticipated corrective maintenance for life time extension, etc.).

As an example of various aspects of the functionality of the RPA module 526, the RPA module 526 can diagnose a condition or "health" level of PTDG equipment, based at least in part on current or historical information (e.g., operating condition information, physical condition information, etc.) relating to the PTDG equipment. The RPA module 526 can generate a priority sequence for the performance of remedial actions (e.g., maintenance, repair, or replacement) of one or more pieces of PTDG equipment, based at least in part on analysis of the diagnosis of the condition or "health" level of the PTDG equipment.

The RPA module 526 can evaluate the reliability impacts relating to the remedial actions of the priority sequence, in accordance with the predefined power system control criteria. The results of the reliability impacts can result in the RPA module 526 modifying (or not modifying) the priority sequence (e.g., modifying the order of remedial action, modifying priority level of a remedial action, etc.) and/or including contextual results of the reliability impact evaluation with the priority sequence for further processing and evaluation. The RPA module 526 can generate a remedial action plan, based at least in part on the priority sequence and the reliability impact evaluation. The remedial action plan can include information relating to, for example, the temporal order of performance of respective remedial actions on respective pieces of PTDG equipment, the respective types of remedial actions to be performed on the respective pieces of PTDG equipment, economic information (e.g., respective economic costs) of performing the remedial actions on the respective pieces of PTDG equipment, contextual information relating to the respective remedial actions and/or respective pieces of equipment, and/or other information.

The RPA module 526 can evaluate economic impact of the remedial action plan. For example, the RPA module 526 can perform a cost/benefit analysis on the remedial action plan as a whole, or on respective portions of the remedial action plan, to facilitate determining the economic impact of the remedial action plan in context. For instance, the RAP module 526 can identify and correlate the respective costs of performing the respective remedial actions temporally, locationally, and/or topologically with the remedial actions, as desired. For example, the costs of performing the remedial actions can be correlated or grouped together over specified time periods (e.g., each month) to determine respective expected expenditures in performing the remedial actions over the respective specified time periods.

The RPA module 526 can generate a remedial action execution plan, based at least in part on the evaluation results of the economic impact of the remedial action plan. Based at least in part on the evaluation results of the economic impact of the remedial action plan, the RPA module 526 can generate the remedial action execution plan to include all or a desired portion of the remedial action items contained in the remedial action plan, modify a certain remedial action item(s) in the remedial action execution plan from the remedial action plan or replace the certain remedial action item(s) with a different remedial action item(s), modify the temporal order of performance of respective remedial actions in the remedial action execution plan from that contained in the remedial action plan, and/or otherwise modify the remedial action plan to facilitate generating the remedial action execution plan, based at least in part on the evaluation results and the predefined power system control criteria.

In yet another aspect, the GDPC 502 can include a complex event processor (CEP) module 528 that can process multiple events to identify a subset of events that are relevant, for example, to identify added value information, and generate synthetic information that can identify and/or propose one or more remedial actions that can be performed on PTDG equipment, wherein the synthetic information can be provided to the end user (e.g., grid operator). The CEP module 528 can be associated with various components, including, for example, the EHMDR module 518, the EPM module 520, the EDPM module 522, the RCA module 524, and the RPA module 526, and can receive data (e.g., data from data sources, synthesized data relating to data from data sources, analysis results relating to data from data sources, etc.) from those components and/or other data sources associated with the GDPC 502. In an aspect, the CEP module 528 can analyze current and historical information relating to the power system and can detect complex patterns, correlate PTDG-related events, identify causes or sources of PTDG-related events, and/or identify relationships between disparate PTDG-related events, etc., across different types of data, wherein the data can be correlated based at least in part on various temporal, locational, topological, and/or other factors, as more fully disclosed herein.

In another aspect, the CEP module 528 can employ or configure one or more rules or algorithms, wherein the CEP module 528 can include a platform for defining physical power system behavior, in part by analyzing the data, detecting complex patterns, correlating PTDG-related events, identifying causes or sources of PTDG-related events, and/or identifying relationships between disparate PTDG-related events, etc., in a discovery mode and/or iterative mode. Based at least in part on its data analysis and predefined power system control criteria, the CEP module 528 can generate or configure (e.g., dynamically and/or iteratively) rules, algorithms, and/or logic (e.g., complex logic) that can be employed to facilitate controlling operations of the PTDG. The new rules, algorithms, and/or logic can be sequentially added in the platform for use by the CEP module 528 and/or other components of the GGSP, for example, after validation and/or user acceptance of the rules, algorithms, and/or logic.

In still another aspect, the GDPC 502 can perform a post mortem analysis regarding an event(s) (e.g., abnormal condition, fault, etc.) associated with the PTDG. The GDPC 502 can collect power system related data (e.g., a subset of correlated power system related data) over a specified time period to facilitate identifying phenomena, behaviors, or events, which have or may have occurred on the PTDG. The GDPC 502 can employ (e.g., execute) component models (e.g., PTDG equipments models) to simulate the PTDG components that were employed in the PTDG during various times of the specified time period; replay a sequence of events, network studies, oscillation characteristics, etc., associated with the portion of the PTDG for which the post mortem analysis is being performed; and utilize the CEP module 528, RCA module 524, or another component(s) associated with the GDPC 502 to perform the post mortem analysis of the event(s) associated with the PTDG over the specified time period, identify one or more remedial actions to execute based at least in part on the results of the post mortem analysis, or identify operation or maintenance guidance (e.g., new or modified operation or maintenance rules) based at least in part on the results of the post mortem analysis, in accordance with the predefined power system control criteria.

For example, in performing a post-mortem review relating to a low frequency oscillation, the GDPC 502 can obtain information desired to perform the post mortem review, wherein the information can be, for example, phasor data, PTDG topology, sequence of events that have occurred relating to the PTDG, protection settings, from the DIH. The GDPC 502 can access the OSS and execute an oscillatory stability analysis (e.g., offline), and, in parallel, can process sequence-of-events data to identify a source location of the low frequency oscillations. Employing model-based OSS analysis, the GDPC 502 can identify and validate one or more remedial actions that can be implemented to rectify the detected low frequency oscillations. The GDPC 502 also can analyze any impacts on the protection settings. The GDPC 502 can provide (e.g., publish) the one or more remedial actions for automatic implementation by the GGSP or for operator guidance of the end user.

In accordance with yet another aspect, the system 500 can include a DIH 530 that can receive, collect, aggregate, and/or correlate data, such as data obtained from one or more data sources, associated with the GGSP, wherein the DIH 530 can comprise the same or similar functionality as more fully disclosed herein. The DIH 530 can be associated with (e.g., communicatively connected to) the EHMDR module 518, EPM module 520, EDPM module 522, RCA module 524, RPA module 526, and/or other components associated with the GGSP. The DIH 530 also can be associated with a data store 532, which can be a data repository that can store real-time and historical data, such as power system related data, relating to the PTDG. The data stored in the data store 532 can be correlated, as more fully disclosed herein, to facilitate controlling operations and power transmission and distribution for the PTDG in real or at least near real time.

In another aspect, the system 500 can include a bus component 534 (e.g., Enterprise Service Bus) that can comprise one or more buses, which can be utilized to interface the GDPC 502 with other components, such as, for example, the GRC or EAMC, and/or can receive data from or transmit data to components (e.g., data sources 204 or 206) associated with the GGSP and transfer data between components (e.g., GRC, GDPC 502, EAMC, etc.) of the GGSP. The bus component 534 can employ a high-speed data bus(es) to facilitate quick data transfers, for example, at a second, subsecond or millisecond-order rate, to facilitate real time or at least near real time control of the PTDG. In still another aspect, the system 500 can comprise a data bus 536 that can be employed to interface the data sources (e.g., 504, 506, 508, 510, 512, 514, 516) with the DIH 530 and/or data store 532 to facilitate collection and storage of data, such as power system related data.

Figure 6:
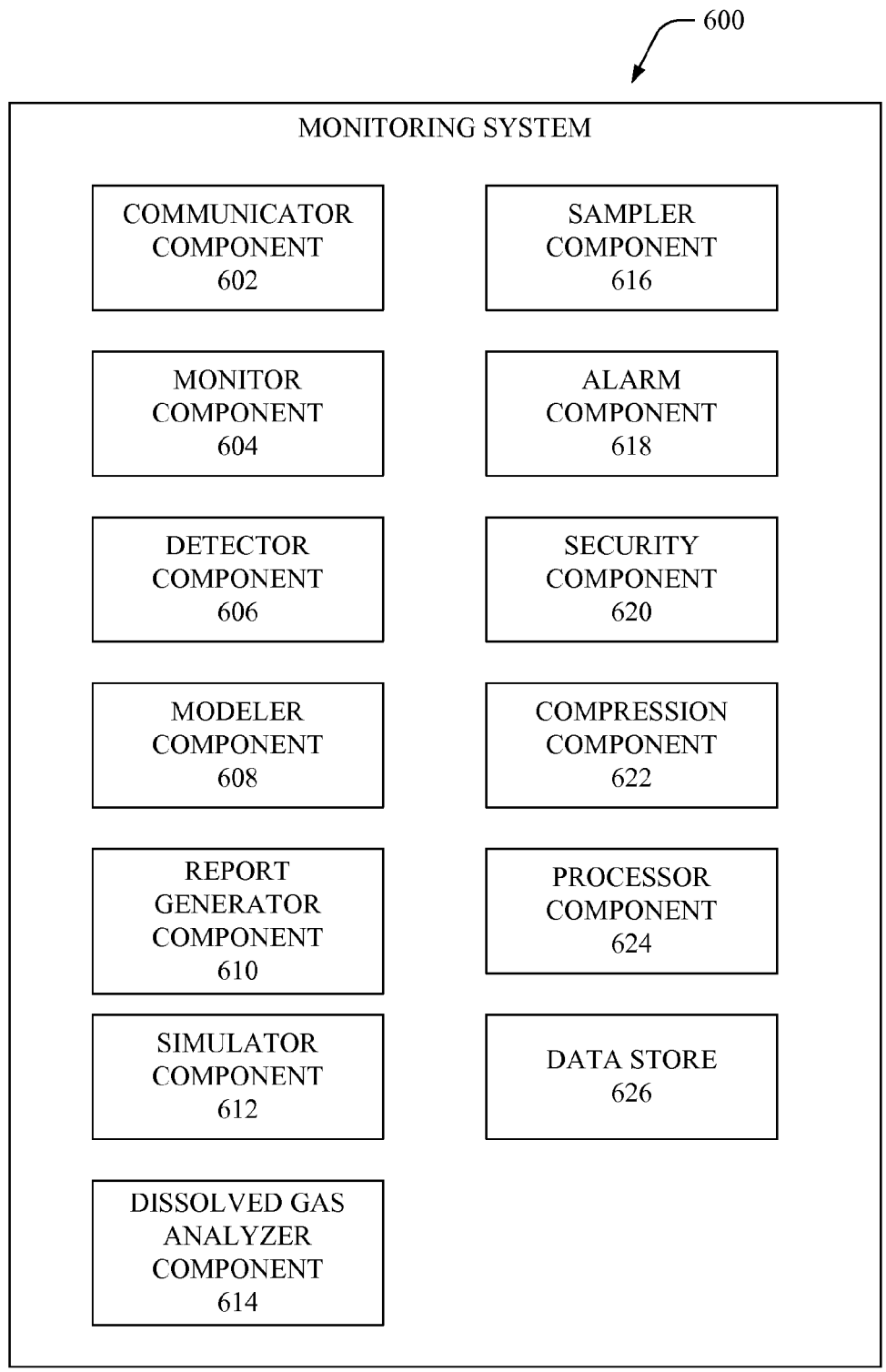
FIG. 6 depicts a block diagram of an example system that can facilitate monitoring and collecting power system related data associated with a PTDG in accordance with various aspects and embodiments of the disclosed subject matter.

FIG. 6 illustrates a block diagram of an example system 600 that can facilitate monitoring and collecting power system related data associated with a PTDG (e.g., a transformer in the PTDG) in accordance with various aspects and embodiments of the disclosed subject matter. The system 600 can be a system that can be employed to monitor one or more power system components, such as a power transformer, in a PTDG. In an aspect, the system 600 can comprise a communicator component 602 that can receive data, such as power system related data, relating to a power system component or can transmit data to a desired destination, such as the GGSP. The communicator component 602 can communicate via a wireline or wireless communication connection, in accordance with a specified communication protocol, as more fully disclosed herein.

The system 600 also can include a monitor component 604 that can monitor conditions (e.g., power transmission and distribution, power conditions, faults, etc.) associated with a power system component(s). In another aspect, the system 600 can contain a detector component 606 that can sense, detect, or identify information, such as information relating to (e.g., power transmission and distribution, power conditions, faults, etc.), associated with the power system component(s). The system 600 can monitor, detect, and/or measure, for example, information relating to operating voltage(s) (e.g., single phase, multi-phase), load current(s) (e.g., single phase, multi-phase), apparent power and load factor, oil temperature, oil level, hot-spot temperature, busing power factor, transformer power factor, transformer efficiency, bottom oil temperature, module temperature, gas quantity and rate (e.g., in Buchholz relay), gas-in-oil content, moisture-in-oil content, aging rate, humidity of air inside conservator, air pressure, cooling power, intake and outlet cooling equipment temperatures, differences of intake and outlet temperatures, automatic voltage regulator (AVR), control of cooling equipment, digital status information, on-load tap changer position, number of switching operations, the sum of switched load current, operating conditions of pumps and fans, cooling efficiency, ambient temperature, auxiliary digital inputs, accelerations (e.g., tank wall, on-load tap changer (OLTC)), power consumption of the motor drive, OLTC oil temperature, assessment of mechanical quality, contact wear model, oil temperature difference OLTC/tank, overvoltages, number of overvoltages, change of capacitance, online capacitance, gas-in-oil gradient, moisture of paper, bubbling temperature and safety margin, lifetime consumption, predicted top oil temperature, predicted hot-spot temperature, breakdown voltage, overcurrents, short-circuit currents, number of overcurrents, overload capacity, emergency overloading time, thermal model, actual losses, etc., associated with a power system component, such as a power transformer.

In still another aspect, the system 600 can include a modeler component 608 that can model aspects of a power system component(s), such as, for example, a thermal model, aging model, tap changer model, moisture model, bushing model, overload model, cooling model, etc., associated with a power system component(s) being monitored by the system 600, to facilitate identifying conditions associated with the power system component(s) and/or generating power system related data associated with the power system component(s). The modeling of the power system component(s) can facilitate monitoring operation of, and/or identifying service or maintenance for, the power system component(s).

In an aspect, the system 600 can comprise a report generator component 610 that can generate one or more reports relating to status information or protocols relating to the power system component(s) and its constituent components. The report generator component 610 can generate a report on command (e.g., from a user), automatically in response to a detected event(s), or periodically, wherein the report can be generated and provided (e.g., transmitted) to a desired destination (e.g., GGSP, a destination address such as an email address of an operator, etc.).

In still another aspect, the system 600 can include a simulator component 612 that can simulate external or internal events relating to the power system component(s), which can allow the system 600 or associated components (e.g., GGSP) to analyze and simulate behavior of the power system component(s), the system 600, and/or other components associated with the PTDG. In yet another aspect, the system 600 can contain a dissolved gas analyzer (DGA) component 614 that can analyze acquired dissolved gas data according to a specified protocol, method, or algorithm. The DGA component 614 can identify a risk classification for the dissolved gas data or can render other determinations based at least in part on the dissolved gas data associated with a power system component, such as a transformer.

In an aspect, the system 600 can comprise a sampler component 616 that can sample data, which relates to a power system component(s) being monitored, at a desired rate, for example, a subsecond rate or at a rate on the order of a second or more, as desired. The sampler component 616 can operate in conjunction with the monitor component 604 and detector component 606 to obtain data, such as power system related data.

In still another aspect, the system 600 can include an alarm component 618 that can generate and transmit one or more types of alarms to facilitate indicating or providing notice of an abnormal condition (e.g., fault, power system parameter outside of predefined threshold parameter value or range of parameter values, etc.) associated with the PTDG to the GGSP or other component or device, or an end-user (e.g., grid operator). The alarm can be a visual indicator, audio indicator, or another type of indicator (e.g., vibration) that is detectable via other senses (e.g., touch). There can be respective types of alarms for respective types of abnormal conditions detected by the system 600, wherein different types of alarms can result in the type of abnormal condition being more readily identifiable to the end-user or GGSP.

In yet another aspect, the system 600 can contain a security component 620 that can employ one or more security and authentication protocols or algorithms to facilitate securing data, including securing access to data, obtained by the system 600. For example, a user or component (e.g., GGSP) attempting to gain access to the data stored by the system 600 can be required to submit valid authentication credentials in order to gain access to the system 600, wherein the access rights granted can vary based at least in part on the level of access permitted in accordance with the particular authentication credentials presented. In another aspect, the security component 620 also can encrypt data being stored by the system 600 and/or data transmitted to another component (e.g., GGSP), in accordance with a specified cryptographic algorithm (e.g., encryption/decryption algorithm, such as data encryption standard (DES)-type algorithms, advanced encryption standard (AES)-type algorithms, symmetric key algorithms, etc.); and can decrypt data received from another component in accordance with a specified cryptographic algorithm. In still another aspect, the security component 620 can employ anti-tamper techniques to maintain the integrity of the components and data of the system 600, prevent or resist unauthorized access of data contained in the system 600, and/or generate and send a tamper indicator to a desired entity (e.g., GGSP, end-user) in response to detecting a tamper event (e.g., an attempt to tamper with or gain unauthorized access to the system 600).

In accordance with an aspect, the system 600 can include a compressor component 622 that can compress or decompress data (e.g., a subset of data) being transmitted to or received from another component (e.g., GGSP; communication node, such as an ECM, associated with a CCN), in accordance with a specified compression/decompression algorithm(s) (e.g., lossless compression algorithms, such as Lempel-Ziv (LZ) compression algorithm, LZ-Renau (LZR) compression algorithm, Huffman coding, DEFLATE, etc.; lossy compression algorithms, such as Mu-law Compander, A-law Compander, Modulo-N code, etc.), to facilitate reducing the amount of data bits being communicated thereby easing the communication load on the communication channel(s) between the system 600 and the component with which the system 600 is communicating; encrypt data transmitted or decrypt data received from a DNNC component (e.g., 322 or 324) or other component, in accordance with a specified cryptographic algorithm(s) and protocols (e.g., data encryption standard (DES)-type algorithms, advanced encryption standard (AES)-type algorithms, symmetric key algorithms, etc.). In another aspect, the communicator component 602, security component 620, and/or compressor component 622 can employ desired data redundancy to facilitate recovery of data in case of data corruption.

In yet another aspect, the system 600 also can comprise a processor component 624 that can operate in conjunction with the other components (e.g., communicator component 602, monitor component 604, detector component 606, etc.) to facilitate performing the various functions of the system 600. The processor component 624 can employ one or more processors, microprocessors, or controllers that can process data, such as information relating to the power system, control information, information (e.g., rules, algorithms) relating to power system control criteria, information (e.g., power condition related data, measurement data, data analysis information, sensed information, and/or power system warning indicators, etc.), security and/or authentication related information, data compression related information, information to facilitate interfacing the system 600 with an associated component (e.g., GGSP, PDS (e.g., transformer), and/or ECM, etc.), information relating to other operations of the system 600, and/or other information, etc., to facilitate operation of the system 600, as more fully disclosed herein, and control data flow between the system 600 and other components (e.g., GGSP, PDS and/or ECM, etc.) associated with the system 600.

The system 600 also can include a data store 626 that can store data structures (e.g., user data, metadata), code structure(s) (e.g., modules, objects, hashes, classes, procedures) or instructions, information relating to the power system, control information, information (e.g., rules, algorithms) relating to power system control criteria, information (e.g., power condition related data, measurement data, data analysis information, sensed information, and/or power system warning indicators, etc.), security and/or authentication related information, data compression related information, information to facilitate interfacing the system 600 with an associated component (e.g., GGSP, PDS (e.g., transformer), and/or ECM, etc.), information relating to other operations of the system 600, etc., to facilitate controlling operations associated with the system 600. In an aspect, the processor component 624 can be functionally coupled (e.g., through a memory bus) to the data store 626 in order to store and retrieve information desired to operate and/or confer functionality, at least in part, to the components of the system 600 (e.g., communicator component 602, monitor component 604, detector component 606, etc.), and/or substantially any other operational aspects of the system 600.

Figure 7:
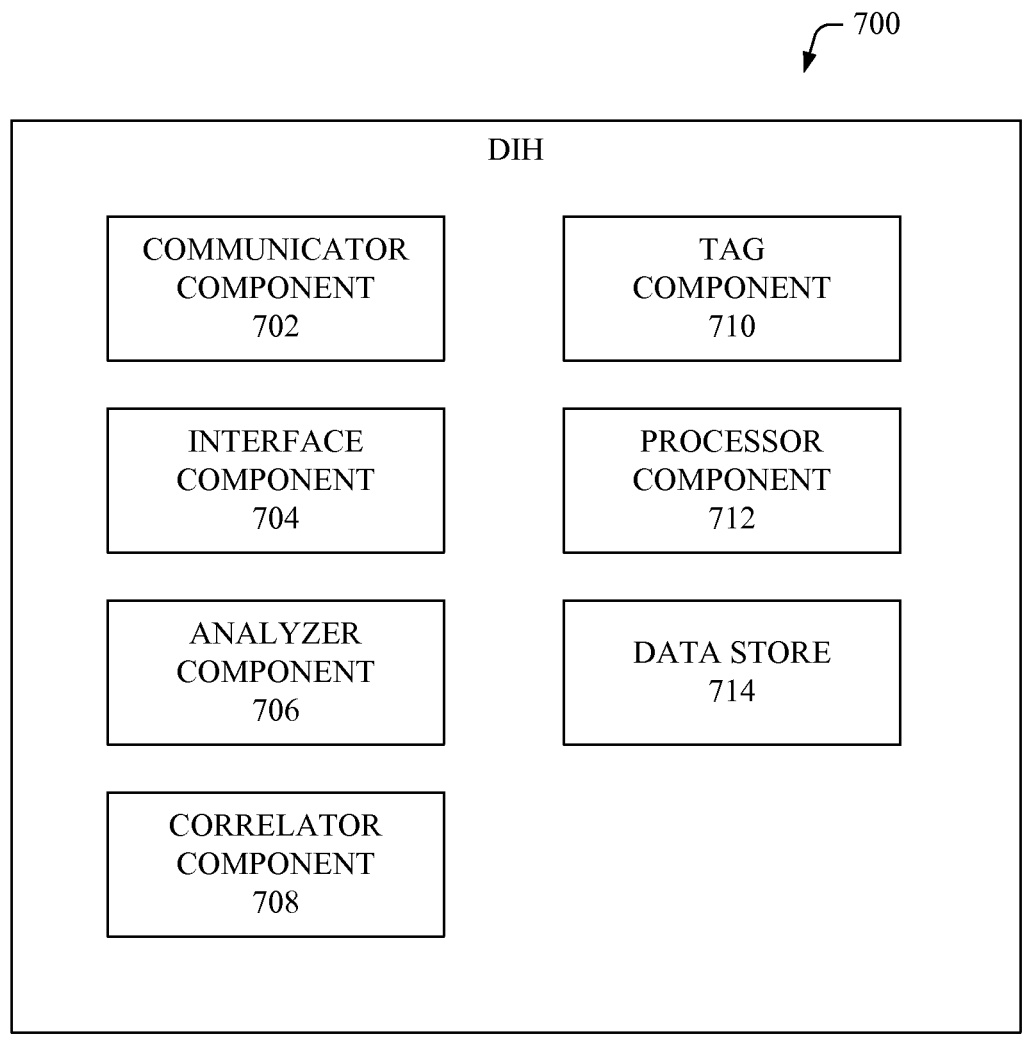
FIG. 7 depicts a block diagram of an example data information hub (DIH) in accordance with various aspects and embodiments.

FIG. 7 depicts a block diagram of an example DIH 700 in accordance with various aspects and embodiments. In an aspect, the DIH 700 can comprise a communicator component 702 that can receive data, such as power system related data, relating to a power system component from, for example, a data source (e.g., sensor, PMU, ECM, etc.) or can transmit data to a desired destination, such as another component of the GGSP, a data source, etc. In another aspect, the DIH 700 can include an interface component 704 that can include and/or provide various adapters, connectors, controls, channels, ports, communication paths, etc., to integrate the DIH 700 into the GGSP and/or enable the DIH 700 to interface and communicate with other components of the GGSP.

In still another aspect, the DIH 700 can contain an analyzer component 706 that can analyze data, such as power system related data, to facilitate correlating the data, in accordance with the predefined power system control criteria. The analyzer component 706 can operate in conjunction with a correlator component 708 to analyze the data to identify respective characteristics of the data (e.g., time associated with the data (e.g., time the data was obtained), type of data, location from which the data was obtained or to which the data relates, topological information relating to the data, event(s) with which piece of data is associated, data tags, other metadata, etc.) to enable the correlator component 708 to correlate the data based at least in part on the respective characteristics of the respective pieces of data and the predefined power system control criteria. The respective pieces of correlated data can be associated with (e.g., tagged with, linked with, mapped to) each other and/or can be included in a respective subset of data when specified by the predefined power system control criteria. The predefined power system control criteria (and corresponding rules) can relate to, for example, time associated with the data (e.g., time the data was obtained) (e.g., temporal axis), type of data, location from which the data was obtained or to which the data relates (e.g., locational axis), topological information relating to the data (e.g., topological axis), event(s) with which piece of data is associated, data tags associated with respective pieces of data, other metadata, type of analysis to be performed on the data, etc.

For example, respective pieces of data associated with a power system event(s) (e.g., a detected abnormal condition), which can be obtained from one or more data sources, can be correlated with each other. Pieces of data can be tagged with a time stamp, location tag, topological tag, and/or other identifier, to facilitate indicating that such respective pieces of data are or may be related to the power system event(s) under evaluation. This data correlation can facilitate retrieving this correlated data at a desired time, for example, to perform a root cause analysis or another analysis on the data to facilitate controlling PTDG operations and power transmission and distribution in the PTDG. For instance, in accordance with particular power system control criteria, it can be desirable to retrieve and analyze respective pieces of data correlated with each other based at least in part on such pieces of data being generated by a data source(s) in temporal proximity to the power system event; additionally or alternatively, it can be desirable to retrieve and analyze respective pieces of data that were obtained from respective data sources monitoring respective pieces of PTDG equipment that are related to the power system event (e.g., impacted by the power system event, associated with the location of and/or a piece of PTDG equipment associated with the power system event, etc.).

In yet another aspect, the DIH 700 can comprise a tag component 710 that can identify respective data tags (e.g., type of data tag, information contained in or indicated by the data tag) associated with respective pieces of data, and/or can tag data, to facilitate correlating data, in accordance with the predefined power system control criteria. A data tag can be stored with a piece of data and/or can be associated with (e.g., linked or mapped to) the piece of data.

In an aspect, the DIH 700 can include a processor component 712 that can operate in conjunction with the other components (e.g., communicator component 702, interface component 704, analyzer component 706, etc.) to facilitate performing the various functions of the DIH 700. The processor component 712 can employ one or more processors, microprocessors, or controllers that can process data, such as information relating to the power system, control information, information (e.g., rules, algorithms) relating to power system control criteria, information (e.g., power condition related data, measurement data, data analysis information, sensed information, and/or power system warning indicators, etc.), information to facilitate interfacing the DIH 700 with an associated component (e.g., component of the GGSP, component or device connected to the GGSP, etc.), information relating to other operations of the DIH 700, and/or other information, etc., to facilitate operation of the DIH 700, as more fully disclosed herein, and control data flow between the DIH 700 and other components (e.g., other components in the GGSP, components or devices connected to the GGSP, etc.) associated with the DIH 700.

The DIH 700 also can include a data store 714 that can store data structures (e.g., user data, metadata), code structure(s) (e.g., modules, objects, hashes, classes, procedures) or instructions, information relating to the power system, control information, information (e.g., rules, algorithms) relating to power system control criteria, information (e.g., power condition related data, measurement data, data analysis information, sensed information, and/or power system warning indicators, etc.), information to facilitate interfacing the DIH 700 with an associated component (e.g., component of the GGSP, component or device connected to the GGSP, etc.), information relating to other operations of the DIH 700, etc., to facilitate controlling operations associated with the DIH 700. In an aspect, the processor component 712 can be functionally coupled (e.g., through a memory bus) to the data store 714 in order to store and retrieve information desired to operate and/or confer functionality, at least in part, to the components of the DIH 700 (e.g., communicator component 702, interface component 704, analyzer component 706, etc.), and/or substantially any other operational aspects of the DIH 700.

Figure 8:
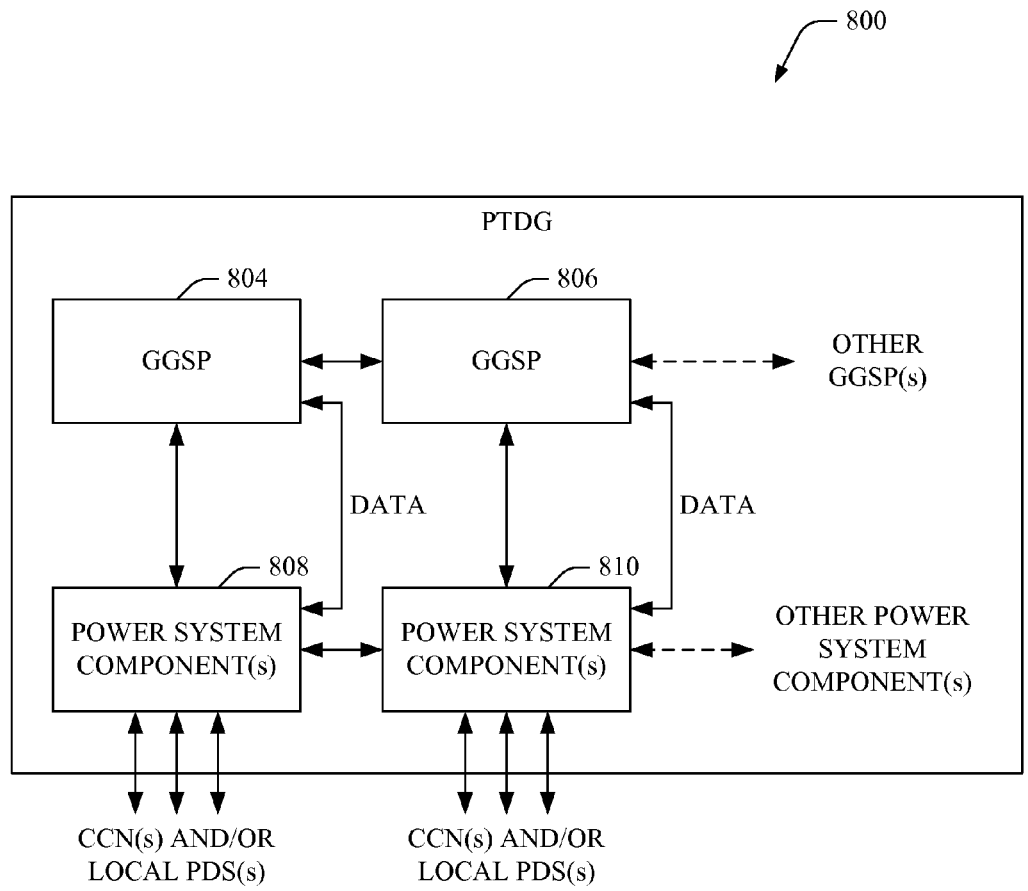
FIG. 8 depicts a block diagram of an example system that can employ a specified number of GGSPs in a modular and de-centralized manner to facilitate controlling operations in and power transmission and distribution by respective PTDG portions of a PTDG in accordance with various aspects and embodiments.

FIG. 8 depicts a block diagram of an example system 800 that can employ a specified number of GGSPs in a modular and de-centralized manner to facilitate controlling operations in and power transmission and distribution by respective PTDG portions of a PTDG in accordance with various aspects and embodiments. In an aspect, a PTDG 802 can comprise a specified number (e.g., 1, 2, 3, or more, as desired) of GGSPs, such as a first GGSP 804 and a second GGSP 806, each of which can be the same or similar as and/or can comprise the same or similar functionality as respective components (e.g., GGSP), as more fully disclosed herein. It is to be appreciated and understood that, for brevity and clarity, only the first GGSP 804 and second GGSP 806 are shown in FIG. 8. In an aspect, the first GGSP 804 and second GGSP 806 can be associated with (e.g., electrically and/or communicatively connected to or interfaced with) each other to facilitate communication of information (e.g., control information, power system related data, etc.) between the first GGSP 804 and second GGSP 806 to facilitate controlling operations and power transmission and distribution in the respective portions of the PTDG 802 controlled by the respective GGSPs 804 and 806.

In accordance with other aspects, the first GGSP 804 can be associated with (e.g., electrically and/or communicatively connected to or interfaced with) a first plurality of power system components 808 and the second GGSP 804 can be associated with a second plurality of power system components 810, wherein the respective pluralities of power system components 808 and 810 each can be the same or similar as and/or can comprise the same or similar functionality as a respective plurality of power system components, as more fully disclosed herein. At least a portion of the first plurality of power system components 808 can be associated with at least a portion of the second plurality of power system components 810, for example, to facilitate distributing power to facilitate transmission of power and/or information between the first plurality of power system components 808 and the second plurality of power system components 810 to facilitate desired operation in the PTDG 802 and desired power transmission and distribution by the PTDG 802 to one or more CCNs respectively associated with the first PTDG portion and second PTDG portion, as well as desired interaction with (e.g., receiving power from, monitoring and tracking the amount of power received from, controlling power received from, etc.) one or more local or distributed power sources associated with the PTDG 802.

Figure 9:
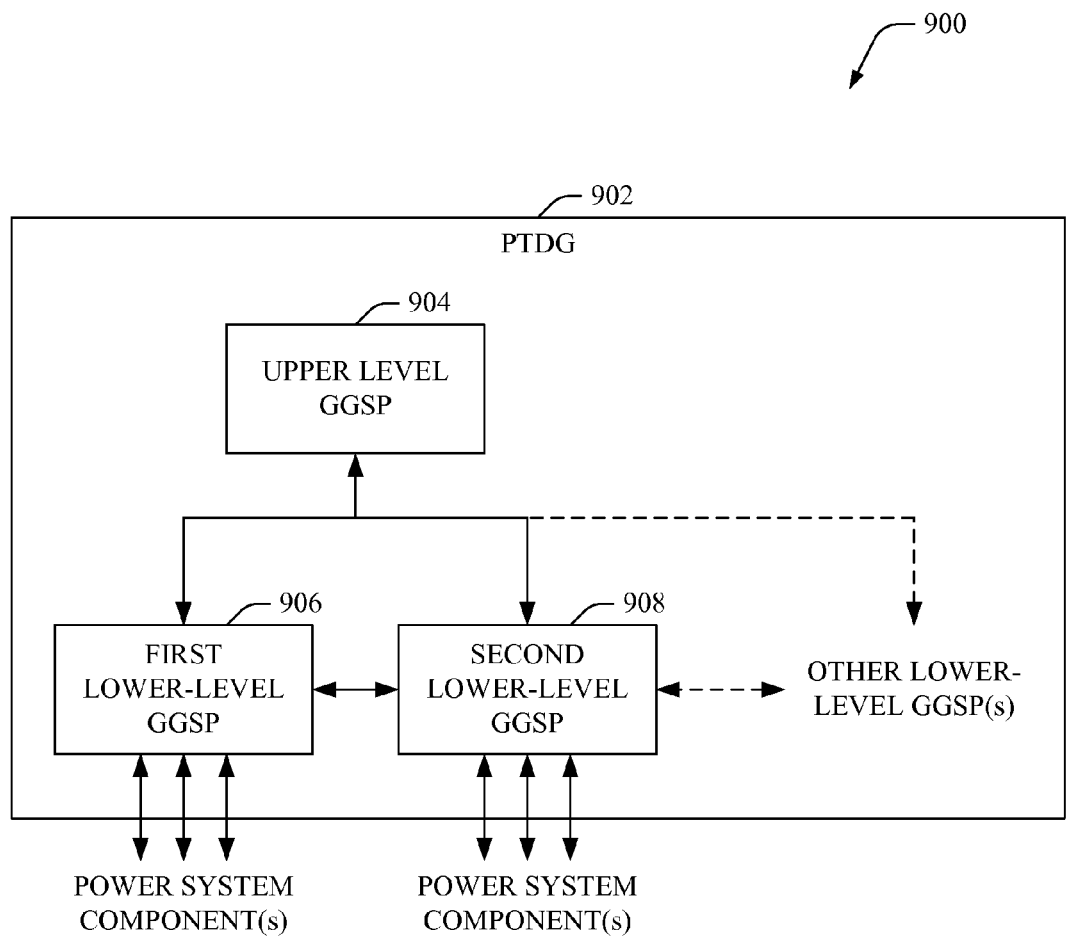
FIG. 9 illustrates a block diagram of an example system that can that can employ a specified number of GGSPs in a modular and hierarchical manner to facilitate controlling operations in and power transmission and distribution by respective PTDG portions of a PTDG in accordance with various aspects and embodiments.

FIG. 9 illustrates a block diagram of an example system 900 that can that can employ a specified number of GGSPs in a modular and hierarchical manner to facilitate controlling operations in and power transmission and distribution by respective PTDG portions of a PTDG in accordance with various aspects and embodiments. In an aspect, a PTDG 902 can comprise a specified number (e.g., 1, 2, 3, or more, as desired) of GGSPs, such as an upper level GGSP 904, a first lower-level GGSP 906 and a second lower-level GGSP 908, each of which can be the same or similar as and/or can comprise the same or similar functionality as respective components (e.g., GGSP), as more fully disclosed herein. It is to be appreciated and understood that, for brevity and clarity, only the upper level GGSP 904, first lower-level GGSP 906 and second lower-level GGSP 908 are shown in FIG. 9, and in accordance with other embodiments, there can be more than one upper level GGSPs and/or more than two lower level GGSPs, as desired.

In an aspect, the upper level GGSP 904 can be located in a higher level in a multi-tier hierarchy of the PTDG 902, and the first lower-level GGSP 906 and second lower-level GGSP 908 can be located in a lower level of the multi-tier hierarchy of the PTDG 902. While the disclosed subject matter is described as a two-level hierarchy, the disclosed subject matter is not so limited, as there can be virtually any desired number of different levels in the multi-tier hierarchy. For example, there can be one or more other lower levels that are lower than the lower level containing the first lower-level GGSP 906 and second lower-level GGSP 908, and/or one or more other upper levels that are higher than the upper level containing the upper level GGSP 904, wherein each hierarchical level can comprise one or more GGSPs.

In another aspect, a higher level GGSP can control, at least partially, operations of a lower level GGSP(s) (and associated power system components) that is associated with the higher level GGSP. For example, the upper level GGSP 904 can control, at least partially, the first lower-level GGSP 906 and operations in and power transmission and distribution by the first PTDG portion controlled by the first lower-level GGSP 906, and the second lower-level GGSP 908 and operations in and power transmission and distribution by the second PTDG portion controlled by the second lower-level GGSP 908.

In still another aspect, the first lower-level GGSP 906 can receive data from one or more data sources (e.g., power system components) associated with the first lower-level GGSP 906, and the second lower-level GGSP 908 can receive data from one or more data sources associated with the second lower-level GGSP 908, wherein the respective lower-level GGSPs 906 and 908 can analyze the respectively received data to facilitate controlling operations in and power transmission and distribution by the respective PTDG portions controlled by GGSPs 906 and 908. In yet another aspect, to facilitate controlling the PTDG 902, while controlling (e.g., minimizing) the amount of data communicated between levels of the multi-level hierarchy of the PTDG 902, the lower level GGSPs (e.g., 906, 908) can identify and select a subset of data collected by the respective lower-level GGSPs for communication to the upper level GGSP 904. For instance, the subset of data can comprise a portion (e.g., lesser portion) of the data obtained or produced (e.g., generated as a result of data analysis) by the respective lower-level GGSPs to enable the upper level GGSP 904 to perform higher level control of the PTDG 902, while the respective sets of data obtained or produced by the respective lower-level GGSPs can be utilized (e.g., analyzed or otherwise processed) by the respective lower-level GGSPs to facilitate controlling the respective PTDG portions of the PTDG 902 by the lower-level GGSPs while minimizing the amount of input and control from the upper level GGSP 904.

Figure 10:
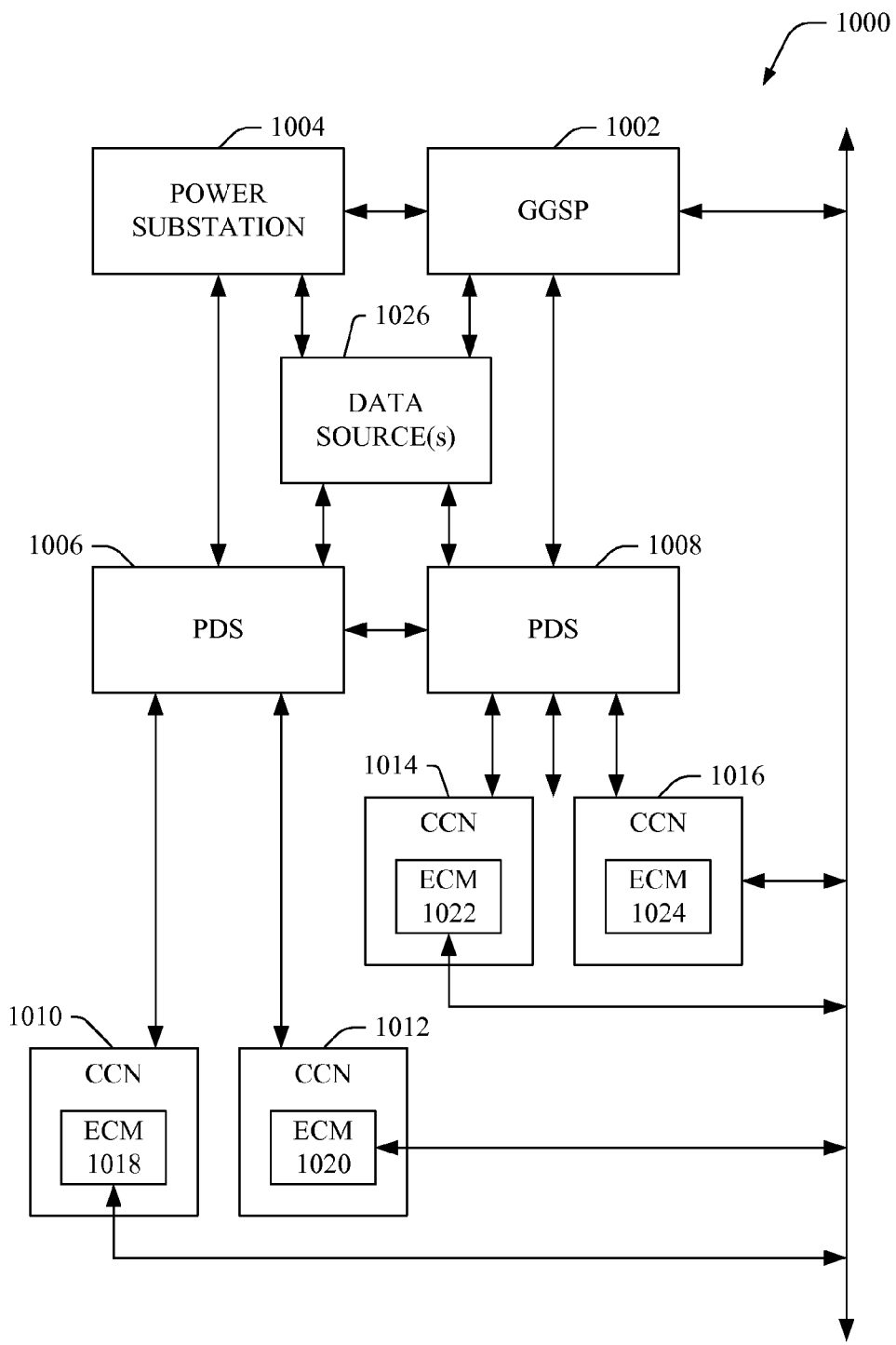
FIG. 10 depicts a block diagram of an example system that can control operations and power transmission and distribution in a PTDG in accordance with various aspects and embodiments of the disclosed subject matter.

FIG. 10 depicts a block diagram of an example system 1000 that can control operations and power transmission and distribution in a PTDG in accordance with various aspects and embodiments of the disclosed subject matter. In an aspect, the system 1000 can include a GGSP 1002 that can be utilized to control operations and power transmission and distribution, analyze power system related data, identify and implement remedial actions, etc., for at least a portion of a PTDG, as more fully disclosed herein.

In another aspect, the system 1000 can include a power substation 1004 that can be employed to transmit and distribute power in the PTDG. For instance, the power substation 1004 can be utilized to transmit and distribute power to a desired number of PDSs, such as PDS 1006 and PDS 1008, connected to the power substation 1004 in the PTDG. For example, the power substation 1004 can receive power from a primary power station (e.g., a power generator) (not shown) at a higher voltage level and can transform (e.g., step down) the higher voltage of the power to a lower voltage level, and can transmit and distribute the power at a lower voltage level to the PDSs (e.g., 1006, 1008), which can transform (e.g., step down) the voltage even further for transmission and distribution to one or more CCNs, such as CCN 1010, CCN 1012, CCN 1014, and CCN 1016, wherein CCNs 1010 and 1012 can be connected (e.g., electrically and/or communicatively connected) to the PDS 1006 and CCNs 1014 and 1016 can be connected to the PDS 1008. In an aspect, the power substation 1004 can be associated with (e.g., communicatively interfaced with) the GGSP 1002 to facilitate enabling the GGSP 1002 to control power transmission and distribution, and operations by the power substation 1004 in the PTDG.

The respective CCNs 1010, 1012, 1014, and 1016 can comprise ECMs 1018, 1020, 1022, and 1024, which can be connected (e.g., communicatively) to the GGSP 1002 via respective wireline or wireless communication connections, such as more fully disclosed herein. An ECM can generate and provide information relating to power consumption, power generation (e.g., when the CCN is connected to a local power source, such as solar power generation system, wind power generation system, geothermal power generation system, hydroelectric power generation system, diesel-type power generation system, power storage component (e.g., battery(ies) associated with a local power generation system, battery(ies) of a plug-in electric vehicle (PEV) or a plug-in hybrid electric vehicle (PHEV)), etc.), detected abnormal condition, etc., and/or can receive information (e.g., power system control information) from the GGSP 1002. The information can be generated and/or sent by the ECM on a minute, second, or subsecond rate, as desired.

In still another aspect, the system 1000 can include one or more data sources 1026 that can be associated with (e.g., interfaced with) one or more PDSs (e.g., 1006, 1008), the GGSP 1002, and/or other components (e.g., power transmission lines, ECMs, etc.) in the PTDG. The one or more data sources 1026 can obtain (e.g., sample, measure, sense, etc., at a subsecond rate or at a rate on the order of a second or more, as desired) information relating to power transmission and distribution (e.g., power conditions, abnormal conditions, etc.), PTDG operations, etc., and can transmit at least a subset of such information to the GGSP 1002 in real time or at least near real time, wherein the GGSP 1002 can process or analyze the subset of information to facilitate controlling operations and power transmission and distribution in the PTDG in real time or at least near real time, as more fully disclosed herein.

Figure 11:
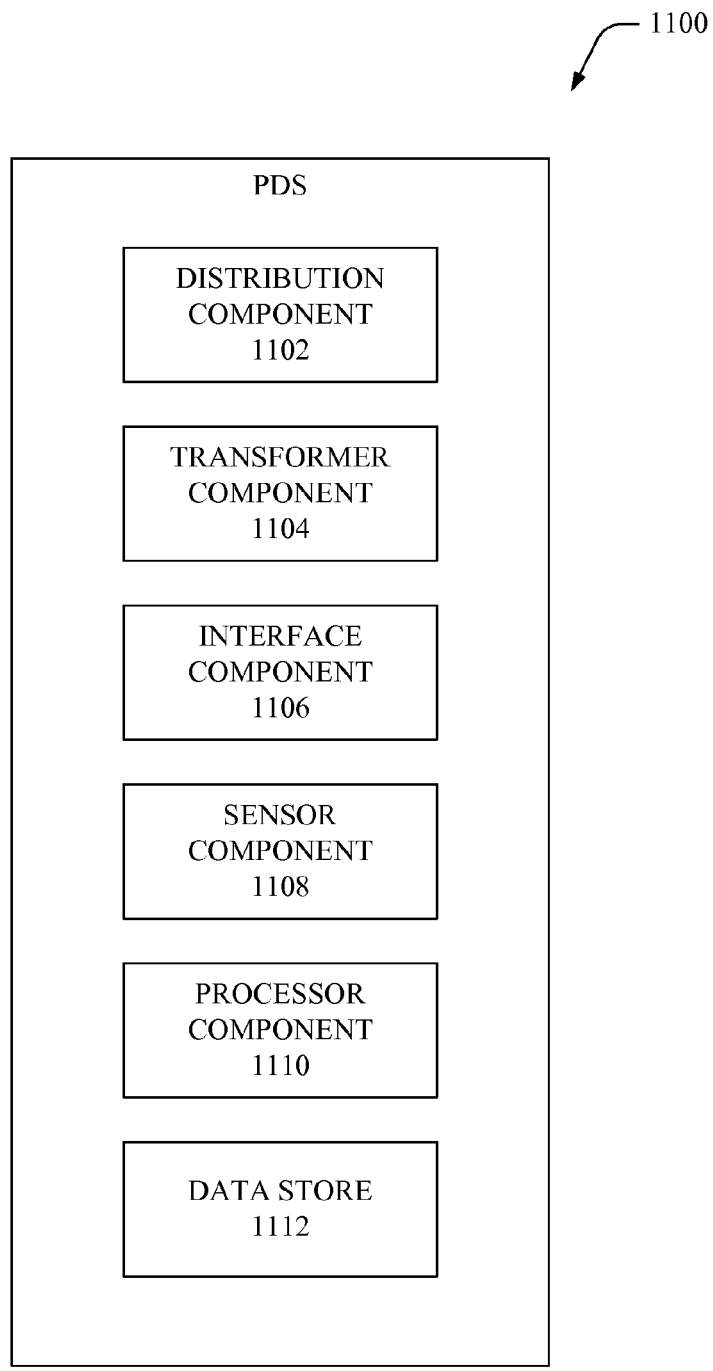
FIG. 11 illustrates a block diagram of an example power distribution source (PDS) in accordance with various aspects of the disclosed subject matter.

FIG. 11 illustrates a block diagram of an example PDS 1100 in accordance with various aspects of the disclosed subject matter. In an aspect, the PDS 1100 can include a distribution component 1102 that can be employed to generate and/or distribute power to a PDS(s) or CCN(s) associated with the PDS 1100. In accordance with various embodiments, the PDS 1100 can be, for example, a power generation plant that generates and distributes power to one or more other PDSs that are lower in the PTDG hierarchy, a substation that distributes power to a power transformer, a power transformer that distributes power to a CCN associated therewith, or a local power generation source (e.g., solar, wind, or geothermal power generation system) associated with a CCN.

In another aspect, the PDS 1100 can contain a transformer component 1104 that can be used to convert voltage from a lower voltage level to a higher voltage level, or from a higher voltage level to a lower voltage level, depending on where the electric power is being distributed. For example, if the PDS 1100 is an upper level PDS, such as a power generation plant, the PDS 1100, using the transformer component 1104, can convert the generated power voltage level to a higher voltage level to facilitate efficient transmission of the power to another PDS lower in the hierarchy and closer to the end point (e.g., CCN). As another example, the PDS 1100 can be a lower level PDS that receives power having a higher voltage level from a PDS higher up in the hierarchy in the PTDG, and the transformer component 1104 can transform the higher voltage power to power having a lower voltage level that is suitable for the next destination (e.g., CCN) of the power.

In still another aspect, the PDS 1100 can comprise an interface component 1106 (I/F 1106) that can that can include and/or provide various adapters, connectors, controls, channels, ports, communication paths, etc., to integrate the PDS 1100 into virtually any PTDG, and enable the PDS 1100 to interface with other distribution nodes (e.g., PDSs) and control or communication nodes (e.g., GGSP), or consumer nodes (e.g., CCNs) in the PTDG. In addition, I/F 1106 can provide various adapters, connectors, controls, channels, ports, communication paths, etc., that can provide for interaction and/or communication with a processor component (e.g., 1108), and/or any other component (e.g., sensor(s)) associated with the PDS 1100.

In yet another aspect, the PDS 1100 can include a sensor component 1108 that can comprise one or more sensors that can be distributed at specified locations on, at or near the PDS 1100. The respective sensors can comprise, for example, sensors that can sense power-related conditions (e.g., sensor that measures the amount of power being distributed, power balance sensor, voltage level sensor, current level sensor, harmonic sensor, fault sensor, heat sensor, anti-tamper sensor, etc.) and sensors that can sense communication-related conditions relating to communications between the PDS 1100 and an associated GGSP, ECM, or another PDS. The sensors can be located, for example, on or near the PDS 1100, on or near power transmission lines associated with the PDS 1100, etc. The sensor component 1108 can generate signals, messages, notifications, flags, indicators, etc., that can be transmitted from the sensor component 1108 to the associated PSBC, associated GGSP, or other desired component for further processing, as more fully disclosed herein.

The PDS 1100 also can comprise a processor component 1110 that can operate in conjunction with the other components (e.g., distribution component 1102, transformer component 1104, I/F component 1106, sensor component 1108, etc.) to facilitate performing the various functions of the PDS 1100. The processor component 1110 can employ one or more processors, microprocessors, or controllers that can process data, such as information relating to power transmission and distribution, information to facilitate interfacing the PDS 1100 with an associated PSBC, DNNC component or junction node, information relating to or obtained from sensors, information relating to other operations of the PDS 1100, and/or other information, etc., to facilitate operation of the PDS 1100, as more fully disclosed herein, and control data flow between the PDS 1100 and other components (e.g., another PDS, a DNNC component, a PSBC, a junction node, an ECM, etc.) associated with the PDS 1100.

The PDS 1100 also can include a data store 1112 that can store data structures (e.g., user data, metadata), code structure(s) (e.g., modules, objects, hashes, classes, procedures) or instructions, information relating to power transmission and distribution, information to facilitate interfacing the PDS 1100 with an associated component (e.g., PSBC, DNNC component, junction node, etc.), information relating to or obtained from sensors, information relating to other operations of the PDS 1100, etc., to facilitate controlling operations associated with the PDS 1100. In an aspect, the processor component 1110 can be functionally coupled (e.g., through a memory bus) to the data store 1112 in order to store and retrieve information desired to operate and/or confer functionality, at least in part, to the components of the PDS 1100 (e.g., distribution component 1102, transformer component 1104, I/F component 1106, sensor component 1108, etc.), and/or substantially any other operational aspects of the PDS 1100.

In accordance with an embodiment of the disclosed subject matter, a design platform (not shown), for example, comprising an application programming interface(s) (API) (not shown), can be employed to enable application developers to develop additional controls that can be employed to facilitate controlling data communication, operations, and power transmission and distribution in the PTDG. For instance, an API can be utilized to create one or more desired custom controls that can be employed to facilitate data communication control, PTDG operation control, power transmission and distribution control, and/or functions of a GGSP in relation to a PTDG, wherein the custom control(s) created using an API can be made available for implementation in the PTDG via a desired format, such as a saved or downloadable file, CD-ROM, DVD-ROM, memory stick (e.g., flash memory stick), floppy disk, etc.

In accordance with another embodiment of the disclosed subject matter, one or more components (e.g., GGSP, data source, ECM, etc.) in the communication network environment can utilize artificial intelligence (AI) techniques or methods to infer (e.g., reason and draw a conclusion based at least in part on a set of metrics, arguments, or known outcomes in controlled scenarios) an automated response to perform in response to an inference(s); a type of power system remedial or correction action(s) to be performed; whether a request to overload a particular power system component(s) for a specified period of time is to be permitted or denied; a future result of taking a specified action in relation to the PTDG; an amount or a type of data that is to be included in a data communication between a data source and a GGSP; a parameter value relating to power transmission and distribution, or data communications; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with various aspects and embodiments, the subject specification can be utilized in wireless, wired, and converged (e.g., wireless and wired) communication networks. For example, the disclosed subject matter can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methodologies that can be implemented in accordance with the disclosed subject matter can be better appreciated with reference to flowcharts in FIGS. 12-25. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a method in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 12:
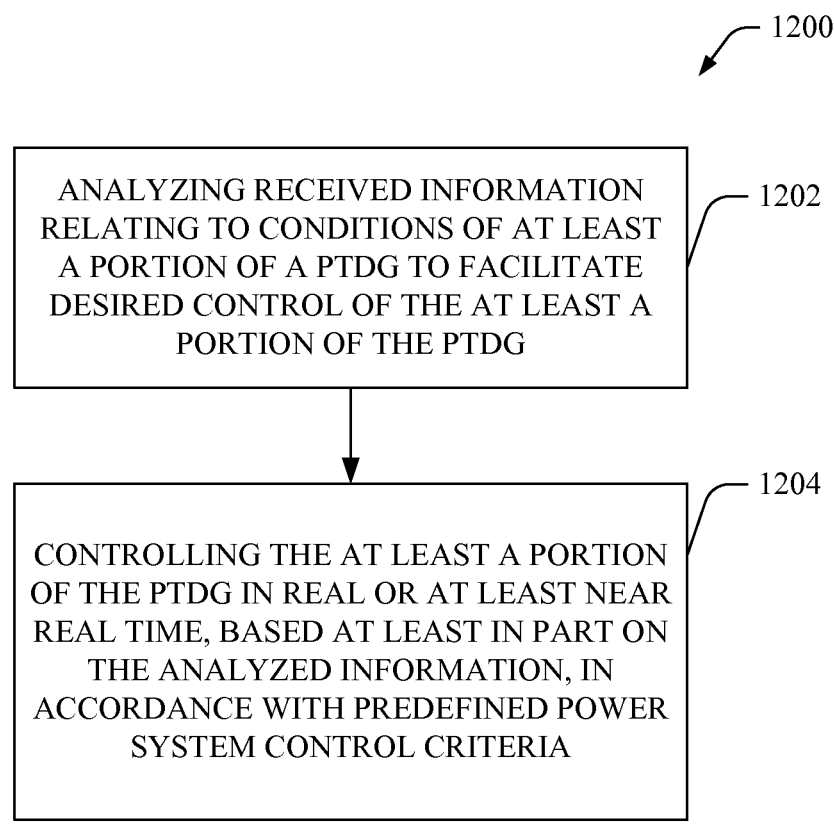
FIG. 12 illustrates a diagram of a flowchart of an example method that can facilitate enhanced control of a PTDG in accordance with various aspects and embodiments of the disclosed subject matter.

FIG. 12 illustrates a diagram of a flowchart of an example method 1200 that can facilitate enhanced control of a PTDG in accordance with various aspects and embodiments of the disclosed subject matter. At 1202, received information relating to conditions of at least a portion of a PTDG can be analyzed to facilitate desired control of the at least a portion of the PTDG. The information can comprise data relating to operating conditions (e.g., power conditions, communication conditions, etc.) of the PTDG portion, an alert(s) (e.g., power system parameter that is outside of an acceptable threshold value or range of values) relating to the PTDG portion, pre-analyzed and/or synthesized data relating to the PTDG portion, etc., which can be obtained from one or more sensors distributed throughout the PTDG portion and/or other data sources associated with the GGSP that is employed to control the PTDG portion, such as more fully disclosed herein. The GGSP can analyze (e.g., perform an instant or current analysis on, perform a root cause analysis on, perform a predictive analysis on, perform a post mortem analysis on, etc.) the received information to facilitate rendering an assessment (e.g., dynamic assessment) of the performance of the PTDG portion, identifying (e.g., dynamically) a remedial or corrective action(s) (if any) to perform to correct any deficient condition relating to the PTDG portion, and/or identifying (e.g., dynamically) any other desired power-system related action to perform to facilitate controlling operation of the PTDG portion (e.g., power transmission and distribution, respective operation of pieces of PTDG equipment, maintenance and repair of PTDG equipment, etc.). In an aspect, the information relating to the PTDG portion can be generated in real time or at least near real time (e.g., at a subsecond rate, or at a rate on the order of a second or more, as desired), and the GGSP can analyze the received information in real time or at least near real time.

At 1204, the at least a portion of the PTDG can be controlled in real or at least near real time, based at least in part on the analyzed information, in accordance with predefined power system control criteria. In an aspect, based at least in part on the analysis of the received information, the GGSP can generate and transmit control information to one or more components of the PTDG portion to control the one or more components, in accordance with the predefined power system control criteria. In another aspect, the controlling of the PTDG portion (e.g., controlling of operations, power transmission and distribution) can be performed in real time or at least near real time.

For instance, the GGSP can dynamically identify a power system parameter, which is associated with a component in the PTDG portion, that is outside of an acceptable threshold parameter value or range of parameter values (e.g., maximum threshold parameter value, minimum threshold parameter value, maximum and minimum threshold parameter values), identify a remedial action that can correct the power system parameter, and generate and transmit control information to the component or an associated component to take corrective action at the component or associated component so that the power system parameter is modified (e.g., corrected) to a parameter value that is within the acceptable threshold parameter value or range of parameter values.

As another example, in relation to a fault or other unacceptable condition relating to the operation of the PTDG portion, the GGSP can perform a root cause analysis of the received information to identify the root cause of the fault or other unacceptable condition. For example, a fault or other unacceptable condition relating to operation of the PTDG portion can occur, wherein the fault or other unacceptable condition is or may be only a symptom or result of another problem with the PTDG portion that resulted in the observed fault or other unacceptable condition. The GGSP can perform a root cause analysis to analyze not only the data that directly indicated the fault or other unacceptable condition but also other data to identify the root cause (e.g., one or more of the primary causes) of the fault or unacceptable condition. The GGSP can identify a corrective action that can be performed to rectify the root cause of the fault or other unacceptable condition, and generate and/or transmit control information to one or more components of the PTDG portion to facilitate performance of the corrective action and/or directly perform the corrective action.

As yet another example, the GGSP can perform a predictive analysis on the received information to make a prediction regarding an expected outcome in a particular action is taken with regard to the PTDG portion. This can be performed, for example, in response to a request for such particular action. The predictive analysis can relate to, for instance, whether a particular component (e.g., transformer) in the PTDG portion can accommodate an increase in output or overload condition for a specified period of time without a fault or other undesired condition occurring, the amount of deterioration or damage the particular component is expected to experience as a result of such increase or overload action, the expected financial cost in permitting such increase or overload action, other cost/benefit analyses, etc. Based at least in part on the predictive analysis and the predefined power system control criteria, the GGSP can determine whether such increase or overload action is to be permitted or denied, and can generate and transmit corresponding control information to perform the increase or overload action or deny performance of such action.

Figure 13:
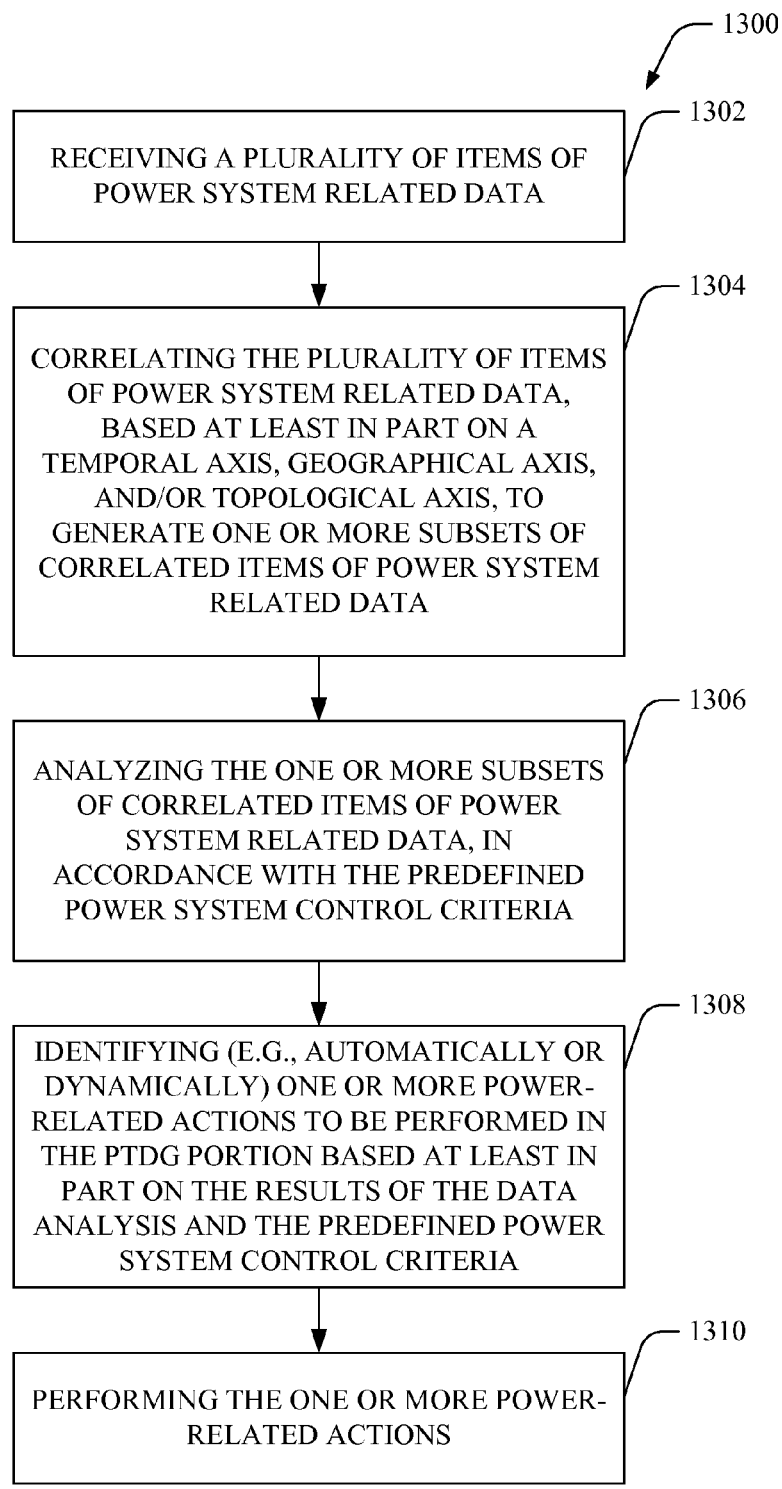
FIG. 13 depicts a diagram of a flowchart of an example method that can correlate data to facilitate identifying a power-related action(s) to be performed on at least a portion of a PTDG to facilitate desirably controlling operations of the PTDG in accordance with various aspects and embodiments of the disclosed subject matter.

FIG. 13 depicts a diagram of a flowchart of an example method 1300 that can correlate data to facilitate identifying a power-related action(s) to be performed on at least a portion of a PTDG to facilitate desirably controlling operations of the PTDG in accordance with various aspects and embodiments of the disclosed subject matter. At 1302, a plurality of items of power system related data can be received. For instance, the GGSP can receive a plurality of items of data from one or more data sources (e.g., power system components) associated with the PTDG portion. An item of data can comprise metadata that can indicate data properties, such as the date and time the data was obtained, the location from which the data was obtained, the data source that obtained the item of data, the power system component(s) to which the item of data pertains, and/or other metadata.

At 1304, the plurality of items of power system related data can be correlated, based at least in part on a temporal axis, geographical axis, and/or topological axis, to generate one or more subsets of correlated items of power system related data. For instance, a subset of respective items of data, of the plurality of items of data, can be correlated and/or aggregated in relation to each other because of a temporal relationship with each other (e.g., proximity in time of respective items of data), a locational relationship with each other (e.g., proximity of respective components associated with respective items of data), and/or a topological relationship with each other (e.g., association of respective power system components with each other, wherein the respective components are respectively associated with items of data). To facilitate correlating or aggregating the plurality of items of data, the plurality of items of data can be filtered in accordance with one or more filters (e.g., temporal filter, geographical filter, topological filter, etc.) that can be applied to the data items. As desired, a subset of filtered data items can be clustered together and/or stored in a file or file folder.

At 1306, the one or more subsets of correlated items of power system related data can be analyzed, in accordance with the predefined power system control criteria. For instance, the GGSP can analyze the one or more subsets of correlated items of data to facilitate identifying one or more power-related actions (if any) to be performed in the PTDG portion based at least in part on the results of the data analysis and the predefined power system control criteria.

At 1308, one or more power-related actions to be performed in the PTDG portion can be identified (e.g., automatically or dynamically) based at least in part on the results of the data analysis and the predefined power system control criteria. The one or more power-related actions can comprise, for example, generating an assessment (e.g., assessment of condition) of the operation health of the PTDG portion (or part of the PTDG portion), performing a dynamic stability analysis on the PTDG portion, performing a measurement-based stability analysis on the at least a portion of the PTDG portion, generating a diagnosis of an abnormal condition associated with the PTDG portion, generating and transmitting a command to remedy (e.g., correct) the abnormal condition associated with the PTDG portion, generating an alarm indicator relating to the abnormal condition, presenting the alarm indicator, and/or performing the remedial or corrective action(s) to remedy the abnormal condition, estimating or predicting the current or future state of the PTDG portion, simulating at least a portion of prior operations of the PTDG portion, simulating at least a portion of future operations of the PTDG portion to predict at least one scenario of operations of the PTDG portion over a specified period of time in the future under a specified subset of operating conditions, predicting the at least one scenario of operations of the PTDG portion over the specified period of time in the future under the specified subset of operating conditions, determining whether a requested overload condition on a piece of PTDG equipment is acceptable for the specified period of time, analyzing an equipment data file relating to at least the dynamic equipment rating of the piece of PTDG equipment, granting a request to operate the piece of PTDG equipment under an overload condition for the specified period of time when it is determined that the overload condition is acceptable, denying the request to operate the piece of PTDG equipment under the overload condition for the specified period of time when it is determined that the overload condition is not acceptable, performing a root cause analysis relating to the PTDG portion, performing a post mortem analysis relating to the PTDG portion, generating a remedial action execution plan for the PTDG portion, generating one or more operation guidelines to modify operation of the PTDG portion, and/or one or more other power-related action, as disclosed herein.

At 1310, the one or more power-related actions can be performed. For example, the GGSP can perform the one or more power-related actions and/or can generate and transmit control information to another component(s) (e.g., PDS) to facilitate performance of the one or more power-related actions.

Figure 14:
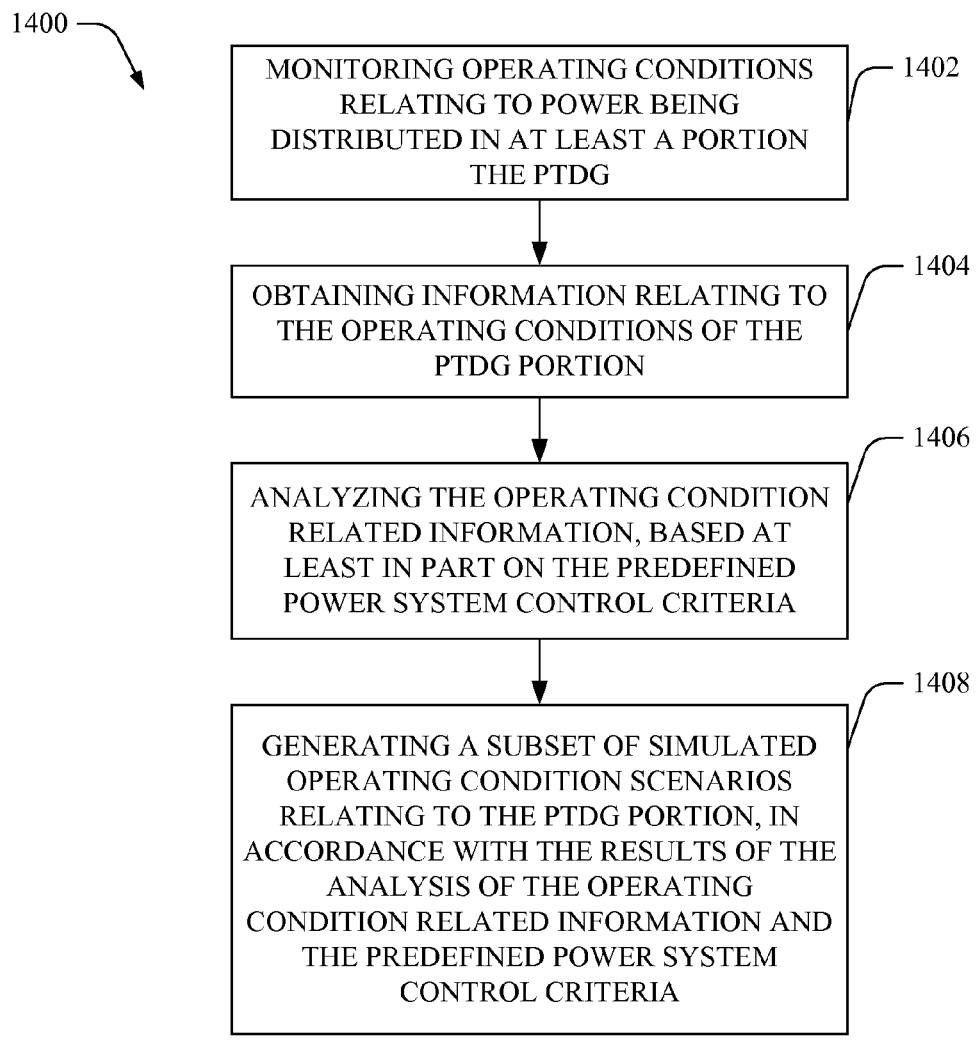
FIG. 14 depicts a diagram of a flowchart of an example method that can generate one or more simulated operation condition scenarios relating to at least a portion of a PTDG to facilitate desirably controlling operations of the PTDG in accordance with various aspects and embodiments of the disclosed subject matter.

FIG. 14 depicts a diagram of a flowchart of an example method 1400 that can generate one or more simulated operation condition scenarios relating to at least a portion of a PTDG to facilitate desirably controlling operations of the PTDG in accordance with various aspects and embodiments of the disclosed subject matter. At 1402, operating conditions (e.g., power conditions, communication conditions, etc.) relating to power (e.g., multi-phase power) being distributed in at least a portion the PTDG can be monitored. In an aspect, a control node (e.g., GGSP) can be employed to monitor and control power transmission and distribution in the PTDG portion. One or more power system components, which can be located in the PTDG portion controlled by the control node, can be monitored, for example, using one or more sensors that can be distributed to desired locations throughout the PTDG portion.

At 1404, power system related information relating to the operating conditions (e.g., power system related information) of the PTDG portion can be obtained. For instance, information relating to the operating conditions of the PTDG portion can be monitored and obtained from one or more sensors distributed throughout the PTDG portion, and/or one or more other data sources associated with the PTDG portion, in real time or at least near real time. The operating condition related information can be obtained or sampled at a desired level of granularity (e.g., each minute, each second, each millisecond, or at another desired periodic interval) to facilitate real time, or at least near real time, control of power transmission and distribution for that PTDG portion.

At 1406, the operating condition related information can be analyzed based at least in part on the predefined power system control criteria. For instance, the GGSP can analyze the obtained operating condition related information to facilitate generating one or more simulated operation condition scenarios relating to the PTDG, or portion thereof, in accordance with the predefined power system control criteria. The operating condition related information can comprise current and/or or historical information relating to the PTDG portion.

At 1408, a subset of simulated operating condition scenarios relating to the PTDG, or PTDG portion, can be generated, in accordance with the results of the analysis of the operating condition related information and the predefined power system control criteria. For example, the GGSP can generate one or more simulated operating condition scenarios relating to the PTDG, or PTDG portion, wherein the one or more simulated operating condition scenarios can include a best case simulated operating condition scenario, a worst case operating condition scenario, a most likely case operating condition scenario, and/or one or more simulated operating condition scenarios that can have various likelihoods of occurrence or various outcome scenarios. The subset of simulated operating condition scenarios can be employed to identify the predicted effect (e.g., result) of performing (or not performing) a power-related action(s) in relation to the PTDG portion, and/or to facilitate rendering decisions regarding whether to perform a power-related action(s) or a type(s) of power-related action(s) to perform.

Figure 15:
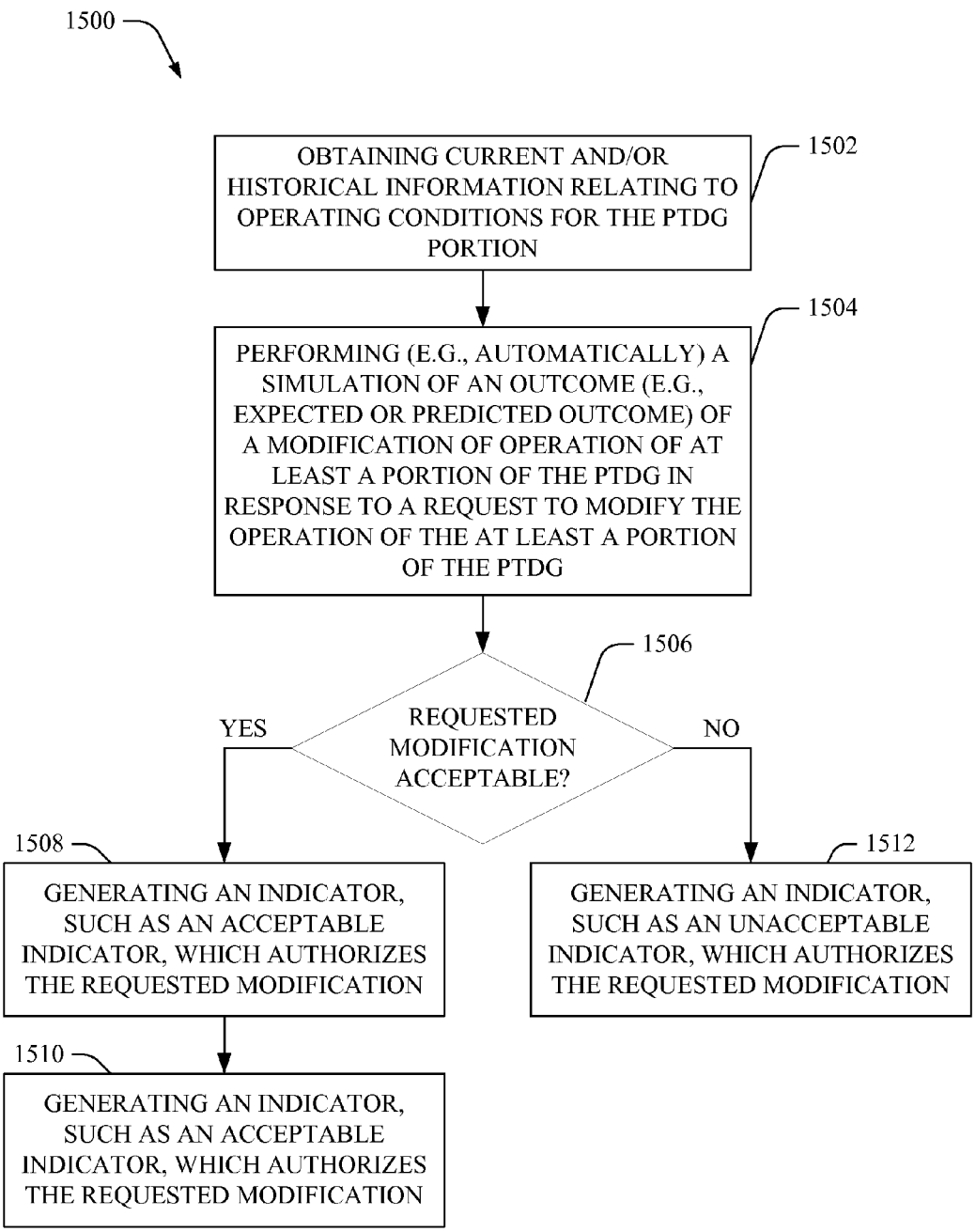
FIG. 15 illustrates a diagram of a flowchart of an example method that can determine whether modification of current operating conditions of at least a portion of a PTDG is to be performed to facilitate desirably controlling operations of the PTDG in accordance with various aspects and embodiments of the disclosed subject matter.

FIG. 15 illustrates a diagram of a flowchart of an example method 1500 that can determine whether modification of current operating conditions of at least a portion of a PTDG is to be performed to facilitate desirably controlling operations of the PTDG in accordance with various aspects and embodiments of the disclosed subject matter. At 1502, current and/or historical information relating to operating conditions (e.g., power system related information) for the PTDG portion can be obtained. In an aspect, the GGSP can monitor, receive, and/or obtain such current and/or historical information from one or more data sources (e.g., power system components) associated with the PTDG portion. In another aspect, information relating to the operating conditions of the PTDG portion can be obtained in real time or at least near real time.

At 1504, a simulation of an outcome (e.g., expected or predicted outcome) of a modification of operation of at least a portion of the PTDG can be performed (e.g., automatically) in response to a request to modify the operation of the at least a portion of the PTDG. At 1506, a determination can be made (e.g., in real time or at least near real time) regarding whether the requested modification of the operation of the PTDG portion is acceptable (e.g., is within the threshold range of acceptable operating conditions), in accordance with the predefined power system control criteria.

If, at 1506, it is determined that the requested modification of the operation of the PTDG portion is acceptable, at 1508, an indicator, such as an acceptable indicator, which authorizes the requested modification, can be generated, in accordance with the predefined power system control criteria. At 1510, the requested modification of the operation of the at least a portion of the PTDG can be performed, in response to the acceptable indicator.

Referring again to 1506, if, at 1506, it is determined that the requested modification of the operation of the PTDG portion is not acceptable, the method 1500 can proceed to reference numeral 1512, and at 1512, an indicator, such as an unacceptable indicator, which indicates the requested modification is not authorized, can be generated, in accordance with the predefined power system control criteria. The unacceptable indicator can be presented to the desired destination (e.g., a power system component associated with the GGSP that requested the operation modification), and no operation modification is performed in response to the request for modification.

Figure 16:
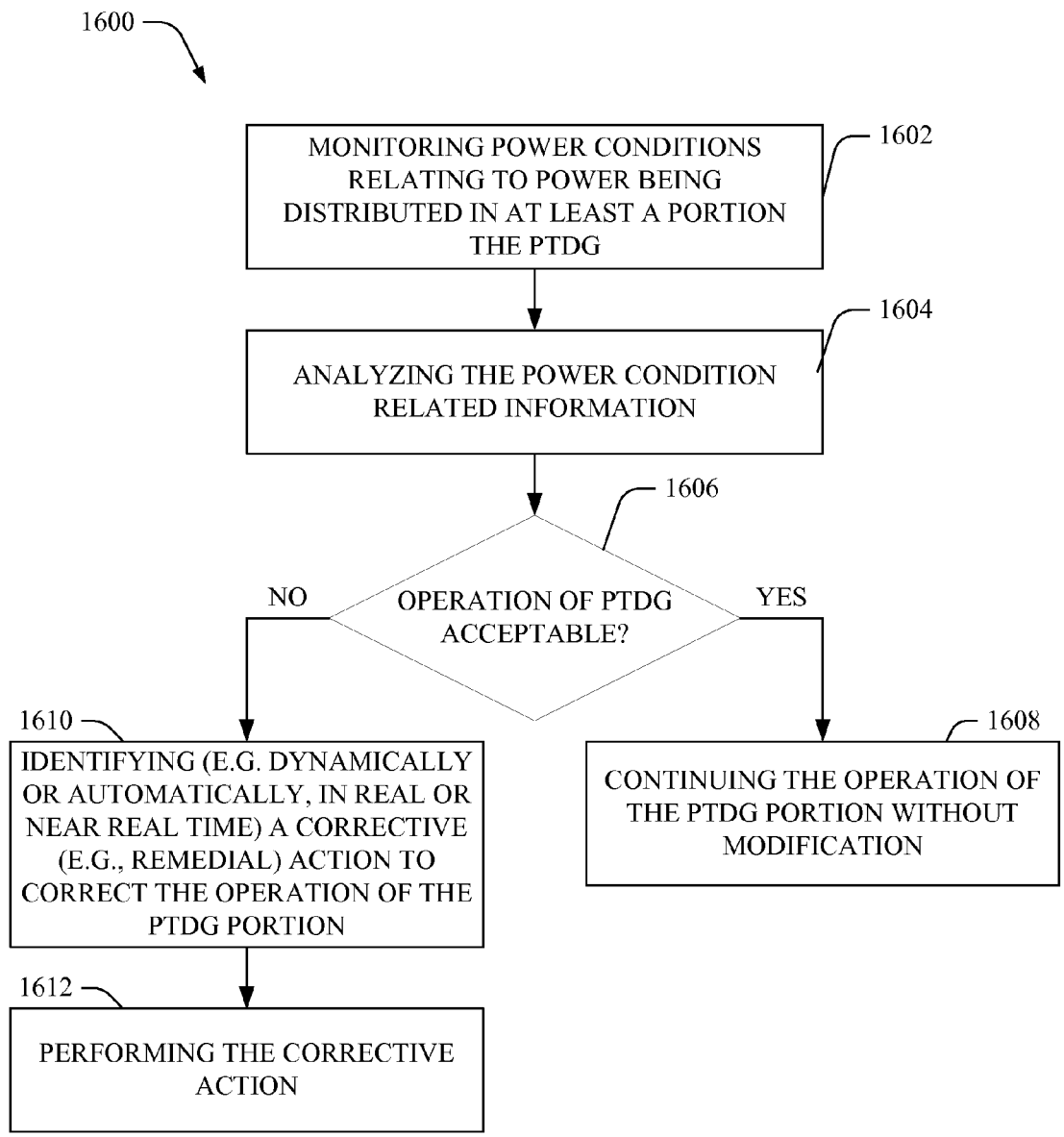
FIG. 16 presents a diagram of a flowchart of an example method that can assess the performance of at least a portion of a PTDG to facilitate desirably controlling operations of the PTDG in accordance with various aspects and embodiments of the disclosed subject matter.

FIG. 16 depicts a diagram of a flowchart of an example method 1600 that can assess the performance of at least a portion of a PTDG to facilitate desirably controlling operations of the PTDG in accordance with various aspects and embodiments of the disclosed subject matter. At 1602, power conditions relating to power (e.g., multi-phase power) being distributed in at least a portion the PTDG can be monitored. In an aspect, a control node (e.g., GGSP) can be employed to monitor and control power transmission and distribution in the PTDG portion. Power system related information, such as information relating to the power conditions of the PTDG portion, can be monitored and obtained from one or more sensors distributed throughout the PTDG portion, and/or one or more other data sources associated with the PTDG portion, in real time or at least near real time. The power condition related information can be obtained or sampled at a desired level of granularity (e.g., each minute, each second, each millisecond, or at another desired periodic interval) to facilitate real time, or at least near real time, control of power transmission and distribution for that PTDG portion.

At 1604, the power condition related information can be analyzed. For instance, the GGSP can analyze the obtained power condition related information to facilitate identifying an assessment (e.g., current assessment, predictive assessment) of the state (e.g., "health" state) of operations of the PTDG portion and/or the determining a control action (if any) to perform to facilitate controlling operations in the PTDG portion.

At 1606, a determination can be made (e.g. dynamically or automatically, and in real time or at least near real time) regarding whether the assessment of the operation state of the PTDG portion indicates acceptable operation of the PTDG portion or not, based at least in part on the predefined power system control criteria.

If, at 1606, it is determined that the assessment of the operation state of the PTDG portion indicates operation of the PTDG portion is acceptable, at 1608, the operation of the PTDG portion can continue without modification. If, at 1606, it is determined that the assessment of the operation state of the PTDG portion indicates operation of the PTDG portion is not acceptable, at 1610, a corrective (e.g., remedial) action can be identified (e.g. dynamically or automatically, in real or near real time) to correct the operation of the PTDG portion. At 1612, the corrective action can be performed (e.g. dynamically or automatically, in real or near real time), wherein the corrective action can modify operation of the PTDG portion so that the PTDG portion can operate to distribute power such that the PTDG portion is operating in accordance with the predefined power system control criteria.

Figure 17:
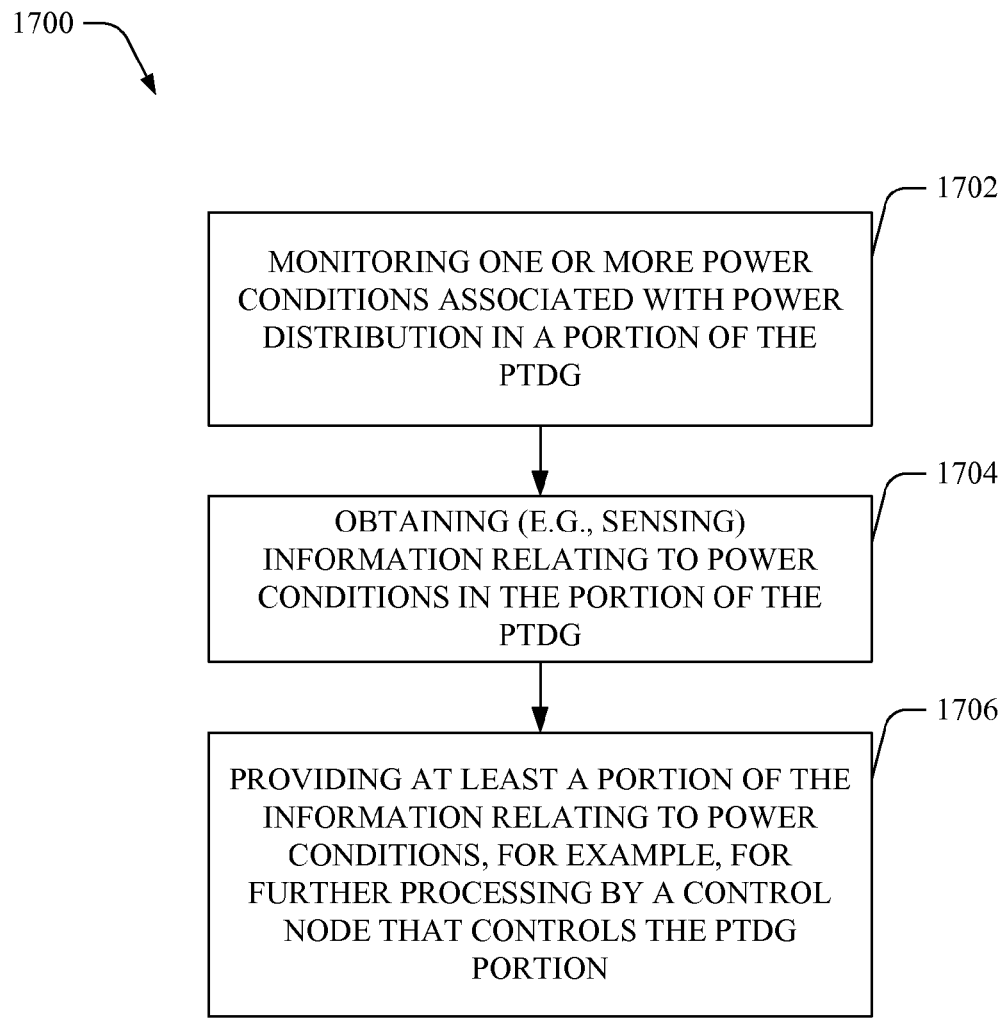
FIG. 17 illustrates a diagram of a flowchart of an example method that can detect an unacceptable (e.g., abnormal) power related condition(s) to facilitate desirably controlling power transmission and distribution in a portion of a PTDG in accordance with various aspects and embodiments of the disclosed subject matter.

FIG. 17 illustrates a diagram of a flowchart of an example method 1700 that can detect an unacceptable (e.g., abnormal) power related condition(s) to facilitate desirably controlling power transmission and distribution in a portion of a PTDG in accordance with various aspects and embodiments of the disclosed subject matter. The method 1700 can be implemented by a sensor component comprising one or more sensors, for example. At 1702, one or more power conditions associated with power transmission and distribution (e.g., multi-phase power transmission and distribution) in a portion of the PTDG can be monitored. In an aspect, one or more sensors can be distributed to desired locations in at least a portion of the PTDG, wherein the one or more sensors can be employed to monitor power conditions in that PTDG portion.

At 1704, information relating to power conditions in that portion of the PTDG can be obtained (e.g., sensed). For instance, the one or more sensors can sense, detect, receive, sample, or otherwise obtain information relating to power conditions in that PTDG portion. The information can be obtained or sampled continuously or substantially continuously, or periodically, as desired. For example, a sensor can obtain an information sample for a particular parameter relating to power conditions of the multi-phase power at desired periodic time intervals (e.g., every minute, every second, every millisecond, or at another desired time interval that is longer or shorter than the aforementioned time intervals) to attain a desired level of granularity for the power condition related data.

At 1706, at least a portion of the information relating to power conditions can be provided (e.g., transmitted), for example, for further processing by a control node (e.g., GGSP) that controls the PTDG portion. For instance, the one or more sensors can transmit all or a portion of the obtained power condition related data to the control node, for example, at desired periodic time intervals (e.g., every minute, every second, every millisecond, or at another desired time interval that is longer or shorter than the aforementioned time intervals), which can be the same as or different than the time interval employed for obtaining the data. As another example, a sensor can be set or structured so that it only provides information (e.g., to a GGSP), such as an indicator or alert, when a predefined condition or event occurs (e.g., when a power system parameter value is outside of a predefined acceptable threshold parameter value or range of parameter values). In an aspect, the GGSP can generate an alert, control information relating to a corrective action, and/or a work order, in response to receiving information relating to the power condition for the PTDG portion, when in accordance with the predefined power system control criteria.

Figure 18:
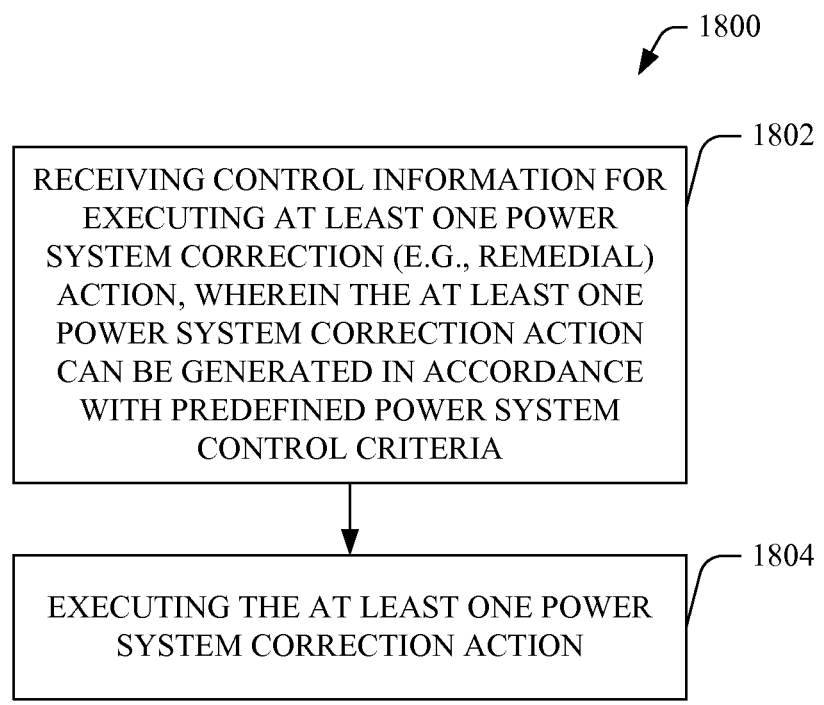
FIG. 18 presents a diagram of a flowchart of an example method that can facilitate executing a power system correction (e.g., remedial) action to facilitate controlling power (e.g., multi-phase power) being transmitted and distributed in a portion of a PTDG in accordance with various aspects and embodiments of the disclosed subject matter.

FIG. 18 presents a diagram of a flowchart of an example method 1800 that can facilitate executing a power system correction (e.g., remedial) action to facilitate controlling power (e.g., multi-phase power) being distributed in a portion of a PTDG in accordance with various aspects and embodiments of the disclosed subject matter. In an aspect, the method 1800 can be implemented, for example, by a node (e.g., comprising a power transmission and distribution component, switch component, and/or filter component) in the PTDG portion. At 1802, control information for executing at least one power system correction (e.g., remedial) action can be received, wherein the at least one power system correction action can be generated in accordance with predefined power system control criteria. For instance, a component, such as a node (e.g., transformer comprising a switch component, filter component, or other component), can receive the control information transmitted from a control node (e.g., GGSP). At 1804, the at least one power system correction action can be executed. The component (e.g., node) can execute or perform the at least one power system correction action based at least in part on the control information, wherein such power system correction action(s) can comprise one or more such actions, as more fully disclosed herein. The at least one power system correction action can facilitate controlling the distribution of the power in the portion of the PTDG such that the power conditions are in accordance with the predefined power system control criteria.

Figure 19:
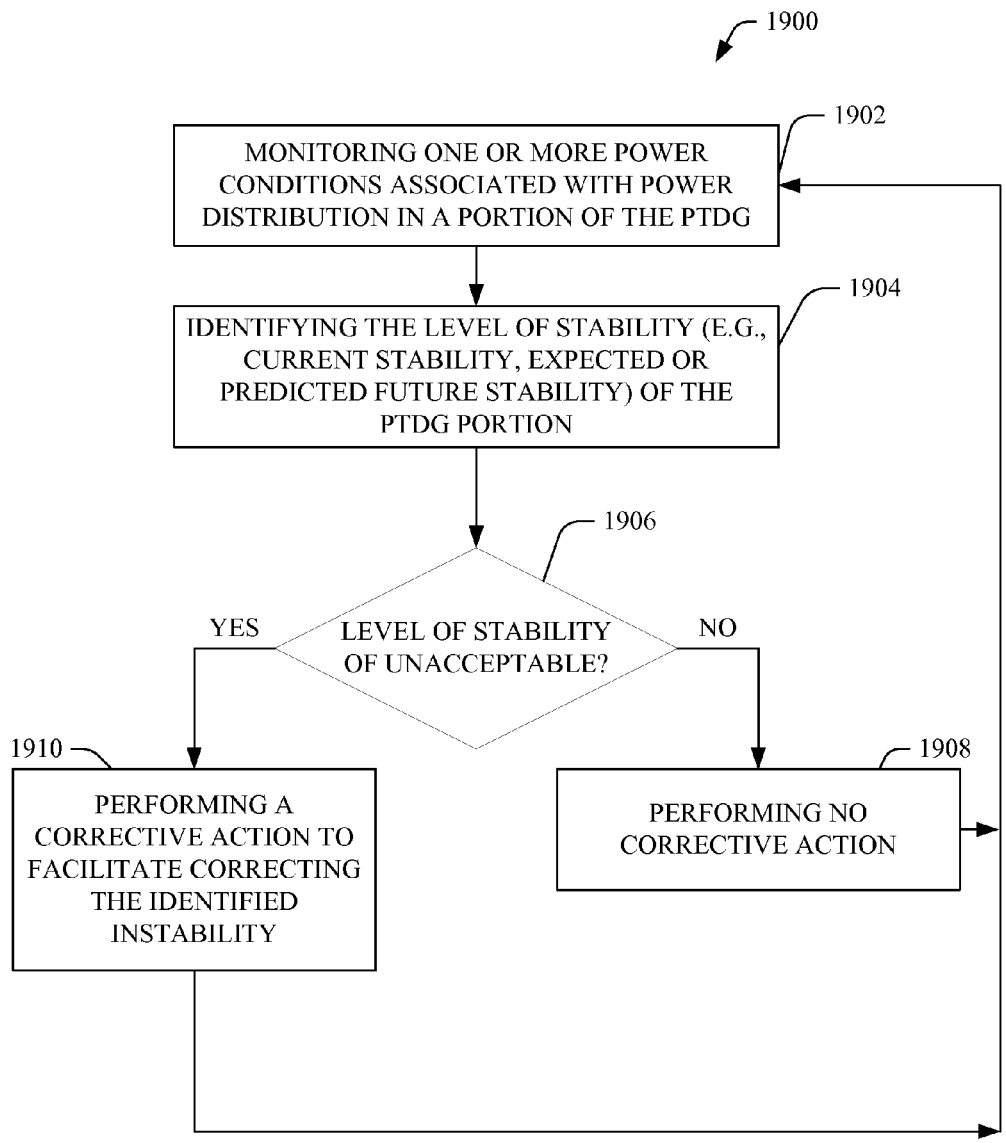
FIG. 19 illustrates a flowchart of an example method that can control (e.g., dynamically or automatically) stability in at least a portion of a PTDG in accordance with various aspects and embodiments of the disclosed subject matter.

FIG. 19 illustrates a flowchart of an example method 1900 that can control (e.g., dynamically or automatically) stability in at least a portion of a PTDG in accordance with various aspects and embodiments of the disclosed subject matter. All or at least a portion of the aspects of method 1900 can be performed automatically and/or dynamically, and can be performed in real time or at least in near real time. At 1902, one or more power conditions associated with power transmission and distribution in a portion of the PTDG can be monitored. In an aspect, one or more sensors or power measurement components (e.g., PMU) can be distributed in desired locations in at least a portion of the PTDG. The one or more sensors or power measurement components can be employed to monitor power conditions in that PTDG portion, as more fully disclosed herein.

At 1904, the level of instability (e.g., current instability, expected or predicted future level of instability) of the PTDG portion can be identified (e.g., in real time). In an aspect, the GGSP can analyze information relating to the monitored power conditions and can identify or detect the level of instability, of the PTDG portion, for example, with regard to oscillations, for example, to identify whether there are unacceptable (e.g., abnormal) oscillations (e.g., oscillation level that is outside of a predefined threshold (e.g., maximum and/or minimum) oscillation level or range of levels), such as low-frequency oscillations, relating to power transmission and distribution in the PTDG portion, in accordance with the predefined power system control criteria.

At 1906, a determination can be made regarding whether an unacceptable level of instability is identified. If, at 1906, it is determined that no unacceptable level of instability is identified, at 1908, no corrective action can be performed, and method 1900 can return to reference numeral 1902, to continue monitoring the one or more power conditions in the PTDG portion. If, at 1906, it is determined that an unacceptable level of instability is identified, at 1910, a corrective action can be performed to facilitate correcting the identified instability. The corrective action can comprise, for example, generating an alert regarding the identified instability, generating control information that can correct the identified instability, transmitting the control information that can correct the identified instability, executing the control information to correct the identified instability, etc. At this point, method 1900 can return to reference numeral 1902 to continue monitoring the one or more power conditions in the PTDG portion.

Figure 20:
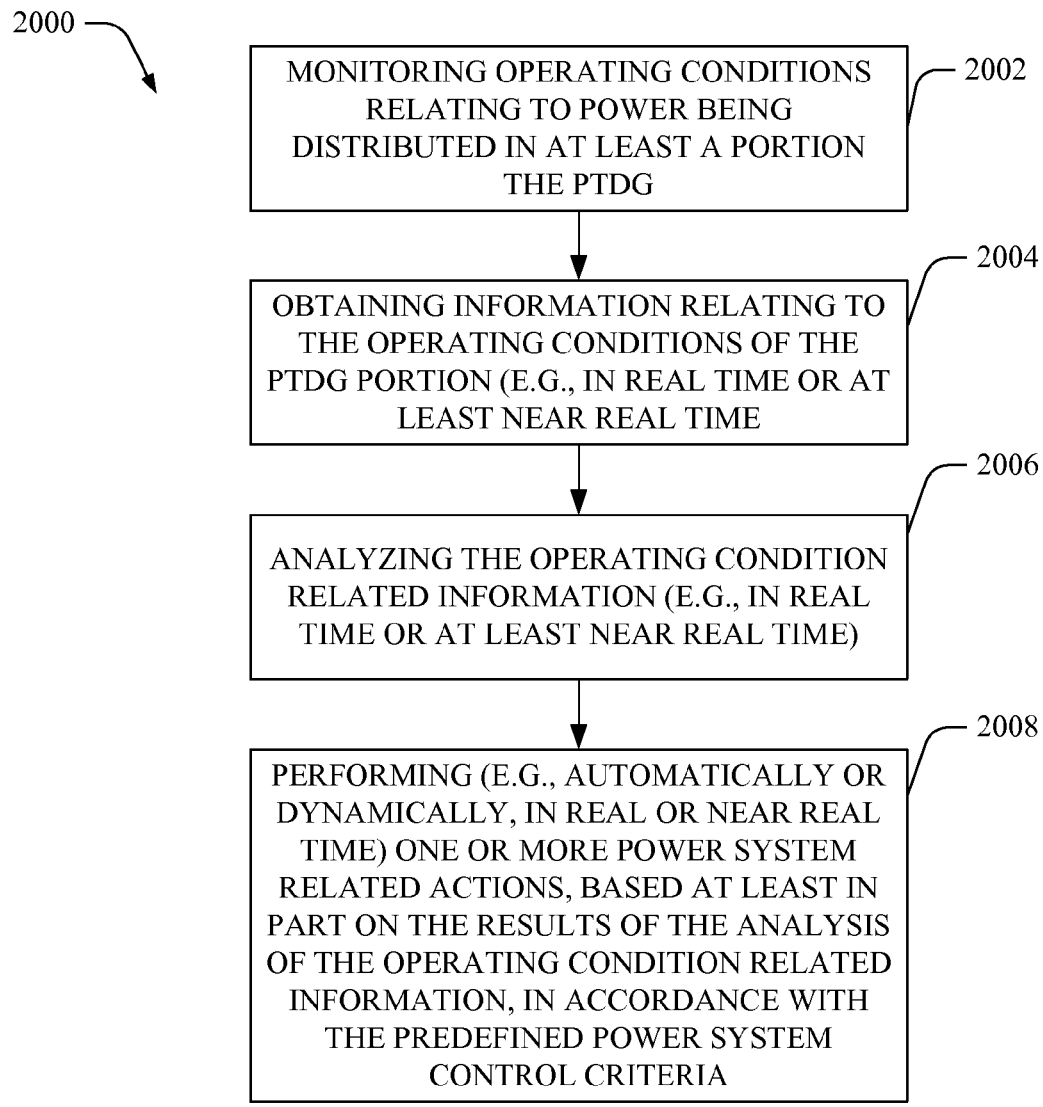
FIG. 20 depicts a flowchart of an example method that can identify one or more power-related actions (e.g., corrective action) to perform to facilitate controlling power (e.g., multi-phase power) being transmitted and distributed in a portion of a PTDG in accordance with various aspects and embodiments of the disclosed subject matter.

FIG. 20 depicts a flowchart of an example method 2000 that can identify one or more power-related actions (e.g., corrective or remedial action) to perform to facilitate controlling power (e.g., multi-phase power) being transmitted and distributed in a portion of a PTDG in accordance with various aspects and embodiments of the disclosed subject matter. At 2002, operating conditions (e.g., power conditions, communication conditions, etc.) relating to power (e.g., multi-phase power) being transmitted and distributed in at least a portion the PTDG can be monitored. In an aspect, a control node (e.g., GGSP) can be employed to monitor and control power transmission and distribution in the PTDG portion. One or more power system components, which can be located in the PTDG portion controlled by the control node, can be monitored, for example, using one or more sensors, such as more fully disclosed herein, which can be distributed to desired locations throughout the PTDG portion to monitor and sense power conditions in the PTDG portion.

At 2004, information relating to the operating conditions of the PTDG portion can be obtained (e.g., automatically or dynamically, in real time or at least near real time). For instance, information relating to the operating conditions of the PTDG portion can be monitored and obtained from one or more sensors distributed throughout the PTDG portion, and/or one or more other data sources associated with the PTDG portion, in real time or at least near real time. The operating condition related information can be obtained or sampled at a desired level of granularity (e.g., each minute, each second, each millisecond, or at another desired periodic interval) to facilitate real time, or at least near real time, control of power transmission and distribution for that PTDG portion.

At 2006, the operating condition related information can be analyzed (e.g., automatically or dynamically, in real time or at least near real time). For instance, the GGSP (e.g., utilizing an OSS) can analyze the obtained operating condition related information to facilitate identifying an assessment (e.g., current assessment, predictive assessment) of the state (e.g., "health" state) of operations of the PTDG portion, generating programs or analyses relating to the PTDG equipment, and/or the determining a control action (if any) to perform to facilitate controlling operations in the PTDG portion.

At 2008, one or more power system related actions can be performed (e.g., automatically or dynamically, in real time or at least near real time), based at least in part on the results of the analysis of the operating condition related information, in accordance with the predefined power system control criteria. A power system related action(s) can comprise, for example, generating a prioritized maintenance plan(s) of PTDG equipment based at least in part on the identified (e.g., assessed, determined) condition (e.g., "health) of PTDG equipment in the PTDG portion and criticality (e.g., level or state of criticalness) of maintenance of such equipment, generating a strategic PTDG equipment upgrade program(s) to facilitate desirably upgrading PTDG equipment in the PTDG portion, performing a cost/benefit analysis relating to criticality of desired (e.g., required) investments for PTDG equipment in the PTDG portion, predicting the ability of the PTDG portion, or component therein, to withstand a stressed operating condition, and/or another power system related action(s), such as more fully disclosed herein.

Figure 21:
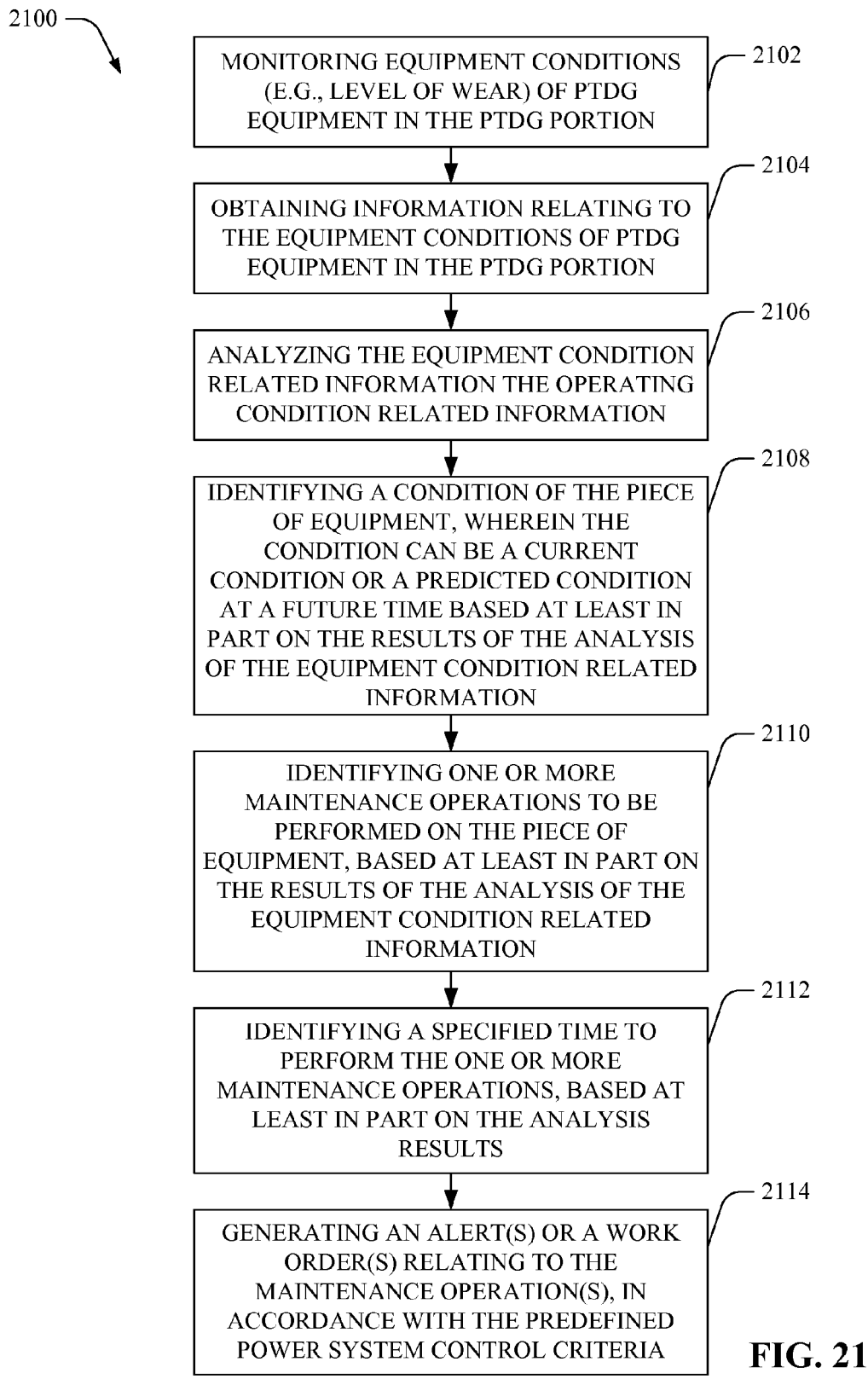
FIG. 21 illustrates a flowchart of an example method that can identify one or more power-related actions (e.g., corrective action, maintenance action) to perform to facilitate condition-based maintenance of PTDG equipment in a portion of a PTDG in accordance with various aspects and embodiments of the disclosed subject matter.

FIG. 21 illustrates a flowchart of an example method 2100 that can identify one or more power-related actions (e.g., corrective action, maintenance action) to perform to facilitate condition-based maintenance of PTDG equipment in a portion of a PTDG in accordance with various aspects and embodiments of the disclosed subject matter. It is to be appreciated and understood that, while method 2100 primarily relates to condition-based maintenance of PTDG equipment, the disclosed subject matter is not so limited, as the disclosed subject matter also can perform maintenance of PTDG equipment based at least in part on time (e.g., length of time since maintenance was performed on PTDG equipment) or maintenance of PTDG equipment based at least in part on equipment condition and/or time (e.g., hybrid condition/time-based maintenance).

At 2102, equipment conditions (e.g., level of wear) of PTDG equipment in the PTDG portion can be monitored. In an aspect, a control node (e.g., GGSP) can be employed to monitor and control power transmission and distribution in the PTDG portion. One or more power system components (e.g., power transmission and distribution components, communication components, etc.), which can be located in the PTDG portion controlled by the control node, can be monitored, for example, using one or more sensors that can be distributed to desired locations throughout the PTDG portion.

At 2104, information relating to the equipment conditions of PTDG equipment in the PTDG portion can be obtained (e.g., in real time or near real time, at a specified time, at a periodic time, etc.). For instance, information relating to the equipment conditions of a piece of PTDG equipment can be monitored and obtained from one or more sensors distributed throughout the PTDG portion (e.g., sensor located on, at or near the piece of PTDG equipment), and/or one or more other data sources associated with the PTDG portion, in real time or at least near real time. The equipment condition related information can be obtained or sampled at a desired level of granularity (e.g., each minute, each second, each millisecond, or at another desired periodic interval) to facilitate real time, or at least near real time, knowledge of the condition of the PTDG equipment in that PTDG portion by the GGSP.

At 2106, the equipment condition related information can be analyzed (e.g., automatically or dynamically, in real time or near real time; at a specified time; at a periodic time, etc.). For instance, the GGSP can analyze the obtained equipment condition related information to facilitate identifying a current condition of the PTDG equipment or predicting a future condition of the PTDG equipment (e.g., at a time certain, or identifying a specified time in the future at or near a time the PTDG equipment will need maintenance or will likely fail).

The obtained equipment condition related information can include current and/or historical information, wherein, for instance, analysis of the current information in relation to the historical information can indicate, or at least potentially indicate, a rate of wear on the piece of PTDG equipment over time and/or the effects of operating the piece of equipment under stressed or over-stressed operating conditions on the condition of the piece of PTDG equipment, each of which can facilitate predicting a point in time when maintenance on the piece of PTDG equipment is to be desired (e.g., needed).

At 2108, a condition of the piece of equipment can be identified (e.g., automatically or dynamically, in real time or near real time), wherein the condition can be a current condition or a predicted condition at a future time based at least in part on the results of the analysis of the equipment condition related information. For example, using the analysis results, the GGSP can identify the current condition (e.g., current level of wear) of the piece of PTDG equipment or the expected condition of the piece of PTDG equipment at a specified future time.

At 2110, one or more maintenance operations to be performed on the piece of equipment can be identified (e.g., automatically or dynamically, in real time or near real time) based at least in part on the results of the analysis of the equipment condition related information. The one or more maintenance operations (e.g., replace a component on the PTDG equipment, repair a component on the equipment, adjust a component on the equipment, lubricate the equipment, etc.) can be a maintenance operation to be performed due in part to the current condition of the equipment and/or a maintenance operation to be performed in the future due in part to the predicted future condition of the equipment.

At 2112, a specified time to perform the one or more maintenance operations can be identified, based at least in part on the analysis results. At 2114, an alert(s) or a work order(s) relating to the maintenance operation(s) can be generated and presented at a specified time (e.g., immediately, in the near future, in the distant future), in accordance with the predefined power system control criteria. The one or more maintenance operations can be performed in accordance with the alert(s) or work order(s).

Figure 22:
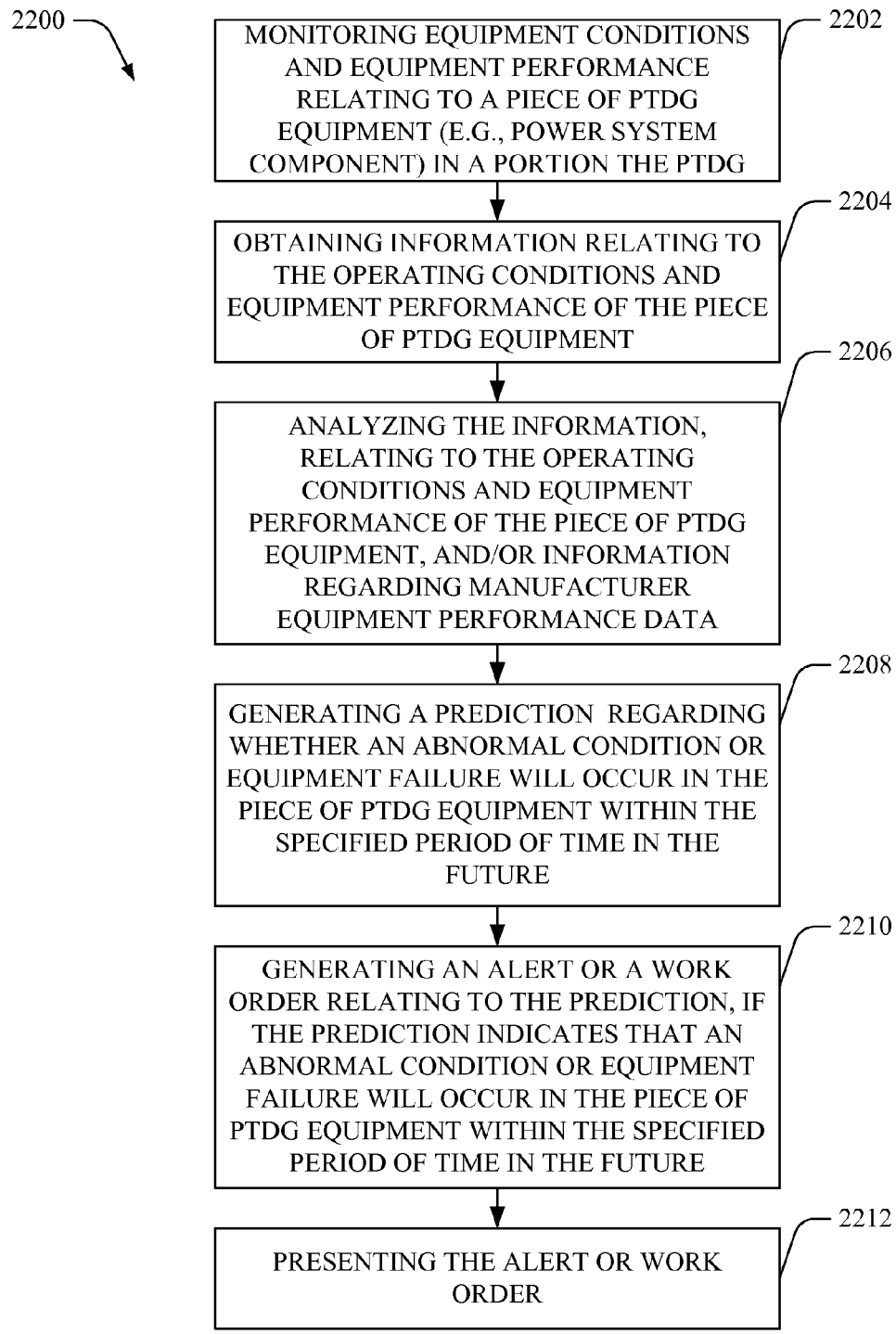
FIG. 22 depicts a flowchart of an example method that can monitor and analyze PTDG equipment performance and conditions to facilitate predicting whether there will be equipment failure or an abnormal operation of the PTDG equipment in accordance with various aspects and embodiments of the disclosed subject matter.

FIG. 22 presents a flowchart of an example method 2200 that can monitor and analyze PTDG equipment performance and conditions to facilitate predicting whether there will be equipment failure or an abnormal operation of the PTDG equipment in accordance with various aspects and embodiments of the disclosed subject matter. At 2202, equipment conditions and equipment performance relating to a piece of PTDG equipment (e.g., power system component) in a portion of the PTDG can be monitored. In an aspect, a control node (e.g., GGSP) can be employed to monitor and control power transmission and distribution in the PTDG portion. One or more pieces of PTDG equipment, which can be located in the PTDG portion controlled by the control node, can be monitored, for example, using one or more sensors, such as more fully disclosed herein, which can be distributed to desired locations throughout the PTDG portion to monitor and sense operating conditions and equipment performance associated with the one or more pieces of PTDG equipment in the PTDG portion.

At 2204, information relating to the equipment conditions and equipment performance of the piece of PTDG equipment can be obtained (e.g., in real time or at least near real time). For instance, information relating to the equipment or operating conditions, and equipment performance, of the piece of PTDG equipment can be monitored and obtained from one or more sensors distributed throughout the PTDG portion, and/or one or more other data sources associated with the PTDG portion, in real time or at least near real time. The information relating to the operation conditions and equipment performance can be obtained or sampled at a desired level of granularity (e.g., each minute, each second, each millisecond, or at another desired periodic interval) to facilitate real time, or at least near real time, evaluation of the performance and physical condition (e.g., level of wear) of the piece of PTDG equipment.

At 2206, the information, relating to the equipment or operating conditions, and equipment performance, of the piece of PTDG equipment, and/or information regarding manufacturer equipment performance data can be analyzed (e.g., in real time or at least near real time). For instance, the GGSP can analyze the obtained information and/or the manufacturer equipment performance data to facilitate identifying whether the piece of PTDG equipment is operating within acceptable operating conditions or whether an abnormal condition exists, a current physical condition of the piece of PTDG equipment, whether the current physical condition of the piece of PTDG equipment is within acceptable levels (e.g., whether one or more components of the piece of PTDG equipment are still suitable for use or are instead too worn for continued use), and/or predicting if an abnormal condition or equipment failure will occur in the piece of PTDG equipment within a specified period of time in the future (e.g., within the next hour, day, week, month, year, . . . ), etc.

At 2208, a prediction can be generated regarding whether an abnormal condition or equipment failure will occur in the piece of PTDG equipment within the specified period of time in the future. As desired, to facilitate predicting whether an event, such as an occurrence of an abnormal condition or equipment failure in the piece of PTDG equipment, will occur within the specified period of time, the GGSP can perform a simulation of the operation and physical condition of the piece of equipment in future use of the piece of equipment.

At 2210, if the prediction indicates that an abnormal condition or equipment failure will occur in the piece of PTDG equipment within the specified period of time in the future, an alert or a work order relating to the prediction can be generated, and at 2212, the alert or work order can be presented (e.g., displayed, printed, etc.). For instance, an alert or work order regarding the predicted abnormal condition or equipment failure can be provided on a display screen of a computer or other communication device (e.g., mobile phone, PDA, etc.), so that a utility operator or maintenance person can be notified of the predicted event and can take the proper action to have maintenance or repairs performed on the PTDG equipment before the predicted abnormal condition or equipment failure occurs.

Figure 23:
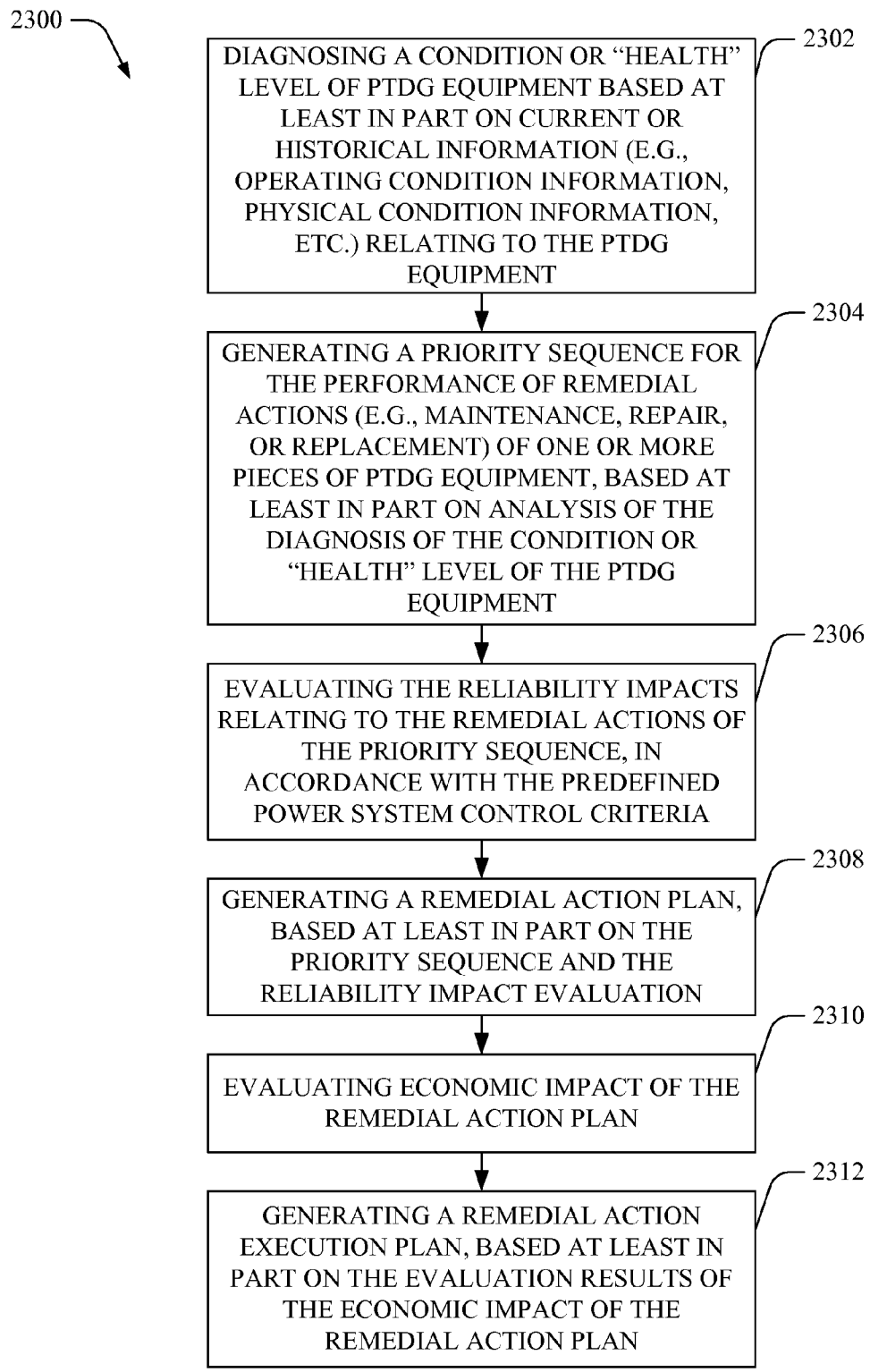
FIG. 23 illustrates a flowchart of an example method that can generate a remedial action plan (e.g., a maintenance, repair, and/or replacement plan) to facilitate desirably maintaining operation of PTDG equipment in a PTDG, or portion thereof, in accordance with various aspects and embodiments of the disclosed subject matter.

FIG. 23 illustrates a flowchart of an example method 2300 that can generate a remedial action plan (e.g., a maintenance, repair, and/or replacement plan) to facilitate desirably maintaining operation of PTDG equipment in a PTDG, or portion thereof, in accordance with various aspects and embodiments of the disclosed subject matter. At 2302, a condition or "health" level of PTDG equipment can be diagnosed based at least in part on current or historical information (e.g., operating condition information, physical condition information, etc.) relating to the PTDG equipment.

At 2304, a priority sequence for the performance of remedial actions (e.g., maintenance, repair, or replacement) of one or more pieces of PTDG equipment can be generated based at least in part on analysis of the diagnosis of the condition or "health" level of the PTDG equipment. The priority sequence can comprise information regarding the type of remedial action to be performed on a particular piece of PTDG equipment, the order and specified time of performance of the respective remedial actions are to be performed on respective pieces of PTDG equipment, the respective levels of priority for the respective remedial actions (e.g., a first remedial action, which can have a relatively low priority level, still may be located at an early point in the priority sequence at or near another early point associated with a second remedial action that has a high priority level, due in part to a topological or locational correlation of the first remedial action to the second remedial action; and, during execution of the remedial action plan, if an event occurs that could impact performance of the first or second remedial actions, the maintenance person or other entity (e.g., computer) can evaluate the respective priority levels of the first and second remedial actions and can recognize that it is more important to perform the second, higher priority remedial action over the first, lower priority remedial action, if for some reason it is not possible to perform both the first and second remedial actions at execution time), etc.

At 2306, the reliability impacts relating to the remedial actions of the priority sequence can be evaluated, in accordance with the predefined power system control criteria. The results of the reliability impacts can result in a modification (or no modification) of the priority sequence (e.g., modification of the order of remedial action, modification of priority level of a remedial action, etc.) and/or contextual results of the reliability impact evaluation can be included with the priority sequence for further processing and evaluation. At 2308, a remedial action plan can be generated based at least in part on the priority sequence and the reliability impact evaluation. The remedial action plan can include information relating to, for example, the temporal order of performance of respective remedial actions on respective pieces of PTDG equipment, the respective types of remedial actions to be performed on the respective pieces of PTDG equipment, economic information (e.g., respective economic costs) of performing the remedial actions on the respective pieces of PTDG equipment, contextual information relating to the respective remedial actions and/or respective pieces of equipment, and/or other information.

At 2310, economic impact of the remedial action plan can be evaluated. For example, a cost/benefit analysis can be performed on the remedial action plan as a whole, or on respective portions of the remedial action plan, to facilitate determining the economic impact of the remedial action plan in context. For instance, the respective costs of performing the respective remedial actions can be identified and correlated temporally, locationally, and/or topologically with the remedial actions, as desired. For example, the costs of performing the remedial actions can be correlated or grouped together over specified time periods (e.g., each month) to determine respective expected expenditures in performing the remedial actions over the respective specified time periods.

At 2312, a remedial action execution plan can be generated based at least in part on the evaluation results of the economic impact of the remedial action plan. Based at least in part on the evaluation results of the economic impact of the remedial action plan, the remedial action execution plan can include all or a desired portion of the remedial action items contained in the remedial action plan, a certain remedial action item(s) in the remedial action execution plan can be modified from the remedial action plan or replaced with a different remedial action item(s), in the remedial action execution plan the temporal order of performance of respective remedial actions can be modified from that contained in the remedial action plan, and/or the remedial action plan can be otherwise modified to facilitate generating the remedial action execution plan based at least in part on the evaluation results and the predefined power system control criteria.

Figure 24:
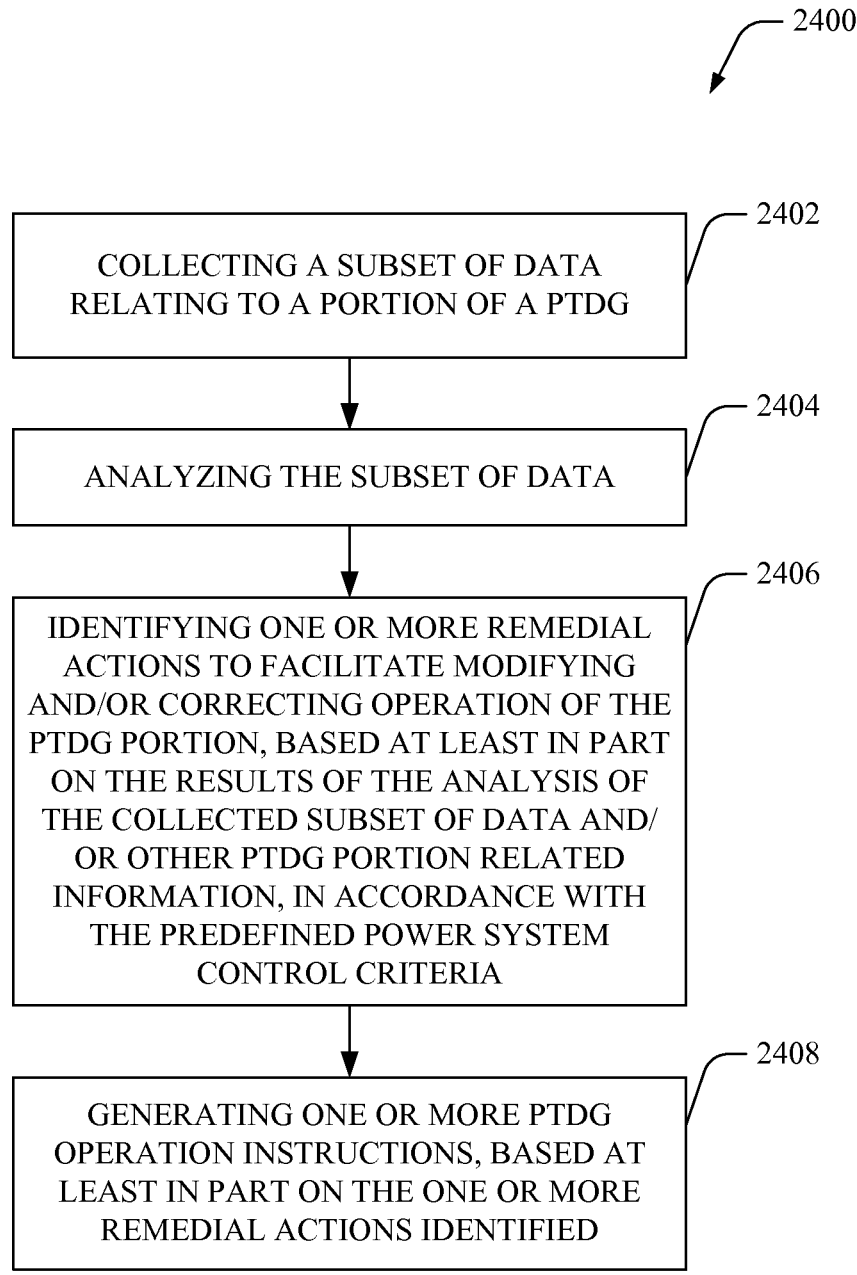
FIG. 24 illustrates a flowchart of an example method that can generate a post-mortem analysis relating to operation of at least a portion of a PTDG to facilitate identifying and generating operating instructions (e.g., new or modified operating instructions) for operation of the PTDG portion in accordance with various aspects and embodiments of the disclosed subject matter.

FIG. 24 illustrates a flowchart of an example method 2400 that can generate a post-mortem analysis relating to operation of at least a portion of a PTDG to facilitate identifying and generating operating instructions (e.g., new or modified operating instructions) for operation of the PTDG portion in accordance with various aspects and embodiments of the disclosed subject matter. The post-mortem analysis can be performed, for example, in response to an abnormal condition (e.g., abnormal power system parameter values, abnormal oscillation levels (e.g., abnormal low frequency oscillation levels), abnormal phase imbalance, etc.) or equipment failure, or at specified or periodic times.

At 2402, a subset of data relating to a portion of a PTDG can be collected. The subset of data can include information relating to power transmission and distribution in the PTDG portion (e.g., performance of the PTDG portion in transmitting and distributing power, how and where power was transmitted and distributed in and by the PTDG portion, behavior or responses of PTDG components, power transmission and distribution related events that occurred, etc.) over a specified time period, information communicated between components in relation to transmitting and distributing power in the PTDG portion over the specified time period, respective conditions of respective PTDG components at the beginning of the specified time period, during the specified time period and/or at the end of the specified time period, etc.

At 2404, the subset of data can be analyzed. In an aspect, the GGSP can analyze the collected subset of data to facilitate identifying and generating one or more operating instructions to be employed by PTDG components and/or personnel (e.g., PTDG operators, maintenance or repair personnel, etc.), in accordance with the predefined power system control criteria, to facilitate desired (e.g., optimized) operation of the PTDG portion controlled by the GGSP. In an embodiment, the GGSP can perform one or more simulations of events and operations of the PTDG portion, wherein the simulations can comprise simulations replaying events and operations (e.g., PTDG operations, sequence of events, occurrences and characteristics of oscillations, etc.) that occurred over the specified time period and/or predicted events and operations for a future time period, based at least in part on the collected subset of information, other historical information relating to the PTDG portion, manufacturer equipment performance data, and the predefined power system control criteria (e.g., via application of one or more corresponding predefined power system control rules to the collected subset of data and other information associated with the PTDG portion).

At 2406, one or more remedial actions can be identified to facilitate modifying and/or correcting operation of the PTDG portion based at least in part on the results of the analysis of the collected subset of data and/or other PTDG portion related information, in accordance with the predefined power system control criteria. For example, the GGSP, employing the CEP and/or RCA modules, can perform the data analysis and identify the one or more remedial actions based at least in part on the results of the analysis. At 2408, one or more PTDG operation instructions can be generated, based at least in part on the one or more remedial actions identified. The one or more PTDG operation instructions can modify operations of the PTDG portion to implement the one or more remedial actions.

Figure 25:
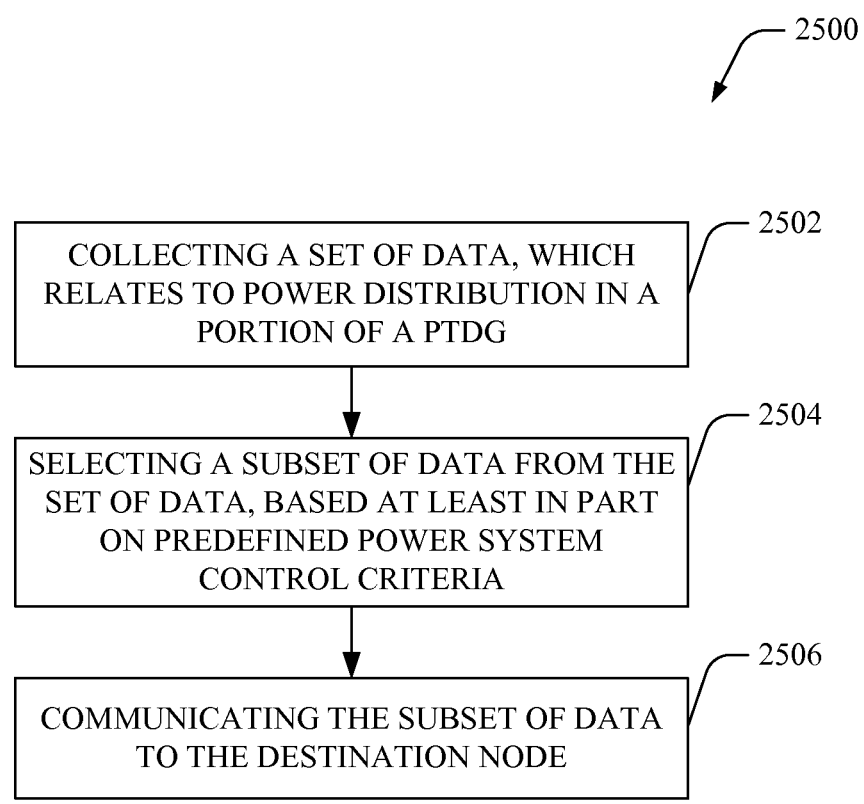
FIG. 25 illustrates a flowchart of an example method that can facilitate communicating a desired subset of data, which relates to power transmission and distribution (e.g., multi-phase power transmission and distribution), between control nodes of a PTDG to facilitate controlling power transmission and distribution in the PTDG in accordance with various aspects and embodiments of the disclosed subject matter.

FIG. 25 illustrates a flowchart of an example method 2500 that can facilitate communicating a desired subset of data, which relates to power transmission and distribution (e.g., multi-phase power transmission and distribution), between control nodes of a PTDG to facilitate controlling power transmission and distribution in the PTDG in accordance with various aspects and embodiments of the disclosed subject matter. At 2502, a set of data, which relates to power transmission and distribution in a portion of a PTDG can be collected. For example, a lower level control node can obtain, collect and/or aggregate a set of data relating to power transmission and distribution for the portion of the PTDG in a lower level of a hierarchy of a multi-tier PTDG, wherein the set of data can comprise data obtained by the lower level control node from one or more associated components, such as an associated PDS(s), a CCN(s) or ECM(s), a sensor(s), a junction node(s) (e.g., a power switch to route power to a CCN), etc., in the portion of the lower tier controlled by the lower level control node. The collected data can comprise, for example, results of data analysis, evaluation or calculations performed by the lower level control node, data obtained from the associated components, data relating to power conditions (e.g., power system balance, voltage levels, current levels, harmonic levels or effects, interference levels, etc.), etc., for the power being transmitted and distributed in the portion of the lower level controlled by the lower level control node.

At 2504, a subset of data can be selected from the set of data based at least in part on predefined power system control criteria. The predefined power system control criteria can comprise predefined data selection criteria that can relate to, for example, the destination control or communication node (e.g., GGSP) for the subset of data, type of data (e.g., type of parameter, type of indicator, etc.) or amount of data desired by the destination control or communication node, priority of data, data available in the set of data, respective hierarchy levels of the originating and destination control or communication nodes, current communication conditions, etc. In accordance with the predefined data selection criteria (and application of corresponding predefined data selection rules), a subset of data, which can comprise all or a desired lesser portion of the set of data, can be selected for communication to the destination node (e.g., control or communication node).

At 2506, the subset of data can be communicated to the destination node. For example, the sending control node can be a control node that is part of or associated with a distribution transformer, and the destination node can be a control node associated with a substation or central power station; or the sending control node can be a control node that is part of or associated with a substation, and the destination node can be a control node associated with a central power station. In an aspect, the destination node (e.g., control or communication node) that receives the subset of data can process (e.g., decompress, decrypt, collect, analyze, etc.) the subset of data in accordance with the predefined power system control criteria.

Figure 26:
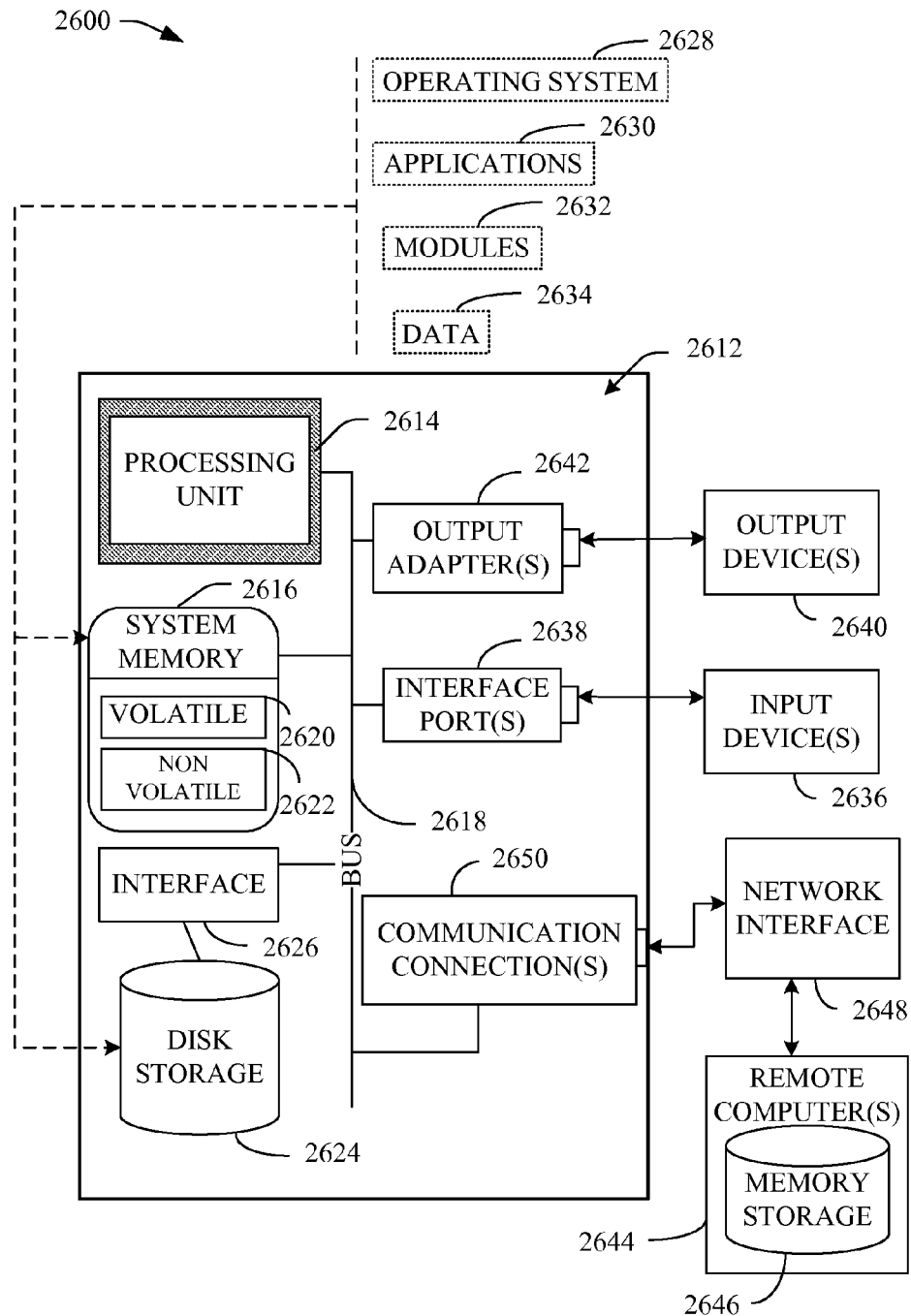
FIG. 26 is a schematic block diagram illustrating a suitable operating environment.
Figure 27:
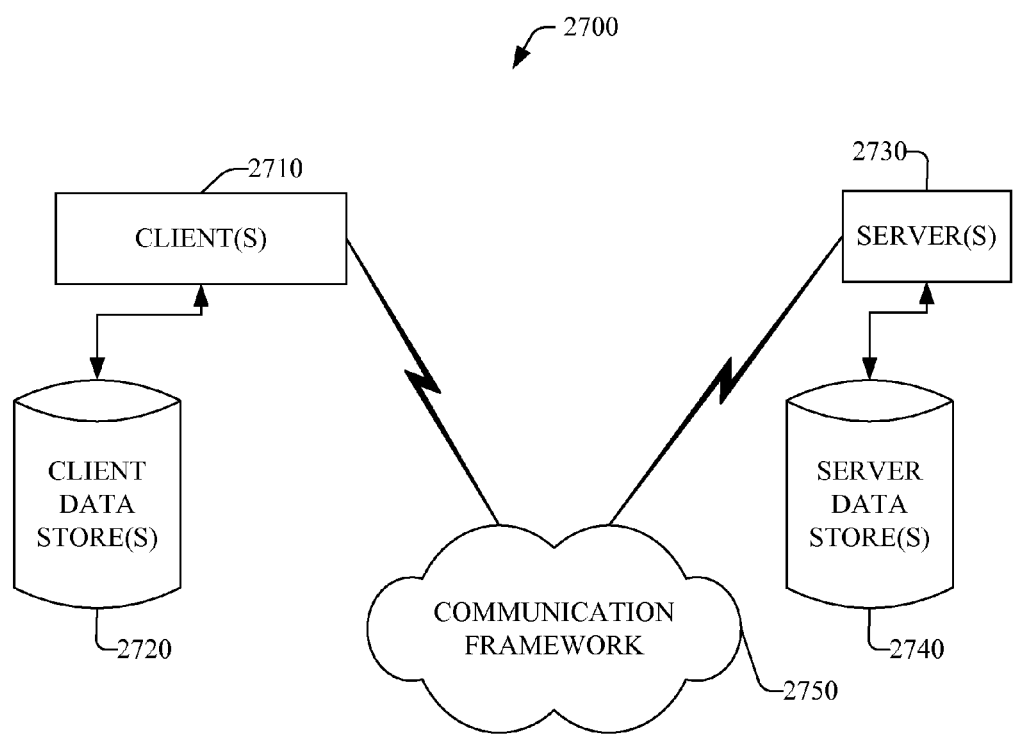
FIG. 27 is a schematic block diagram of a sample-computing environment.

In order to provide a context for the various aspects of the disclosed subject matter, FIGS. 26 and 27 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed subject matter also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the disclosed subject matter can be practiced on stand-alone computers. In a distributed computing environment, program modules may be located in both local and remote memory storage devices.

With reference to FIG. 26, a suitable environment 2600 for implementing various aspects of the disclosed subject matter includes a computer 2612. The computer 2612 includes a processing unit 2614, a system memory 2616, and a system bus 2618. The system bus 2618 couples system components including, but not limited to, the system memory 2616 to the processing unit 2614. The processing unit 2614 can be any of various available processors. Dual microprocessors and other multiprocessor architectures also can be employed as the processing unit 2614.

The system bus 2618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2616 includes volatile memory 2620 and nonvolatile memory 2622. The basic input/output system (BIOS), containing the basic routines to transfer information between elements within the computer 2612, such as during start-up, is stored in nonvolatile memory 2622. By way of illustration, and not limitation, nonvolatile memory 2622 can include read only memory (ROM), programmable ROM (PROM), electrically programmable ROM (EPROM), electrically erasable programmable ROM (EEPROM), or flash memory. Volatile memory 2620 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2612 also includes removable/non-removable, volatile/non-volatile computer storage media. FIG. 26 illustrates, for example, a disk storage 2624. Disk storage 2624 includes, but is not limited to, devices like a magnetic disk drive, floppy disk drive, tape drive, Jaz drive, Zip drive, LS-100 drive, flash memory card, or memory stick. In addition, disk storage 2624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2624 to the system bus 2618, a removable or non-removable interface is typically used, such as interface 2626.

It is to be appreciated that FIG. 26 describes software that acts as an intermediary between users and the basic computer resources described in the suitable operating environment 2600. Such software includes an operating system 2628. Operating system 2628, which can be stored on disk storage 2624, acts to control and allocate resources of the computer system 2612. System applications 2630 take advantage of the management of resources by operating system 2628 through program modules 2632 and program data 2634 stored either in system memory 2616 or on disk storage 2624. It is to be appreciated that the claimed subject matter can be implemented with various operating systems or combinations of operating systems.

A user enters commands or information into the computer 2612 through input device(s) 2636. Input devices 2636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2614 through the system bus 2618 via interface port(s) 2638. Interface port(s) 2638 include, for example, a serial port, a parallel port, a game port, and a universal serial bus (USB). Output device(s) 2640 use some of the same type of ports as input device(s) 2636. Thus, for example, a USB port may be used to provide input to computer 2612, and to output information from computer 2612 to an output device 2640. Output adapter 2642 is provided to illustrate that there are some output devices 2640 like monitors, speakers, and printers, among other output devices 2640, which require special adapters. The output adapters 2642 include, by way of illustration and not limitation, video and sound cards that provide a means of connection between the output device 2640 and the system bus 2618. It should be noted that other devices and/or systems of devices provide both input and output capabilities such as remote computer(s) 2644.

Computer 2612 can operate in a networked environment using logical connections to one or more remote computers, such as remote computer(s) 2644. The remote computer(s) 2644 can be a personal computer, a server, a router, a network PC, a workstation, a microprocessor based appliance, a peer device or other common network node and the like, and typically includes many or all of the elements described relative to computer 2612. For purposes of brevity, only a memory storage device 2646 is illustrated with remote computer(s) 2644. Remote computer(s) 2644 is logically connected to computer 2612 through a network interface 2648 and then physically connected via communication connection 2650. Network interface 2648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2650 refers to the hardware/software employed to connect the network interface 2648 to the bus 2618. While communication connection 2650 is shown for illustrative clarity inside computer 2612, it can also be external to computer 2612. The hardware/software necessary for connection to the network interface 2648 includes, for exemplary purposes only, internal and external technologies such as, modems including regular telephone grade modems, cable modems and DSL modems, ISDN adapters, and Ethernet cards.

FIG. 27 is a schematic block diagram of a sample-computing environment 2700 with which the subject specification can interact. The system 2700 includes one or more client(s) 2710. The client(s) 2710 can be hardware and/or software (e.g., threads, processes, computing devices). The system 2700 also includes one or more server(s) 2730. Thus, system 2700 can correspond to a two-tier client server model or a multi-tier model (e.g., client, middle tier server, data server), amongst other models. The server(s) 2730 can also be hardware and/or software (e.g., threads, processes, computing devices). The servers 2730 can house threads to perform transformations by employing the disclosed subject matter, for example. One possible communication between a client 2710 and a server 2730 may be in the form of a data packet transmitted between two or more computer processes.

The system 2700 includes a communication framework 2750 that can be employed to facilitate communications between the client(s) 2710 and the server(s) 2730. The client(s) 2710 are operatively connected to one or more client data store(s) 2720 that can be employed to store information local to the client(s) 2710. Similarly, the server(s) 2730 are operatively connected to one or more server data store(s) 2740 that can be employed to store information local to the servers 2730.

It is to be appreciated and understood that components (e.g., GGSP, PDS, sensor component, data source, PMU, ECM, etc.), as described with regard to a particular system or method, can include the same or similar functionality as respective components (e.g., respectively named components or similarly named components) as described with regard to other systems or methods disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks typically operate in the unlicensed 2.4 and 5 GHz radio bands, at an 11 Mbps (802.11b) or a 54 Mbps (802.11a) data rate, for example, or with products that contain both bands (dual band), so the networks can provide real-world performance similar to the basic "10BaseT" wired Ethernet networks used in many offices.

In the subject specification, terms such as "data store," "data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM)). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory (e.g., card, stick, key drive . . . ) or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the disclosed subject matter. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory to store computer-executable components; and
   a processor, coupled to the memory, that executes or facilitates execution of computer-executable components, comprising:
   a data information component configured to receive power system related data from one or more data source components associated with a power transmission and distribution grid (PTDG), and correlate respective pieces of the power system related data, based at least in part on a temporal axis, a locational axis, and a topological axis, to generate correlated pieces of the power system related data comprising a first subset of the correlated pieces of the power system related data associated with first temporal data, first locational data, and first topological data, and a second subset of the correlated pieces of the power system related data associated with second temporal data, second locational data, and second topological data; and
   a first generalized grid security component (GGSC), associated with the data information component, configured to determine a set of the correlated pieces of the power system related data that is usable by, and is to be communicated to, a second GGSC to facilitate controlling the PTDG, wherein the first GGSC is at a first level and the second GGSC is at a second level of a multi-level hierarchy of the PTDG, and the set of the correlated pieces of the power system related data comprises the first subset of the correlated pieces of the power system related data,
   wherein the second GGSC is configured to analyze the set of the correlated pieces of the power system related data to facilitate control of power transmission and distribution by at least one of a power substation or a transformer of the PTDG, in accordance with a defined power system control criterion.

2. The system of claim 1, wherein at least a portion of the power system related data is generated at a subsecond rate, and the second GGSC is further configured to identify at least one remedial action to perform with respect to the PTDG based at least in part on a result of the analysis of the set of the correlated pieces of the power system related data to facilitate the control of the power transmission and distribution by at least one of the power substation or the transformer at a subsecond rate, and wherein the set of the correlated pieces of the power system related data comprises synchrophasor data.

3. The system of claim 1, wherein the second GGSC is further configured to identify at least one abnormal condition relating to the PTDG based at least in part on a result of the analysis of the set of the correlated pieces of the power system related data, wherein the at least one abnormal condition is at least one of a fault or an abnormal power system parameter value, and wherein the abnormal power system parameter value is above or below a defined threshold normal power system parameter value or is outside of a range of defined threshold normal power system parameter values.

4. The system of claim 3, wherein the second GGSC is further configured to determine at least one remedial action to perform to rectify the at least one abnormal condition.

5. The system of claim 1, wherein the second GGSC is further configured to determine a health or operation state of at least a portion of the PTDG based at least in part on a result of the analysis of the set of the correlated pieces of the power system related data.

6. The system of claim 1, wherein the second GGSC is further configured to perform a simulation of operation of at least a portion of the PTDG under a set of power related conditions associated with a request to modify operation of at least the portion of the PTDG in accordance with the set of power related conditions, based at least in part on the first subset of the correlated pieces of the power system related data, in response to the request to modify operation of at least the portion of the PTDG, prior to allowance or denial of the request to modify operation of at least the portion of the PTDG.

7. The system of claim 6, wherein the second GGSC is further configured to allow the modification of operation of at least the portion of the PTDG in response to a first result of the simulation being in accordance with the power system control criterion, or deny the modification of operation of at least the portion of the PTDG in response to a second result of the simulation being determined not to be in accordance with the power system control criterion.

8. The system of claim 7, wherein the request to modify the operation of at least the portion of the PTDG comprises a request to operate at least the portion of the PTDG under an overload condition that is at a rating above a static rating and below a defined upper rating associated with at least the portion of the PTDG, for a specified period of time, and wherein the second GGSC is further configured to determine whether the portion of the PTDG is operable to sustain the overload condition for the specified period of time based at least in part on the result of the simulation to facilitate a determination of whether to allow the request to modify the operation of at least the portion of the PTDG.

9. The system of claim 1, wherein the one or more data source components comprise at least one of a power system health sensor, a heat sensor, a voltage sensor, a current sensor, a power system balance sensor, a harmonic level sensor; a power system parameter sensor, a fault sensor, a frequency monitoring network (FNET), a phasor measurement unit (PMU) FNET (PMU/FNET), a frequency disturbance recorder, an intelligent equipment device; digital fault recorder; a fault current limiter, a fault current controllers, an equipment data file associated with a piece of PTDG equipment, or a component associated with the second GGSC, wherein the component is configured to generate and provide at least some of the power system related data.

10. The system of claim 1, wherein the second GGSC is further configured to comprise a root cause analysis module configured to determine a root source that caused an abnormal condition associated with the PTDG based at least in part on a result of the analysis of the set of the correlated pieces of the power system related data.

11. The system of claim 10, further comprising an equipment diagnostic and prediction module configured to simulate historical operation of the PTDG based at least in part on the set of the correlated pieces of the power system related data to generate a simulation result, wherein the root cause analysis module is further configured to analyze the simulation result to determine the root source that caused the abnormal condition associated with the PTDG.

12. The system of claim 1, wherein the second GGSC is further configured to comprise a replacement plan assistant module configured to analyze the set of the correlated pieces of the power system related data to determine respective times to replace, repair, or perform maintenance on respective pieces of PTDG equipment, based at least in part on respective a condition of the respective pieces of PTDG equipment at a time of the analysis or a predicted future condition of the respective pieces of PTDG equipment, in accordance with the defined power system control criterion, wherein the replacement plan assistant module is further configured to generate a remedial action execution plan comprising a temporal sequence of the respective times of replacement, repair, or performance of maintenance on the respective pieces of PTDG equipment.

13. The system of claim 1, wherein the second GGSC comprises an enhanced stability analysis component configured to monitor a level of oscillatory instability in at least a portion of the PTDG, perform on-line detection and analysis of the level of oscillatory instability in the portion of the PTDG, determine that an abnormal oscillatory instability exists in response to determining that the level of oscillatory instability is above a defined threshold level of oscillatory instability, and determine at least one remedial action to perform to rectify the abnormal oscillatory instability to initiate a reduction of the level of oscillatory instability to a defined acceptable level.

14. The system of claim 1, wherein at least one of the data information component or the one or more data source components are respectively configured to apply one or more tags to respective pieces of the power system related data, wherein the one or more tags comprise a time of data collection or a power system event, a location to which a piece of the respective pieces of the power system related data relates, or topological information regarding the piece.

15. The system of claim 1, wherein the computer-executable components further comprise a common source modeler component configured to generate one or more power system model objects that model one or more respective pieces of PTDG equipment, wherein the one or more power system model objects are respectively defined uniformly across subsystems of the second GGSC to achieve a consistent definition of the one or more power system model objects among the subsystems.

16. The system of claim 15, wherein the common source modeler component is further configured to be associated with a common information model that employs one or more specified modeling standards, protocols, or algorithms to facilitate generation of the one or more power system model objects, wherein the common source modeler component is further configured to provide PTDG model version management that supports model-over-time management to generate a power system model object that reconstructs a version of a piece of PTDG equipment that was in use in the PTDG during a period of time of PTDG operation being analyzed by the second GGSC.

17. The system of claim 1, wherein the computer-executable components further comprise a grid unified view module configured to consolidate or synthesize at least a portion of the power system related data to generate PTDG unified result data for presentation via a graphical user interface, wherein the grid unified view module is further configured to identify and allow action on a most restrictive security constraint for PTDG conditions at a given time, based at least in part on a result of the analysis of at least the portion of the correlated pieces of the power system related data relating to the PTDG.

18. A method, comprising:
  correlating, by a system comprising a processor, a plurality of items of power system related data at a first level of a multi-level hierarchy of a power transmission and distribution grid (PTDG), based at least in part on a temporal factor, a geographical factor, and a topological factor, to generate correlated items of the power system related data comprising a first subset of the correlated items of the power system related data associated with first temporal information, first geographical information, and first topological information, and a second subset of the correlated items of the power system related data associated with second temporal information, second geographical information, and second topological information;
  determining, by the system, a set of the correlated items of the power system related data that is usable by, and is to be communicated to, a controller device at a second level of the multi-level hierarchy to facilitate controlling the PTDG, wherein the set of the correlated items of the power system related data comprises the first subset of the correlated items of the power system related data; and
  at the second level of the multi-level hierarchy, controlling, by the system, at least a portion of the PTDG based at least in part on a result of analyzing the set of correlated items of the power system related data, in accordance with a defined power system control criterion.

19. The method of claim 18, further comprising:
  monitoring, by the system, operating conditions relating to power being distributed in the at least the portion of the PTDG;
  obtaining, by the system, power system related data relating to the operating conditions;
  analyzing, by the system, the power system related data relating to the operating conditions, in accordance with the defined power system control criterion; and
  generating, by the system, a set of simulated operating condition scenarios relating to the portion of the PTDG, based at least in part on the analyzing of the power system related data relating to the operating conditions.

20. The method of claim 18, further comprising:
  receiving, by the system, a request to modify operation of at least the portion of the PTDG;
  obtaining, by the system, a portion of the set of correlated items of the power system related data relating to operating conditions associated with the at least a portion of the PTDG;
  performing, by the system, an operation simulation to predict an outcome of the modification of operation of at least the portion of the PTDG, in response to the request to modify the operation of at least the portion of the PTDG;

determining, by the system, whether the modification of the operation of at least the portion of the PTDG is acceptable based at least in part on the operation simulation, in accordance with the defined power system control criterion; and at least one of:
- denying, by the system, the request to modify the operation of at least the portion of the PTDG in response to determining that the modification of the operation of at least the portion of the PTDG is not acceptable, or
- authorizing, by the system, the request to modify the operation of at least the portion of the PTDG in response to determining that the modification of the operation of at least the portion of the PTDG is acceptable.

21. The method of claim 20, wherein the receiving the request to modify operation of at least the portion of the PTDG comprises a request to modify operation of at least the portion of the PTDG to operate at least the portion of the PTDG under an overload condition that is above a static rating and below a dynamic rating of a piece of PTDG equipment in at least the portion of the PTDG.

22. The method of claim 18, further comprising:
monitoring, by the system, power conditions associated with power transmission and distribution in at least the portion of the PTDG;
identifying, by the system, a level of oscillation instability of at least the portion of the PTDG in real time at a subsecond rate;
determining, by the system, whether the level of oscillation instability is acceptable, in accordance with the defined power system control criterion; and
at least one of:
- maintaining, by the system, operation of at least the portion of the PTDG in relation to oscillation stability in response to determining that the level of oscillation instability is acceptable, or
- in response to determining that the level of oscillation instability is unacceptable, determining, by the system, at least one remedial action to perform to reduce the level of oscillation instability to an acceptable level.

23. The method of claim 22, wherein the identifying of the level of oscillation instability further comprises:
at least one of:
- identifying, by the system, a level of oscillation instability of at least the portion of the PTDG, or
- predicting, by the system, a level of oscillation instability of at least the portion of the PTDG at a specified future time period.

24. The method of claim 23, wherein the predicting the level of oscillation instability of at least the portion of the PTDG at the specified future time period further comprises:
simulating, by the system, operations of at least the portion of the PTDG for the specified future time period to generate simulation results; and
predicting, by the system, the level of oscillation instability of at least the portion of the PTDG at the specified future time period based at least in part on the simulation results.

25. The method of claim 18, further comprising:
monitoring, by the system, equipment conditions and equipment performance relating to a piece of PTDG equipment in at least the portion of the PTDG;
obtaining, by the system, power system related data relating to the equipment conditions and the equipment performance of the piece of PTDG equipment;
analyzing, by the system, the power system related data relating to the equipment conditions and the equipment performance of the piece of PTDG equipment;
generating, by the system, a prediction regarding whether an abnormal condition or equipment failure will occur in the piece of PTDG equipment within a specified period of time in the future; and
at least one of:
- maintaining, by the system, operation of the piece of PTDG equipment in response to the prediction indicating that no abnormal condition or equipment failure will occur in the piece of PTDG equipment within a specified period of time in the future, or
- generating, by the system, an alert or work order relating to the piece of PTDG equipment to facilitate performing at least one remedial action relating to the piece of PTDG equipment in response to the prediction indicating that an abnormal condition or equipment failure will occur in the piece of PTDG equipment within the specified period of time in the future.

26. The method of claim 18, further comprising:
diagnosing, by the system, respective conditions of respective pieces of PTDG equipment based at least in part on a portion of the set of the correlated items of the power system related data relating to the respective pieces of PTDG equipment;
analyzing, by the system, the diagnosis of the respective conditions of the respective pieces of PTDG equipment;
generating, by the system, a priority sequence for performance of one or more remedial actions of one or more pieces of PTDG equipment, based at least in part on a result of the analyzing of the diagnosis;
evaluating, by the system, a reliability impact relating to the one or more remedial actions of the priority sequence, in accordance with the defined power system control criterion;
generating, by the system, a remedial action plan based at least in part on the priority sequence and the evaluating of the reliability impact;
evaluating, by the system, an economic impact of the remedial action plan; and
generating, by the system, a remedial action execution plan based at least in part on an evaluation result of the economic impact of the remedial action plan.

27. The method of claim 18, further comprising:
analyzing, by the system, the set of correlated items of the power system related data;
determining, by the system, one or more power-related actions to be performed in the PTDG, based at least in part on a result of the analysis of the set of correlated items of the power system related data and the defined power system control criterion; and
performing, by the system, the one or more power-related actions.

28. The method of claim 27, wherein the performing the one or more power-related actions, further comprising:
generating, by the system, a condition assessment of operation health of the portion of the PTDG;
generating, by the system, a diagnosis of an abnormal condition associated with the portion of the PTDG;
performing, by the system, a dynamic stability analysis on the portion of the PTDG;
performing, by the system, a measurement-based stability analysis on the portion of the PTDG;
generating, by the system, a command to rectify the abnormal condition;

transmitting, by the system, the command to rectify the abnormal condition;
generating, by the system, an alarm indicator relating to the abnormal condition;
presenting, by the system, the alarm indicator;
performing, by the system, one or more remedial actions to rectify the abnormal condition;
at least one of estimating, by the system, a future state or predicting, by the system, the future state of the at least a portion of the PTDG;
simulating, by the system, at least a portion of prior operations of the portion of the PTDG;
simulating, by the system, at least a portion of future operations of the portion of the PTDG to predict at least one scenario of operations of the portion of the PTDG over a specified period of time in the future under a specified set of operating conditions;
predicting, by the system, the at least one scenario of operations of the portion of the PTDG over the specified period of time in the future under the specified set of operating conditions;
determining, by the system, whether a requested overload condition on a piece of PTDG equipment is acceptable for the specified period of time;
analyzing, by the system, an equipment data file relating to at least the dynamic equipment rating of the piece of PTDG equipment;
granting, by the system, a request to operate the piece of PTDG equipment under an overload condition for the specified period of time in response to determining that the overload condition is acceptable;
denying, by the system, the request to operate the piece of PTDG equipment under the overload condition for the specified period of time in response to determining that the overload condition is not acceptable;
performing, by the system, a root cause analysis relating to the portion of the PTDG;
performing, by the system, a post mortem analysis relating to the portion of the PTDG;
generating, by the system, a remedial action execution plan for the a portion of the PTDG; or
generating, by the system, one or more operation guidelines to modify operation of the portion of the PTDG.

29. A non-transitory computer-readable medium storing instructions that, in response to execution, cause a system comprising a processor to perform operations, comprising:
correlating a plurality of items of power system related data at a first level of a multi-level hierarchy of a power transmission and distribution grid (PTDG), based at least in part on a temporal axis, a geographical axis, and a topological axis, to generate correlated items of the power system related data comprising a first subset of the correlated items of the power system related data associated with first temporal data, first geographical data, and first topological data, and a second subset of the correlated items of the power system related data associated with second temporal data, second geographical data, and second topological data;
determining a set of the correlated items of the power system related data that is usable by, and is to be communicated to, a controller device at a second level of the multi-level hierarchy to facilitate controlling the PTDG, wherein the set of the correlated items of the power system related data comprises the first subset of the correlated items of the power system related data; and
at the second level of the multi-level hierarchy, controlling at least a portion of the PTDG based at least in part on a result of analyzing the set of the correlated items of the power system related data, in accordance with a defined power system control criterion.

30. A system, comprising:
means for correlating a plurality of items of power system related data, at a first level of a multi-level hierarchy of a power transmission and distribution grid (PTDG), as a function of a temporal axis, a geographical axis, and a topological axis including means for generating correlated items of the power system related data comprising a first subset of the correlated items of the power system related data associated with first temporal information, first geographical information, and first topological information, and a second subset of the correlated items of the power system related data associated with second temporal information, second geographical information, and second topological information;
means for determining a set of the correlated items of the power system related data that is usable by, and is to be communicated to, a means for controlling the PTDG at a second level of the multi-level hierarchy to facilitate controlling the PTDG, wherein the set of the correlated items of the power system related data comprises the first subset of the correlated items of the power system related data; and
the means for controlling the PTDG, at the second level of the multi-level hierarchy, based at least in part on an output of a means for analyzing the set of correlated items of the power system related data and a defined power system control criterion.

* * * * *